US012590842B2

(12) United States Patent
     Klimov et al.

(10) Patent No.:     US 12,590,842 B2
(45) Date of Patent:        Mar. 31, 2026

(54) PHOTONIC THERMOMETER MODULE ASSEMBLY AND PERFORMING PHOTONIC THERMOMETRY

(71) Applicant: Government of the United States of America, as represented by the Secretary of Commerce, Gaithersburg, MD (US)

(72) Inventors: Nikolai Nikolaevich Klimov, Gaithersburg, MD (US); Tobias Kent Herman, Clarksburg, MD (US); Zeeshan Ahmed, Gaithersburg, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 542 days.

(21) Appl. No.: 18/121,052

(22) Filed: Mar. 14, 2023

(65) Prior Publication Data

US 2024/0133746 A1     Apr. 25, 2024
US 2024/0230415 A9     Jul. 11, 2024

Related U.S. Application Data

(60) Provisional application No. 63/419,026, filed on Oct. 25, 2022.

(51) Int. Cl.
     *G01J 5/0821*     (2022.01)
     *G01J 5/02*       (2022.01)
     *G01K 1/08*       (2021.01)

(52) U.S. Cl.
     CPC ........... *G01J 5/0821* (2013.01); *G01J 5/0205* (2013.01); *G01K 1/08* (2013.01)

(58) Field of Classification Search
     CPC ......... G01J 5/0821; G01J 5/0205; G01K 1/08
     See application file for complete search history.

(56) References Cited

U.S. PATENT DOCUMENTS 9,726,553 B2     8/2017  Ahmed et al.
10,955,617 B2    3/2021  Klimov et al.
                 (Continued)

FOREIGN PATENT DOCUMENTS

CN          114252168 A  *  3/2022  ............... G01K 1/14

OTHER PUBLICATIONS

Klimov N, Purdy T, Ahmed Z. Towards Replacing Resistance Thermometry with Photonic Thermometry. Sens Actuators A Phys. Jan. 2018;2690:308-312. doi: 10.1016/j.sna.2017.11.055. Epub Dec. 2, 2017. PMID: 29255340; PMCID: PMC5731660. (Year: 2018).*

(Continued)

*Primary Examiner* — Mirellys Jagan
(74) *Attorney, Agent, or Firm* — Office of Chief Counsel for National Institute of Standards and Technology

(57)                    ABSTRACT

A photonic thermometer module assembly includes: a sheath; a sheath bottom plug; a sheath top flange; a top sealing flange; a heat exchanger; a photonic thermometer disposed on the heat exchanger such that the photonic thermometer determines a temperature of the sheath; and an optical fiber array in optical communication with the photonic thermometer and that optically couples the photonic thermometer to an exterior environment of the photonic thermometer module assembly, wherein the photonic thermometer module assembly is compatible with International Temperature Scale of 0 (ITS-90) fixed-point cell infrastructure and conventional drywell and oil-bath calibrations, and the photonic thermometer module assembly provides temperature measurements from −200° C. to +700° C.

25 Claims, 46 Drawing Sheets

(56) References Cited

U.S. PATENT DOCUMENTS

| 2006/0067605 A1* | 3/2006 | Mirkarimi | G02B 6/1225 |
| | | | 385/12 |
| 2019/0293809 A1* | 9/2019 | Tosh | G01T 1/026 |
| 2020/0103594 A1* | 4/2020 | Klimov | G01K 11/3206 |
| 2023/0032022 A1* | 2/2023 | Klimov | G01J 5/20 |
| 2024/0328863 A1* | 10/2024 | Barker | G01J 5/80 |

OTHER PUBLICATIONS

Klimov, N., et al., "Fabrication and Testing of Photonic Thermometers", Journal of Visualized Experiments, 2018, p. e55807, vol. 140, DOI: 10.3791/55807.

Consultative Committee for Thermometry under the auspices of the International Committee for Weights and Measures, "Guide to realization of ITS-90. Part 5: Platinum Resistance thermometry."

Bureau International des Poids et Measures, 2021, p. 1-56, Accessed Nov. 3, 2022, DOI: https://www.bipm.org/documents/20126/41773843/Guide_ITS-90_5_SPRT_2021.pdf/c4bbbe56-4118-eef7-47cb-3ea234db40b8.

You, M., et al., "Chip-Scale Silicon Ring Resonators for Cryogenic Temperature Sensing", Journal of Lightwave Technology, 2020, p. 5768-5773, vol. 38 No. 20.

ASTM International, "Designation: F2362-03 (Reapproved 2019), Specification for Temperature Monitoring Equipment", 2019, p. 1-43.

ASTM International, ASTM Standard: E1137/E1137M-08 (2020), "Standard specification for industrial platinum resistance thermometers.", 2020, p.

Bergquist, B., et al., "Standards defining temperature sensors", Presentation by Burns Engineering, 2018, Accessed: Nov. 3, 2022, DOI: https://documents.pub/download/standards-defining-temperature-sensors-burns-years-experience-in-temperature.

* cited by examiner

A-A CROSSSECTION

A-A CROSSSECTION

A-A CROSSSECTION

A-A CROSSSECTION

A-A CROSSSECTION

100

100

100

VIEW A-A

VIEW A-A

VIEW A-A

VIEW A-A

VIEW A-A

VIEW A-A

VIEW A-A

VIEW A-A

VIEW A-A

VIEW A-A

301

304

101

302

201

202

402

401

404

409

102

405

VIEW A-A

VIEW A-A

VIEW A-A

VIEW A-A

302

308       301

306

302

307

308

301

306

302

309

301

306

301

306

306

301

A-A CROSSSECTION

B-B CROSSSECTION

A-A CROSSSECTION

B-B CROSSSECTION

B-B CROSSSECTION

PHOTONIC THERMOMETER MODULE ASSEMBLY AND PERFORMING PHOTONIC THERMOMETRY

CROSS REFERENCE TO RELATED APPLICATIONS

This application claims the benefit of U.S. Provisional Patent Application Ser. No. 63/419,026 (filed Oct. 25, 2022), which is herein incorporated by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in this invention.

BRIEF DESCRIPTION

Disclosed is a photonic thermometer module assembly for performing photonic thermometry, the photonic thermometer module assembly comprising: a sheath comprising an inner volume, a first end, and a second end disposed at an opposite end of the sheath than the first end; a sheath bottom plug disposed on the sheath at the second end such that the sheath bottom plug hermetically seals the sheath at the second end; a sheath top flange disposed at the first end; a top sealing flange disposed on the sheath top flange at the first end such that the top sealing flange hermetically seals the sheath at the first end; a heat exchanger disposed on the sheath bottom plug such that the heat exchanger is in thermal communication with the sheath bottom plug; a photonic thermometer disposed on the heat exchanger such that: the photonic thermometer is in thermal communication with the sheath bottom plug through the heat exchanger; the heat exchanger is interposed between the photonic thermometer and the photonic thermometer, and the photonic thermometer determines a temperature of the sheath; and an optical fiber array in optical communication with the photonic thermometer and that optically couples the photonic thermometer to an exterior environment of the photonic thermometer module assembly, wherein the photonic thermometer module assembly is compatible with International Temperature Scale of (ITS-90) fixed-point cell infrastructure and conventional drywell and oil-bath calibrations, and the photonic thermometer module assembly provides temperature measurements from −200° C. to +700° C.

Disclosed is a photonic thermometer module assembly for performing photonic thermometry, the photonic thermometer module assembly comprising: a sheath comprising an inner volume, a first end, and a second end disposed at an opposite end of the sheath than the first end; a sheath bottom plug disposed on the sheath at the second end such that the sheath bottom plug hermetically seals the sheath at the second end; a top inner-wall-mount flange disposed at the first end; a top seal plug disposed on the top inner-wall-mount flange at the first end such that the top seal plug hermetically seals the sheath at the first end; a heat exchanger disposed on the sheath bottom plug such that the heat exchanger is in thermal communication with the sheath bottom plug; a photonic thermometer disposed on the heat exchanger such that: the photonic thermometer is in thermal communication with the sheath bottom plug through the heat exchanger; the heat exchanger is interposed between the photonic thermometer and the photonic thermometer, and the photonic thermometer determines a temperature of the sheath; and an optical fiber array in optical communication with the photonic thermometer and that optically couples the photonic thermometer to an exterior environment of the photonic thermometer module assembly, wherein the photonic thermometer module assembly is compatible with International Temperature Scale of 0 (ITS-90) fixed-point cell infrastructure and conventional drywell and oil-bath calibrations, and the photonic thermometer module assembly provides temperature measurements from −200° C. to +700° C.

BRIEF DESCRIPTION OF THE DRAWINGS

The following description cannot be considered limiting in any way. Various objectives, features, and advantages of the disclosed subject matter can be more fully appreciated with reference to the following detailed description of the disclosed subject matter when considered in connection with the following drawings, in which like reference numerals identify like elements.

Figure 26:
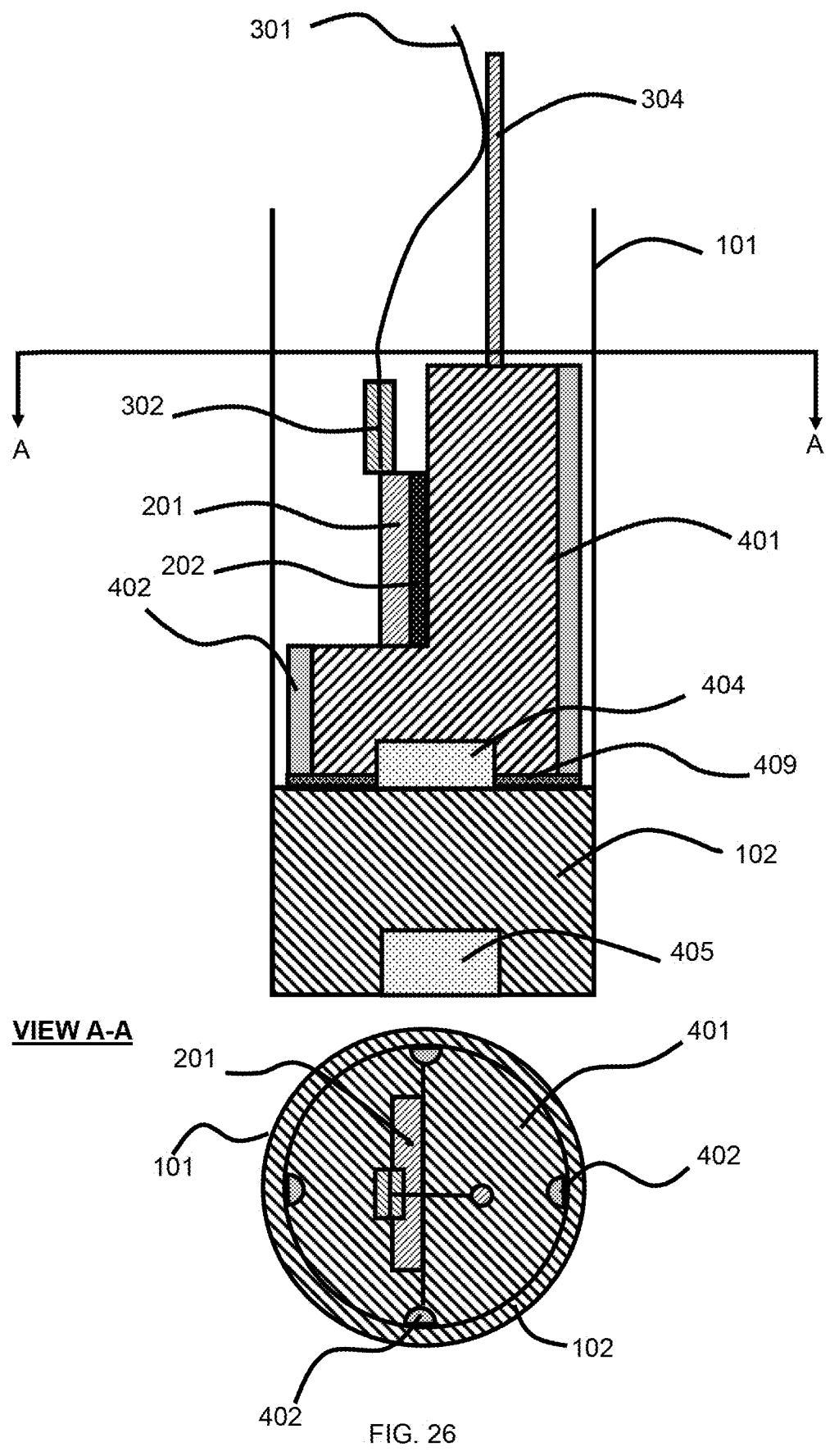

FIG. 26 shows features for a photonic thermometer module assembly, according to some embodiments.

DETAILED DESCRIPTION

A detailed description of one or more embodiments is presented herein by way of exemplification and not limitation.

It has been discovered that photonic thermometer module assembly 100 is a mechanically robust, modular design packaging solution for a fiber-coupled photonic temperature sensor. The modularized assembly of photonic thermometer module assembly 100 provides fast swapping of components. Beneficially, photonic thermometer module assembly 100 provides for temperature measurements with a fiber-coupled photonic thermometer over a broad temperature range, e.g., from −200° C. to +700° C. is compatible with International Temperature Scale of 1990 (ITS-90) fixed-point cell infrastructure and conventional drywell and oil-bath calibrations. Advantageously, photonic thermometer module assembly 100 can be reused with different photonic thermometers disposed therein. Fiber-coupled chips (photonic thermometers) can be easily swapped (plugged-in-place) in photonic thermometer module assembly 100. Photonic thermometer module assembly 100 has reconfigurable modular design, wherein independent modules are reusable, interchangeable, or swappable, or reconfigurable. It is contemplated that various components are swappable so that such component can be replaced by another component of its kind (e.g., a flange replaced by another type of flange). In some embodiments, a photonic thermometer is interchangeable in that the photonic thermometer can be replaced with a different photonic thermometer, wherein the replacement photonic thermometer behaving very similarly to replaced photonic thermometer. Photonic thermometer module assembly 100 can be opened for replacement of the photonic thermometer while reusing various other components. Photonic thermometer module assembly 100 can have one of various configurations when all or selected modules are simultaneously present. In an embodiment, photonic thermometer module assembly 100 includes a minimal base set of modules that minimizes a weight and size of photonic thermometer module assembly 100.

In an embodiment, photonic thermometer module assembly 100 has a form-factor or size similar to the dimensions of a standard platinum resistance thermometer (SPRT) and can be used in fixed-point cells with phase-transition temperatures defined within the International Temperature Scale of 1990 (ITS-90). Accordingly, photonic thermometer module assembly 100 can be used as a photonic thermometer for photonic thermometry in ITS-90 fixed-point cells, standard temperature calibrators, or oil baths.

Figure 1:
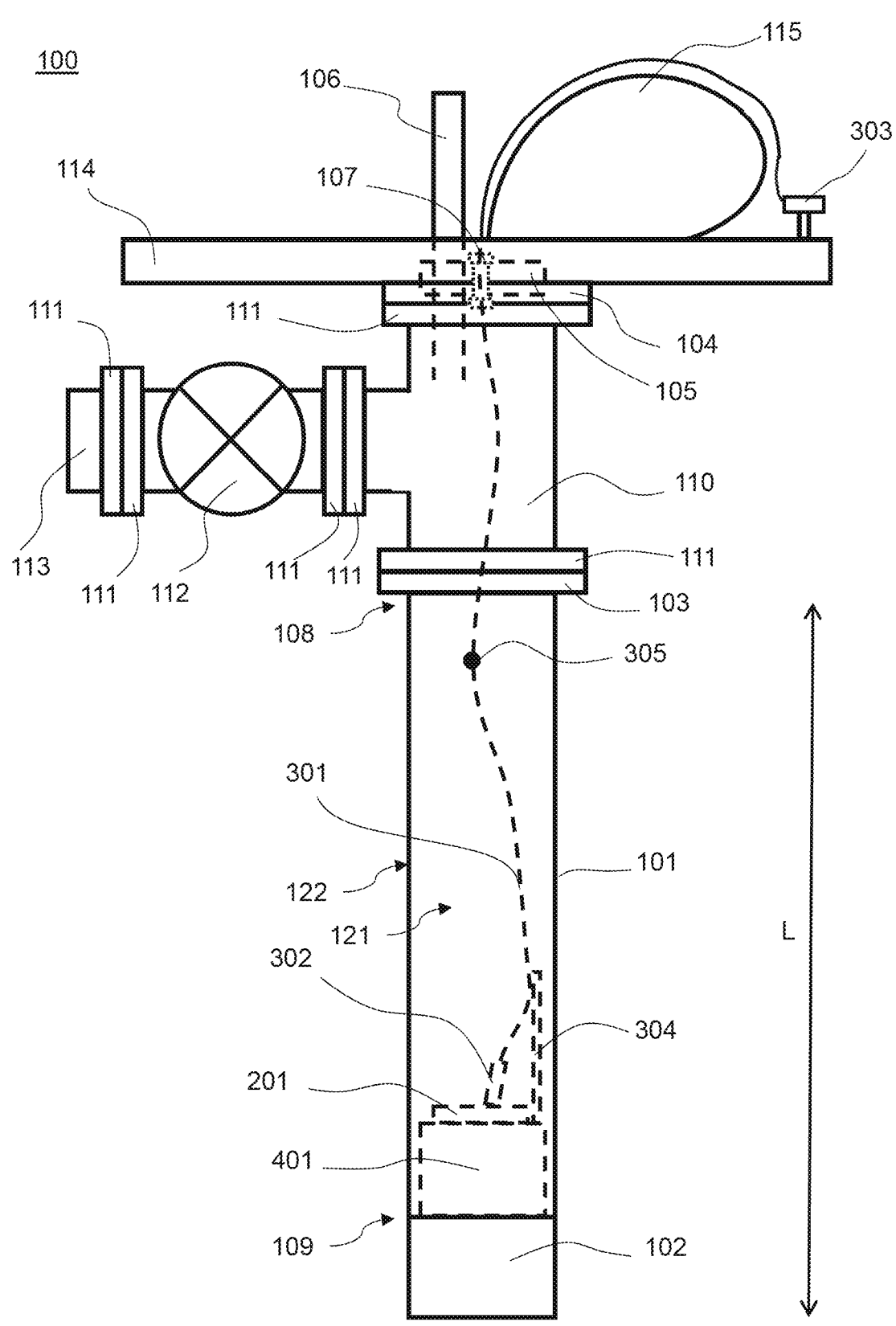
FIG. 1 shows a photonic thermometer module assembly, according to some embodiments.
Figure 2:
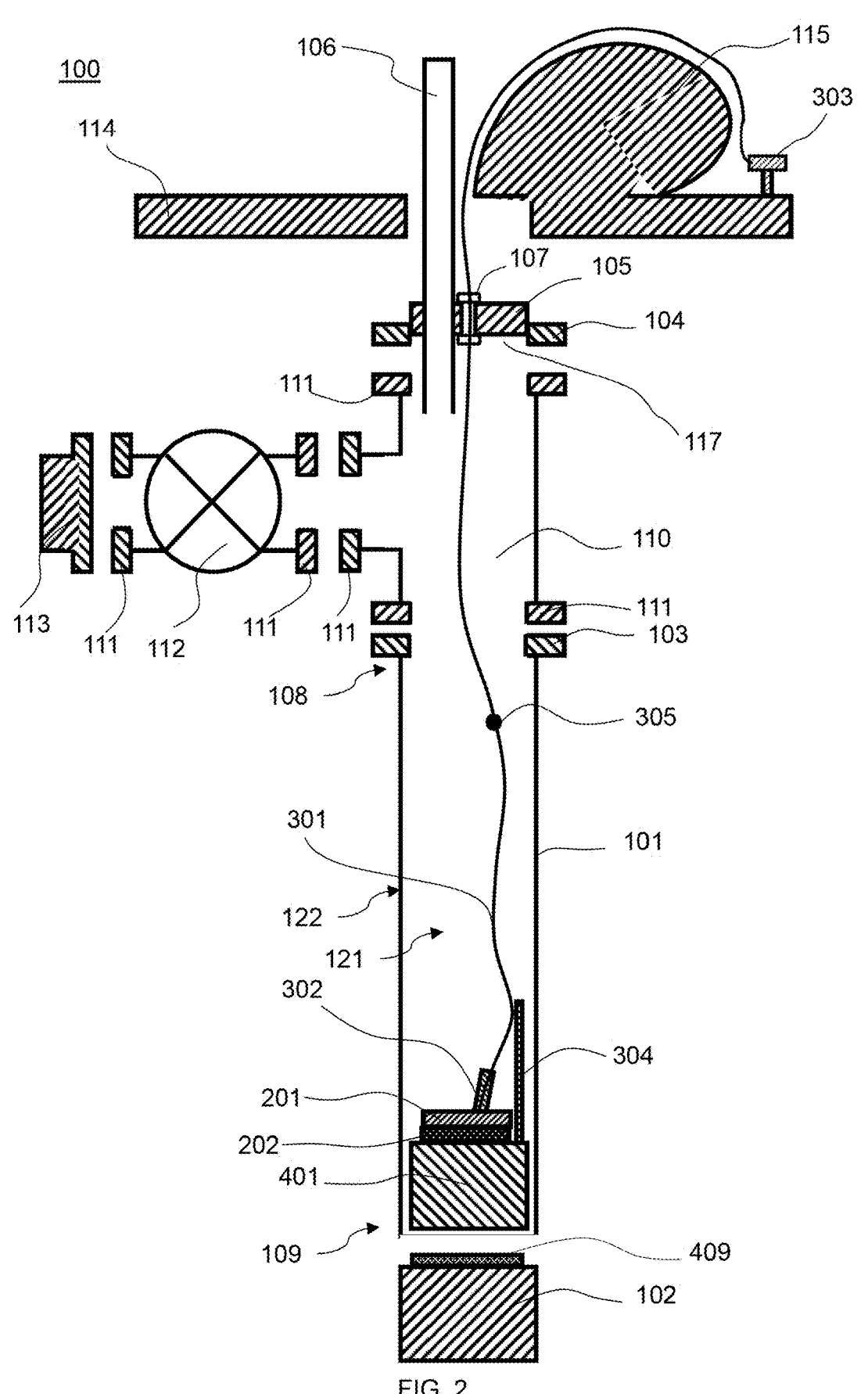
FIG. 2 shows an exploded view of photonic thermometer module assembly, according to some embodiments.

In an embodiment, with reference to FIG. 1, FIG. 2, and the like, photonic thermometer module assembly 100 includes sheath 101 including first end 108 and second end 109 at an opposite end of sheath 101, sheath bottom plug 102 disposed on sheath 101 at second end 109, sheath top flange 103 disposed on sheath 101 at first end 108, photonic thermometer 201 disposed in inner volume 121 of sheath 101, optical fiber array 301 connected to and in optical communication with photonic thermometer 201 via optical fiber expander 302, and heat exchanger 401 in thermal communication with photonic thermometer 201, such that photonic thermometer 201 is disposed on heat exchanger 401; and optionally thermally conductive layer 202 interposed between photonic thermometer 201 and heat exchanger 401 and that provides thermal communication among photonic thermometer 201 and heat exchanger 401.

In an embodiment, photonic thermometer module assembly 100 includes flanged tee-coupler 110 disposed on sheath 101 proximate to first end 108. Flanged tee-coupler 110 can include a plurality of coupling flange 111, e.g., three coupling flanges 111, wherein one of coupling flange 111 is disposed on sheath top flange 103 of sheath 101. In an embodiment, photonic thermometer module assembly 100 includes vacuum valve 112 in fluid communication with inner volume 121 of sheath 101. Vacuum valve 112 can be disposed on flanged tee-coupler 110. An inlet port of vacuum valve 112 can covered with vacuum valve plug 113.

In an embodiment, photonic thermometer module assembly 100 includes top sealing flange 104 disposed on sheath top flange 103. According to an embodiment, flanged tee-coupler 110 is interposed between top sealing flange 104 and sheath top flange 103. Various features can be disposed on top sealing flange 104 such as top flange plug 105, exchange gas evacuation/filling tube 106, optical fiber feedthrough 107, optical fiber support collar 114, or optical fiber support fin 115. Exchange gas evacuation/filling tube 106 is in fluid communication with inner volume 121 and provide evacuation of gas from inner volume 121 or introduction of gas into inner volume 121. Optical fiber feedthrough 107 provides a path through which optical fiber array 301 can be coupled from exterior 122 to inner volume 121. To alleviate strain on optical fiber connected to optical fiber feedthrough 107, optical fiber support fin 115 provides strain relief by disposing the optical fiber thereon for a non-abrupt physical transition out of inner volume 121. It should be appreciated that the optical fiber array can be in optical communication with the photonic thermometer and configured to optically couple the photonic thermometer to an exterior environment so that a light source can provide light to the optical fiber and photonic chip, Wherein the light communicates from the light to the photonic via the optical fiber.

In an embodiment, photonic thermometer module assembly 100 includes optical fiber array 301 disposed in sheath 101. Optical fiber array 301 is guided via optical fiber feedthrough 107 into inner volume 121 through top sealing flange 104 or top flange plug 105. The optical fiber of optical fiber array 301 can include one optical fiber, an optical fiber bundle that includes a plurality of individual optical fibers, or an optical fiber ribbon that includes conjoined optical fibers. One end of optical fiber array 301 is connected to photonic thermometer 201 proximate to second end 109 directly or via optical fiber expander 302. The other end of optical fiber array 301 can be terminated with fiber connector 303. Optical fiber array 301 can be connected to fiber strain relief post 304 that is attached to heat exchanger 401. Optical fiber array 301 can include fiber splice joint 305 to optically interconnect a pigtail of optical fiber array 301 from optical fiber expander 302 with a portion of optical fiber disposed in optical fiber feedthrough 107 from exterior 122 of photonic thermometer module assembly 100.

In an embodiment, photonic thermometer module assembly 100 includes heat exchanger 401 disposed in inner volume 121 at second end 109 and in thermal communication with photonic thermometer 201, wherein there can be direct contact or indirect contact (via thermally conductive layer 202) between heat exchanger 401 and photonic thermometer 201. In an embodiment, heat exchanger 401 includes heat exchanger cavity 406, air escape trench 402, or a combination thereof. In an embodiment, heat exchanger 401 is in thermal communication with sheath bottom plug 102 directly or via bottom plug thermally conductive layer 409. In an embodiment, heat exchanger 401 is disposed on sheath bottom plug 102 via bottom plug thermally conductive layer 409, heat exchanger-to-bottom plug threaded lock joint 403, a magnetic force generated by heat exchanger magnet 404 and/or bottom plug magnet 405, or a combination thereof. In an embodiment, heat exchanger 401 is connected to sheath bottom plug 102 by conical self-aligning heat exchanger-to-bottom plug joint. In an embodiment, heat exchanger 401 includes heat exchanger cavity 406, air escape trench 402, air escape inner channel 408, or a combination thereof. Thermally conductive layer 409 can have an adhesive property (e.g., it can be thermally conductive epoxy) to adhere heat exchanger 401 to sheath bottom plug 102. Threaded lock joint 403 and magnets 404/405 can be used in combination or separately (so that either 403 or 404/405 is absent). If heat exchanger 401 or sheath bottom plug 102 is magnetic, one magnet (405 or 404) need be used.

In an embodiment, sheath bottom plug 102 is a heat exchanger when photonic thermometer 201 is disposed directly on sheath bottom plug 102 with bottom plug thermally conductive layer 409 optionally interposed between photonic thermometer 201 and sheath bottom plug 102. In an embodiment, sheath bottom plug 102 can be reversibly attached or permanently attached to sheath 101 or bottom inner-wall-mount flange 120.

Figure 46:
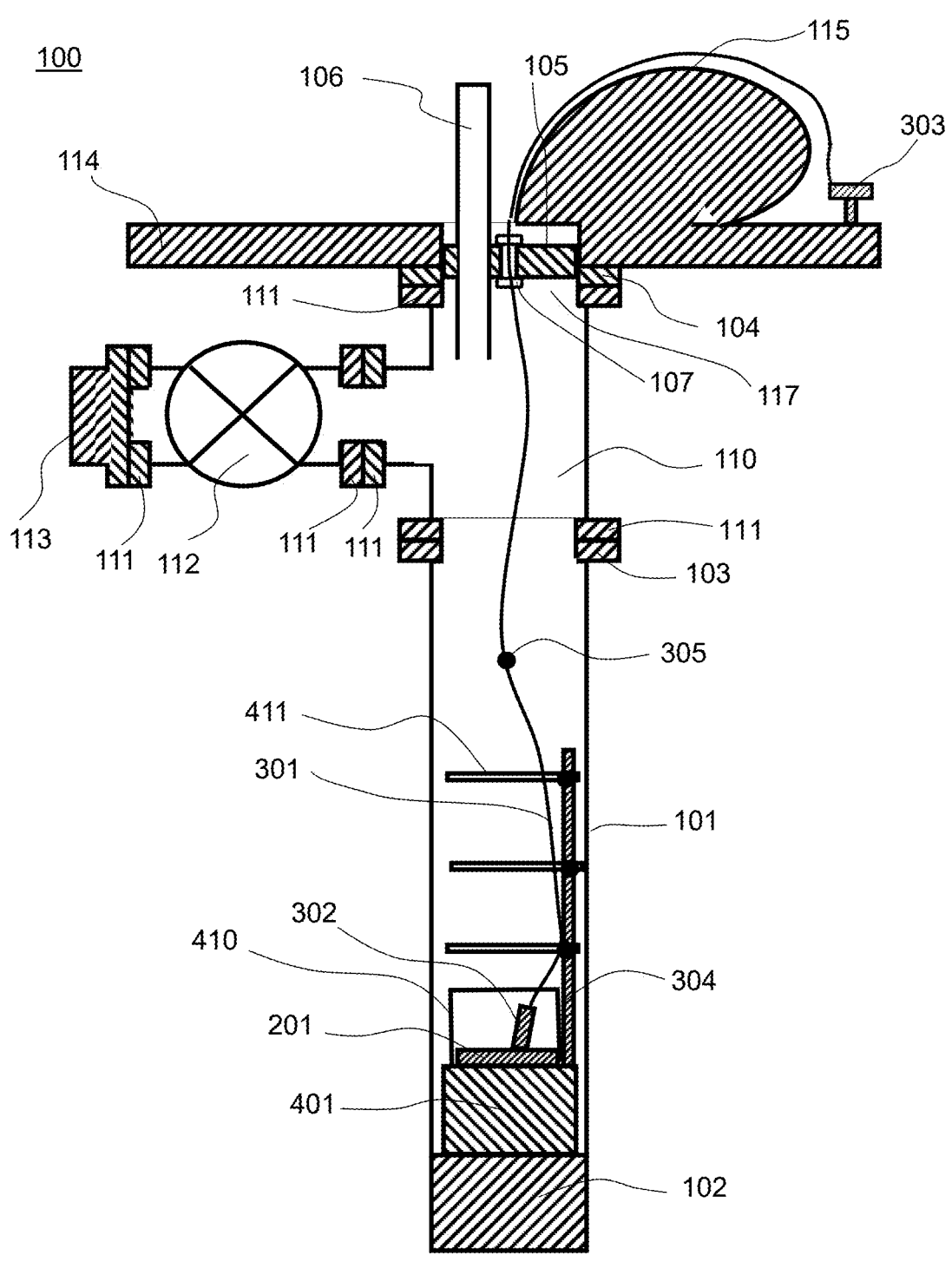
FIG. 46 shows a photonic thermometer module assembly, according to some embodiments.

In an embodiment, with reference to FIG. 46, photonic thermometer module assembly 100 includes thermal shield 410 disposed on photonic thermometer 201 so that photonic thermometer 201 is sensitive to the temperature of heat exchanger 401 and blocked from temperature gradients and temperature fluctuations in inner volume 121.

Figure 45:
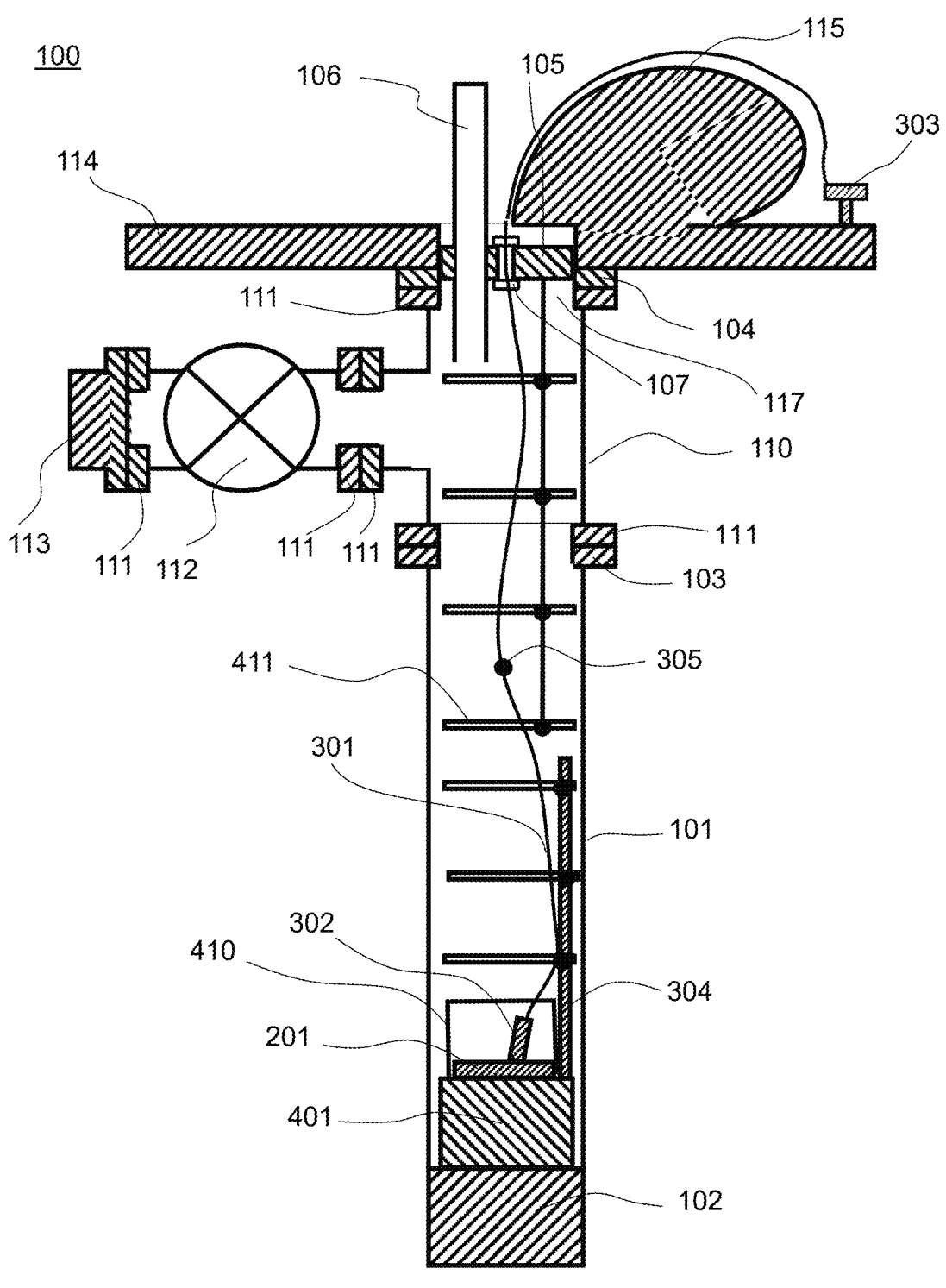
FIG. 45 shows a photonic thermometer module assembly, according to some embodiments.

In an embodiment, with reference to FIG. 45 and FIG. 46, photonic thermometer module assembly 100 includes baffle disk 411 disposed in inner volume 121 of sheath 101. The number of baffle disks 411 can be selected to reduce thermal convection in inner volume 121. A stack of baffle disk 411 sheath 101 can be supported by fiber strain relief post 304 proximate to second end 109 or can be suspended from top sealing flange 104 at first end 108.

Photonic thermometer module assembly 100 can be made of various elements and components that are modularly assembled together. Elements of photonic thermometer module assembly 100 can be various sizes. It is contemplated that the size of the elements can be selected based on an environment or context in which photonic thermometer module assembly 100 is used. Elements of photonic thermometer module assembly 100 can be made of a material that is physically or chemically resilient in an environment in which photonic thermometer module assembly 100 is disposed. Exemplary materials include a metal, ceramic, thermoplastic, glass, semiconductor, and the like. The elements of photonic thermometer module assembly 100 can be made of the same or different material and can be monolithic in a single physical body or can be separate members that are physically joined.

In an embodiment, photonic thermometer module assembly 100 includes sheath 101. Sheath 101 have a transverse cross-section that is circular. An inner diameter of sheath 101 can be from 1 mm to 20 mm. Sheath length L can be from 1 cm to 60 cm (e.g., as shown in FIG. 1, FIG. 8, FIG. 9, FIG. 11, FIG. 12). It is contemplated that inner volume 121 is large enough to accommodate photonic thermometer 201.

Figure 11:
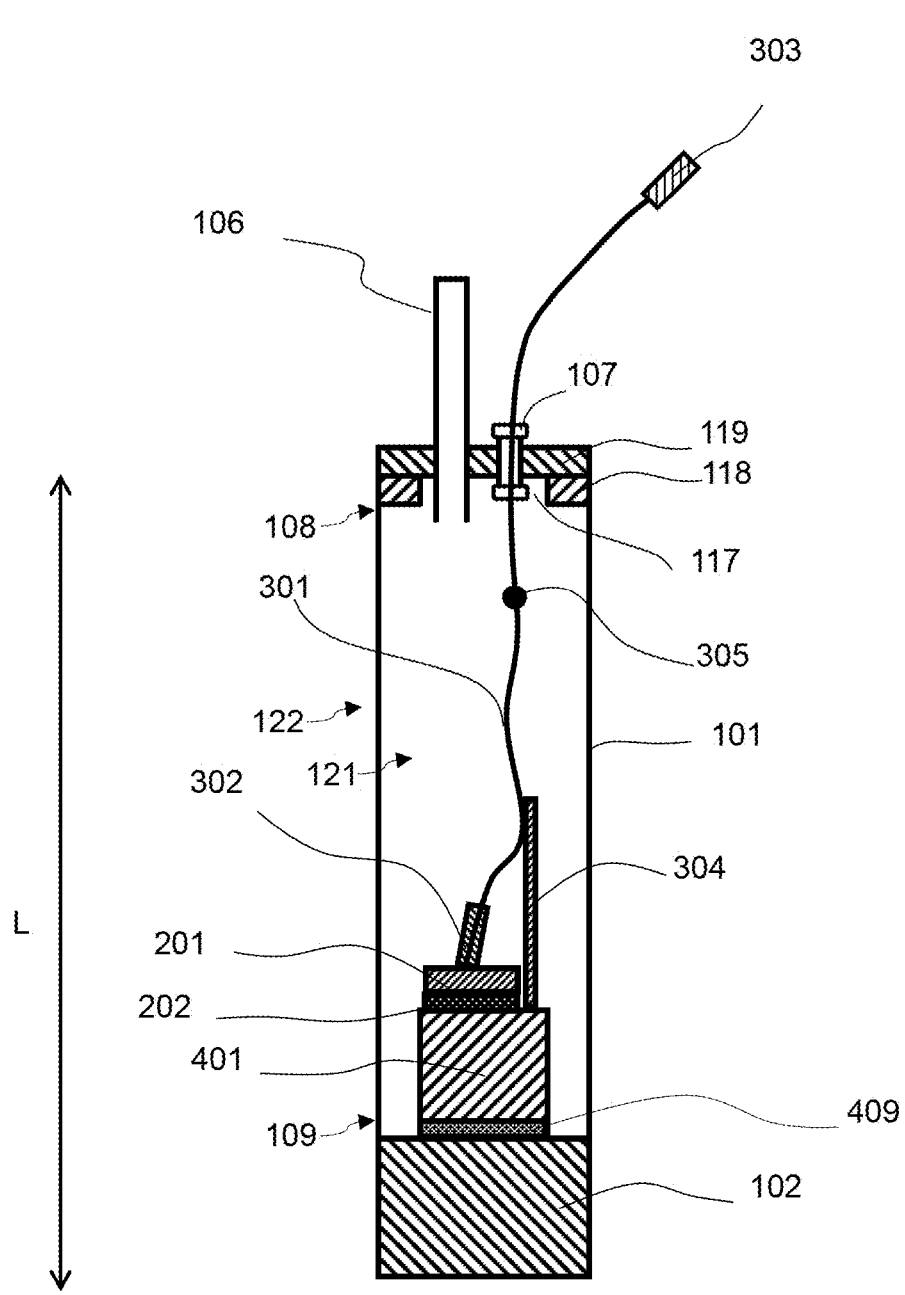
FIG. 11 shows a photonic thermometer module assembly, according to some embodiments.
Figure 12:
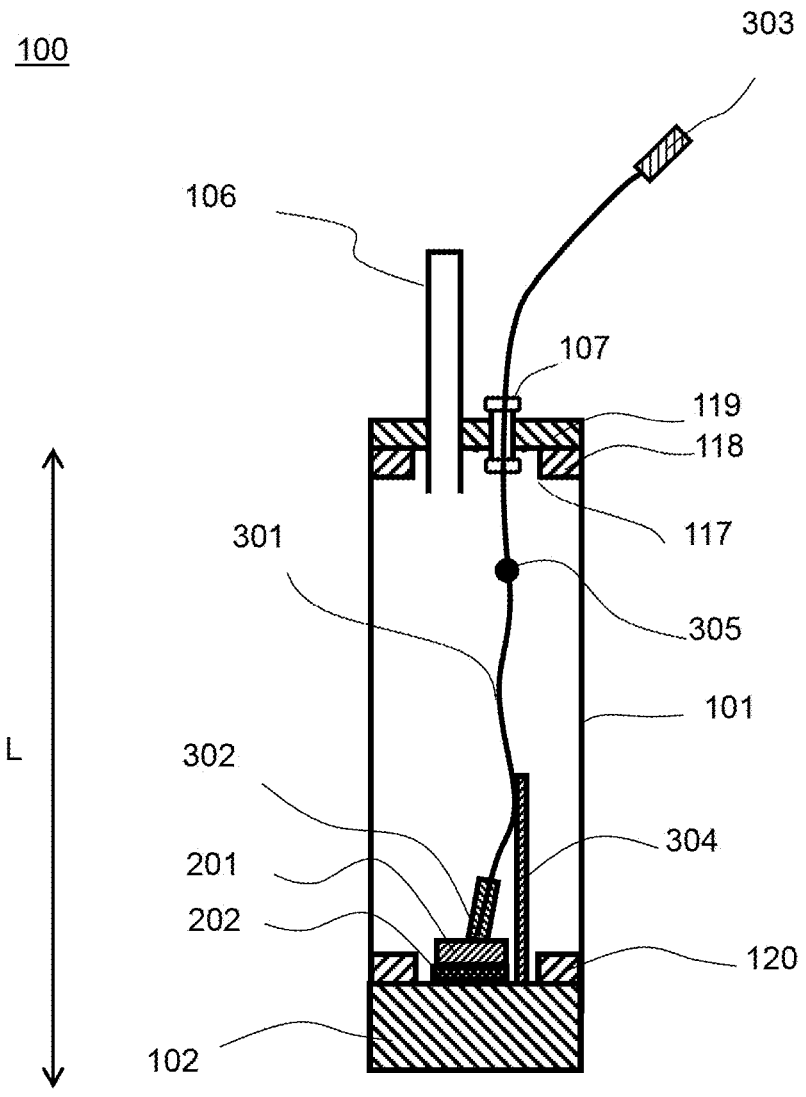
FIG. 12 shows a photonic thermometer module assembly, according to some embodiments.
Figure 13:
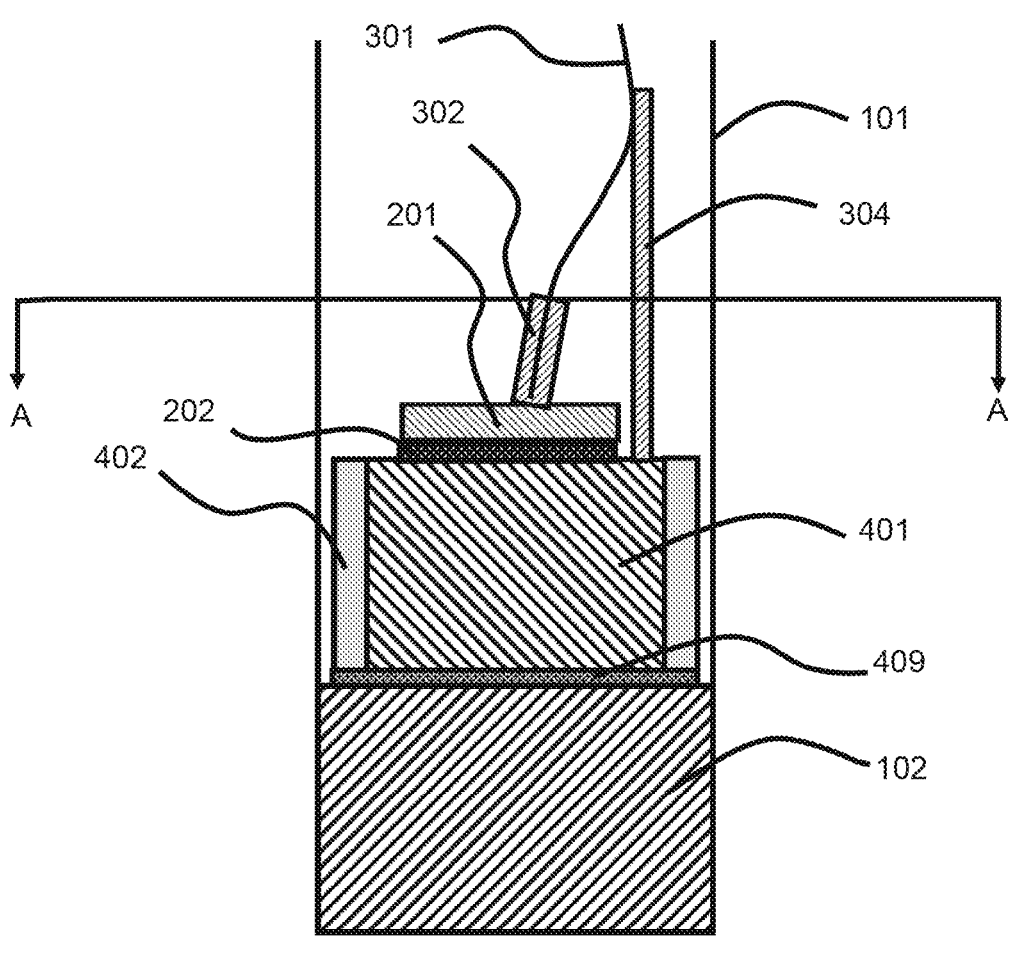
FIG. 13 shows features for a photonic thermometer module assembly, according to some embodiments.
Figure 13:
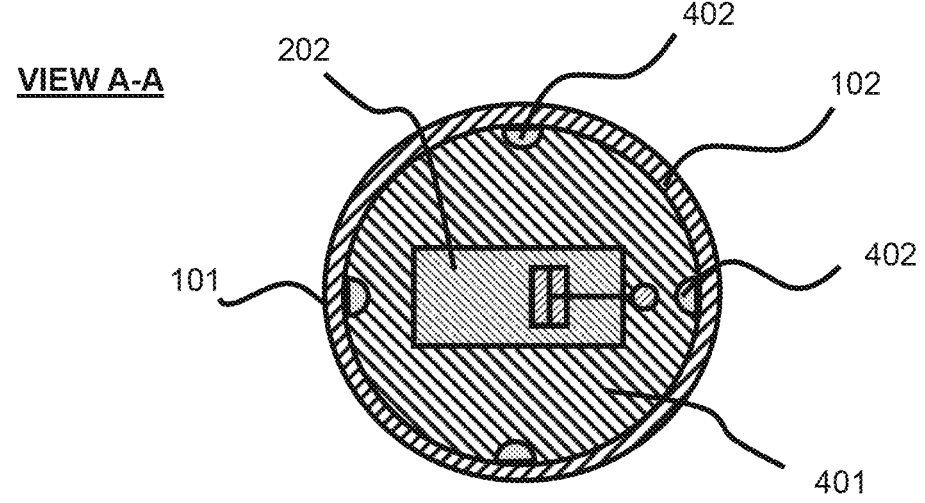

In an embodiment, sheath bottom plug 102 is connected to sheath 101 at second end 109 either directly (FIG. 1, FIG. 2, FIG. 8, FIG. 9, FIG. 10, FIG. 11) or via bottom inner-wall-mount flange 120 (FIG. 12). Bottom inner-wall-mount flange 120 can be attached in various mechanical ways such as being glued, welded, soldered, fused, or crimped to sheath 101. Sheath bottom plug 102 can be attached in various mechanical ways such as being glued, welded, soldered, fused, or crimped. Sheath bottom plug 102 can be absent from photonic thermometer module assembly 100 when sheath 101 includes a seal on its bottom end (e.g., a spherical shape weld) at second end 109.

In an embodiment, sheath top flange 103 is disposed on sheath 101 at first end 108 and opposes sheath bottom plug 102. Sheath top flange 103 can be attached in various mechanical ways such as being glued, welded, soldered, fused, or crimped to sheath 101. In photonic thermometer module assembly 100, sheath top flange 103 provides quick connecting or disconnecting of components of photonic thermometer module assembly 100 and provides high vacuum (HV) or ultra-high vacuum (UHV) level seal for sheath 101. Moreover, sheath top flange 103 can be sealed to maintain a selected pressure or gas composition in inner volume 121.

In an embodiment, flanged tee-coupler 110 includes a plurality of vacuum ports, e.g., three vacuum ports, each of which can be terminated with coupling flange 111. Flanged tee-coupler 110 is disposed on sheath top flange 103 to provide an HV or UHV level vacuum seal.

In an embodiment, vacuum valve 112 can be disposed on flanged tee-coupler 110, wherein an inlet or outlet port of vacuum valve 112 can include an HV or UHV connector interface. An outlet of vacuum valve 112 is disposed on coupling flange 111 of flanged tee-coupler 110. Vacuum valve 112 is used to evacuate inner volume 121 of sheath 101 or to fill inner volume 121 with a gas (e.g., an inert gas) to minimize an effect of environmental factors such as oxygen, humidity, or moisture on photonic thermometer 201. The inlet port of vacuum valve 112 can be blanked with vacuum valve plug 113 when vacuum valve 112 is left at a closed position for a period of time.

In certain embodiments, flanged tee-coupler 110, vacuum valve 112, or vacuum valve plug 113 is optional and can be absent in photonic thermometer module assembly 100, e.g., as shown in FIG. 8, FIG. 9, FIG. 10, FIG. 11, or FIG. 12.

In an embodiment, photonic thermometer module assembly 100 includes top sealing flange 104 disposed on sheath top flange 103 or coupling flange 111 of flanged tee-coupler 110. Top sealing flange 104 can have a circular through-flange top sealing flange aperture 117 located at a center of top sealing flange 104. Top sealing flange aperture 117 transfers photonic thermometer 201 with heat exchanger 401 into sheath 101.

In an embodiment, top flange plug 105 seals top sealing flange aperture 117 of top sealing flange 104 after photonic thermometer 201 disposed on heat exchanger 401 are disposed in sheath 101. The seal between top flange plug 105 and top sealing flange 104 can be a result of gluing, soldering, brazing, or a interposing a gasket (e.g., made of rubber, metal, or a composite) therebetween.

In an embodiment, exchange gas evacuation/filling tube 106 is disposed on top flange plug 105. Exchange gas evacuation/filling tube 106 can be attached to top sealing flange 104 such attachment can be a result of be gluing, welding, soldering, brazing, or fusing exchange gas evacuation/filling tube 106 to plug top sealing flange 104. Exchange gas evacuation/filling tube 106 is in fluid communication with inner volume 121 to evacuate sheath 101 or to fill sheath 101 with gas (e.g., an inert gas) to minimize the effect of environmental factors such as oxygen, humidity, or moisture on photonic thermometer 201. After evacuating inner volume 121 of sheath 101 or filling sheath 101 with gas, exchange gas evacuation/filling tube 106 is sealed, e.g., by splicing, cold fusion, crimping, soldering, welding, and the like. Exchange gas evacuation/filling tube 106 can be made from a metal such as copper, nickel, stainless steel, metal alloy, and the like.

Figure 3:
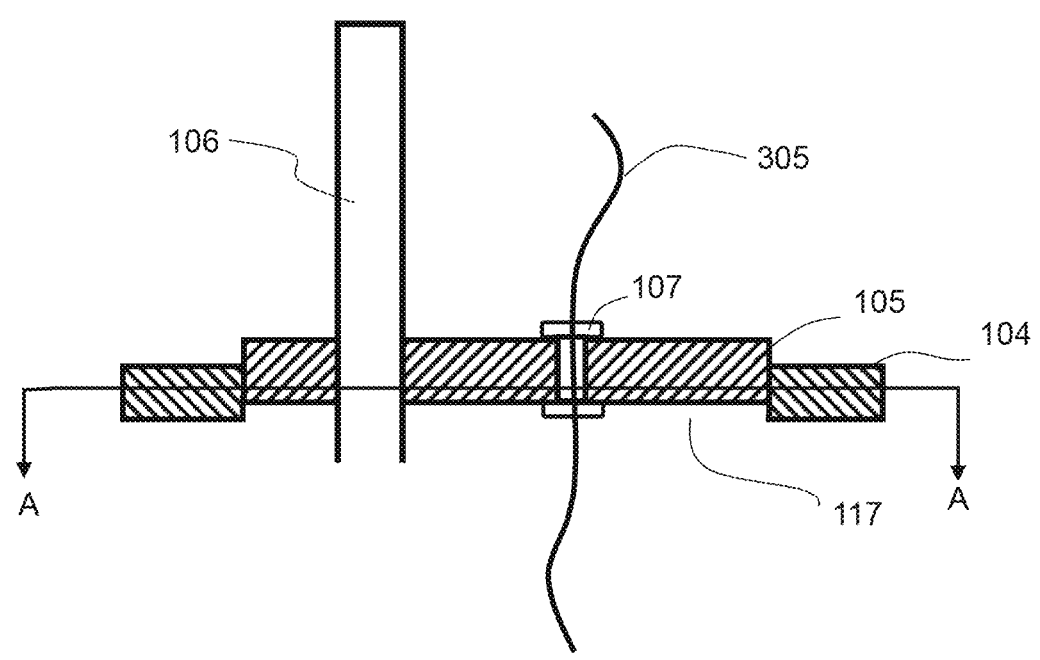
FIG. 3 shows features for a photonic thermometer module assembly such as an optical fiber feedthrough disposed on a top flange plug, according to some embodiments.
Figure 3:
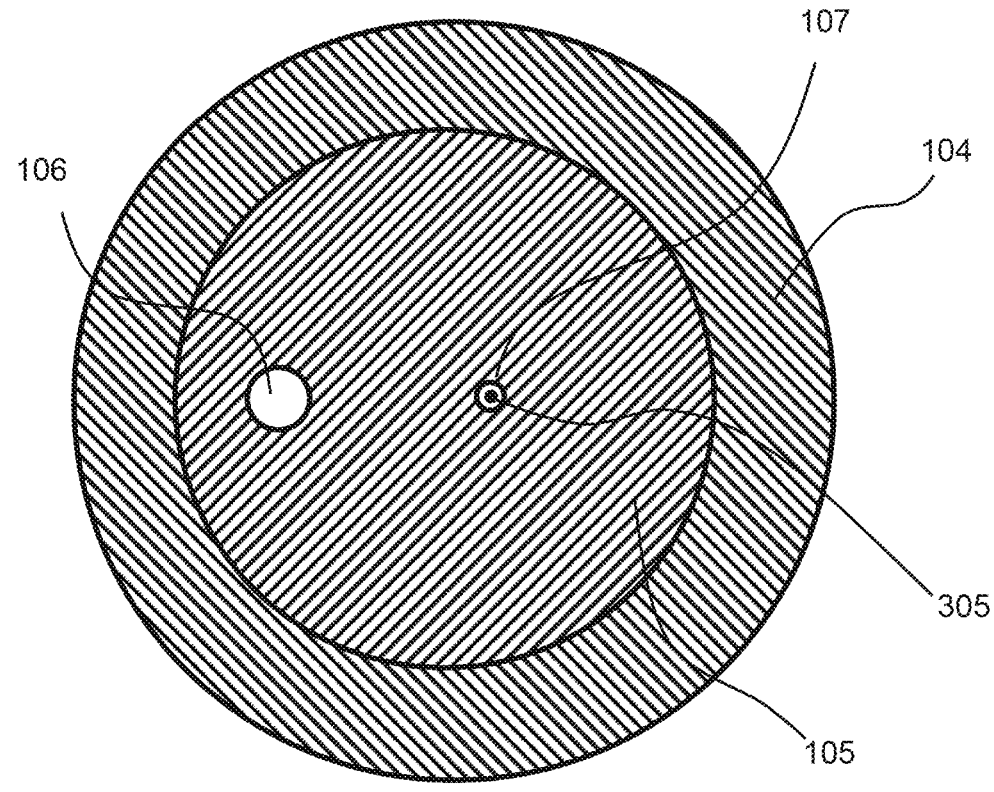
Figure 4:
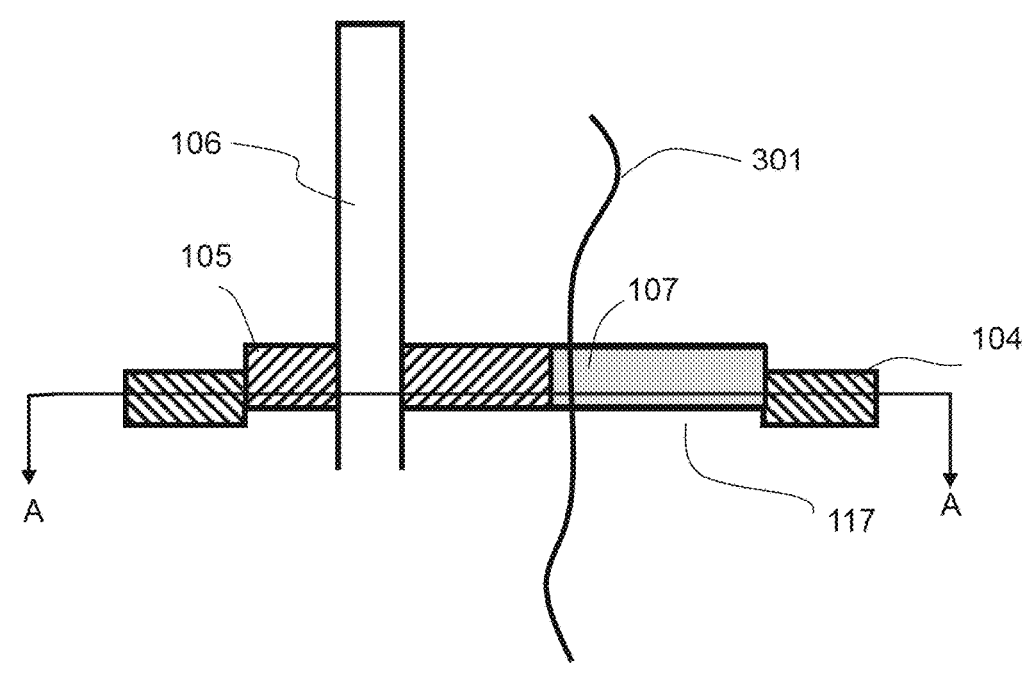
FIG. 4 shows features for a photonic thermometer module assembly such as an optical fiber feedthrough disposed on a top flange plug, according to some embodiments.
Figure 4:
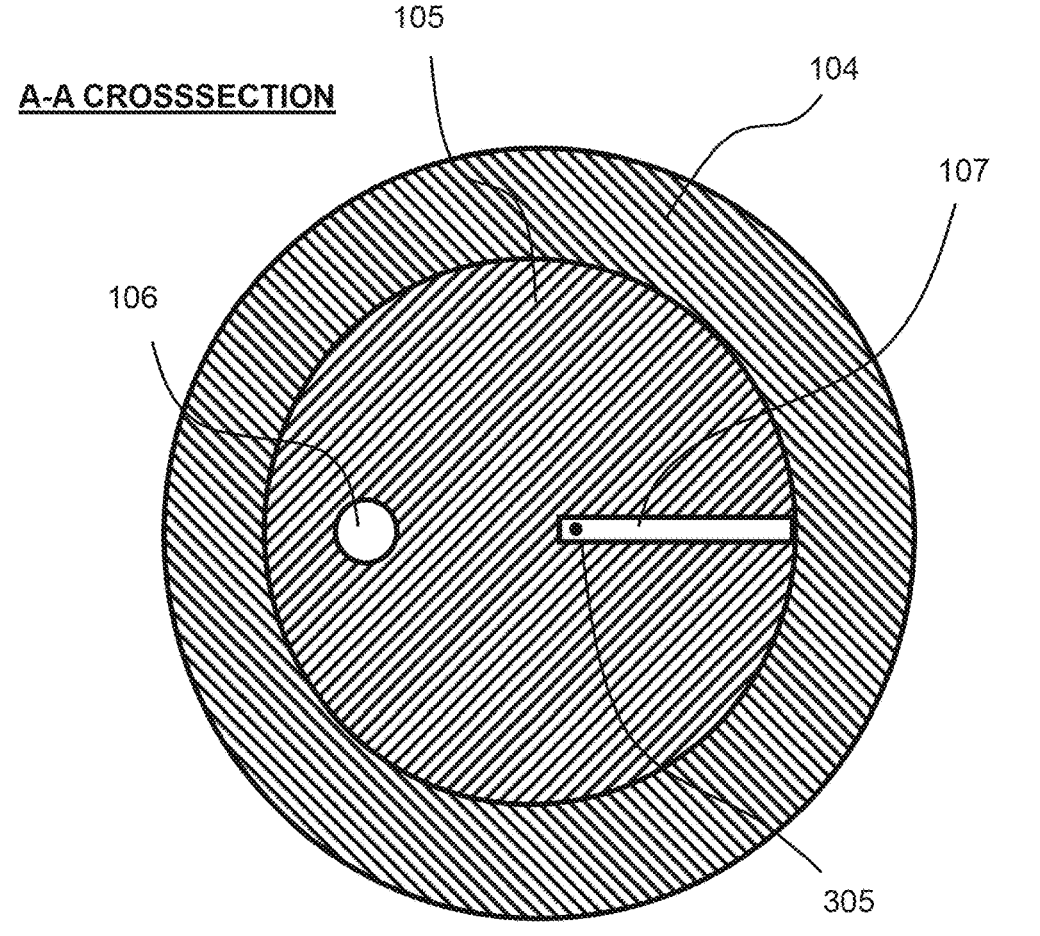
Figure 5:
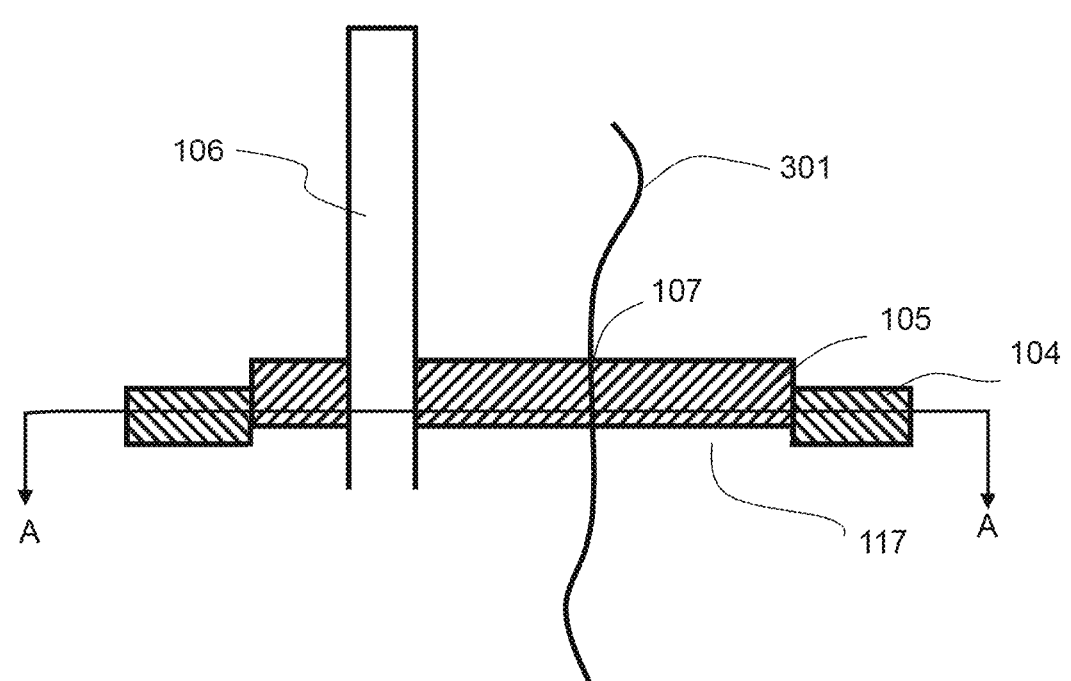
FIG. 5 shows features for a photonic thermometer module assembly such as an optical fiber feedthrough disposed on a top flange plug, according to some embodiments.
Figure 5:
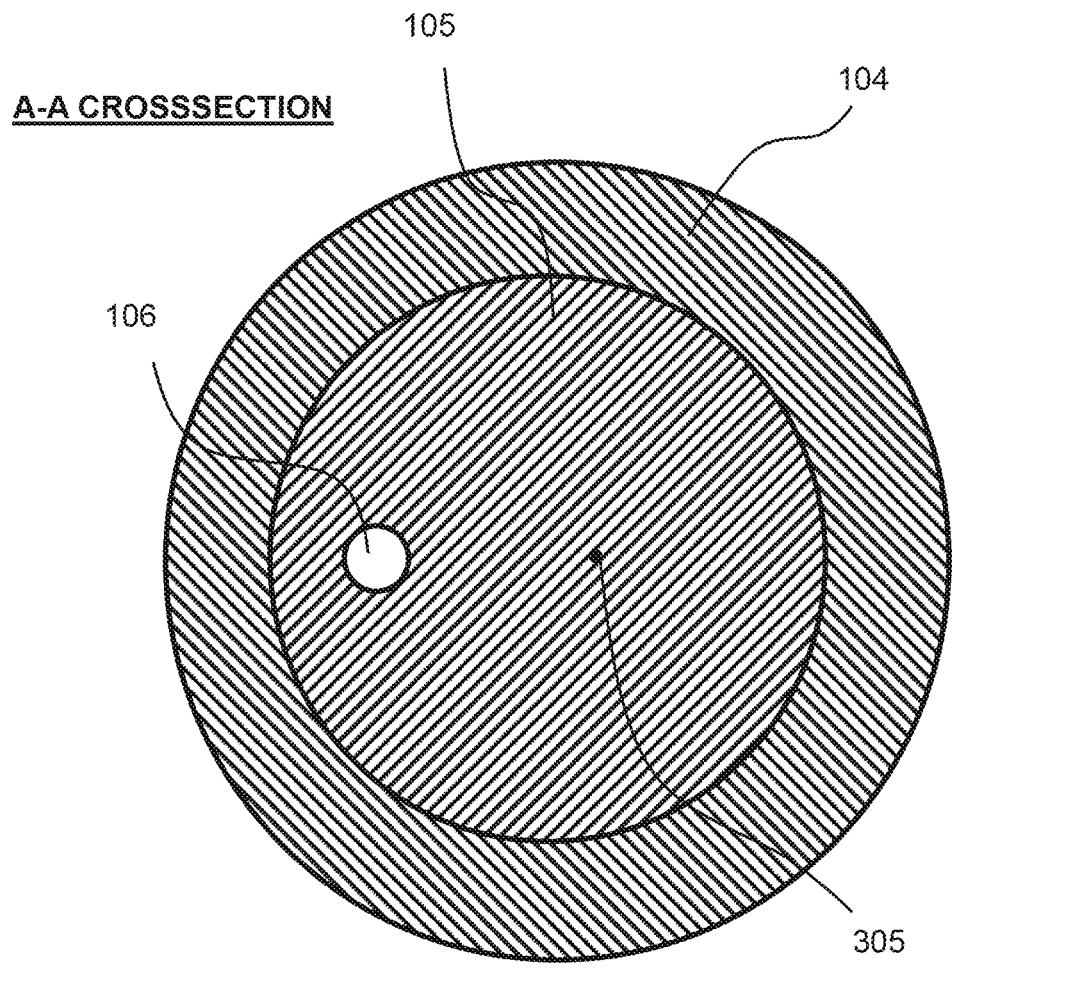

In an embodiment, top flange plug 105 includes optical fiber feedthrough 107 to communicate optical fibers, e.g., optical fiber array 301, through top flange plug 105 from exterior 122 into inner volume 121. Optical fiber feedthrough 107 can be disposed in top flange plug 105 (FIG. 3) such that optical fiber array 301 is communicated through optical fiber feedthrough 107. In an embodiment, optical fiber array 301 is disposed in top flange plug 105 such that optical fiber array 301 is in direct contact with top flange plug 105 (FIG. 5). As shown in FIG. 5, optical fiber array 301 can be communicated to inner volume 121 via a fiber slit in top flange plug 105 (FIG. 4).

Figure 6:
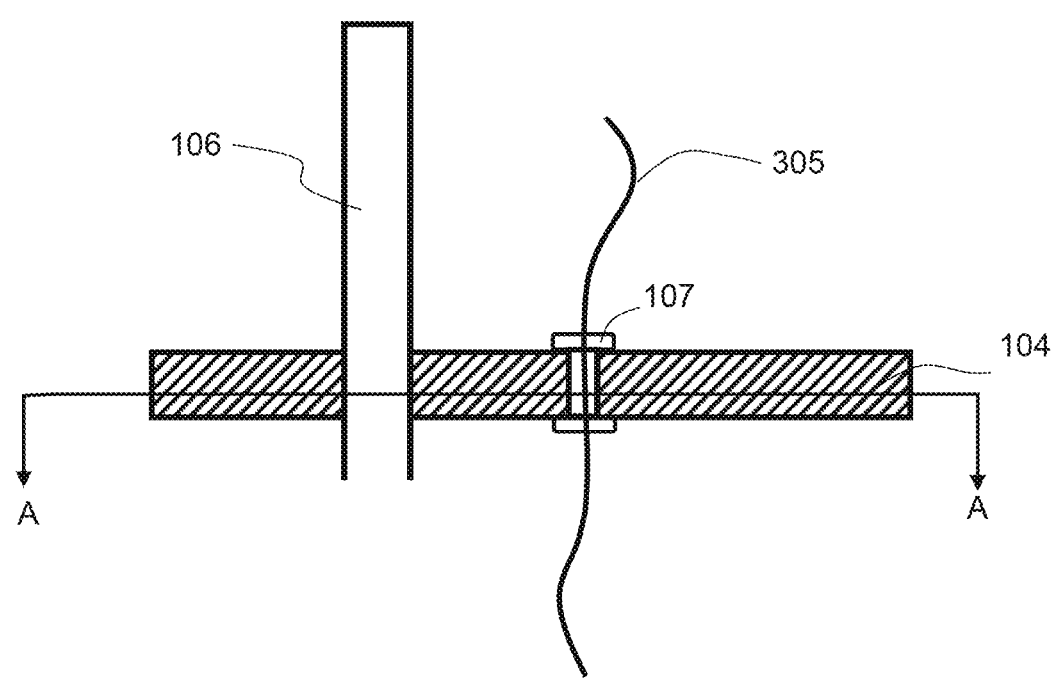
FIG. 6 shows features for a photonic thermometer module assembly such as an optical fiber feedthrough disposed on a top sealing flange, according to some embodiments.
Figure 6:
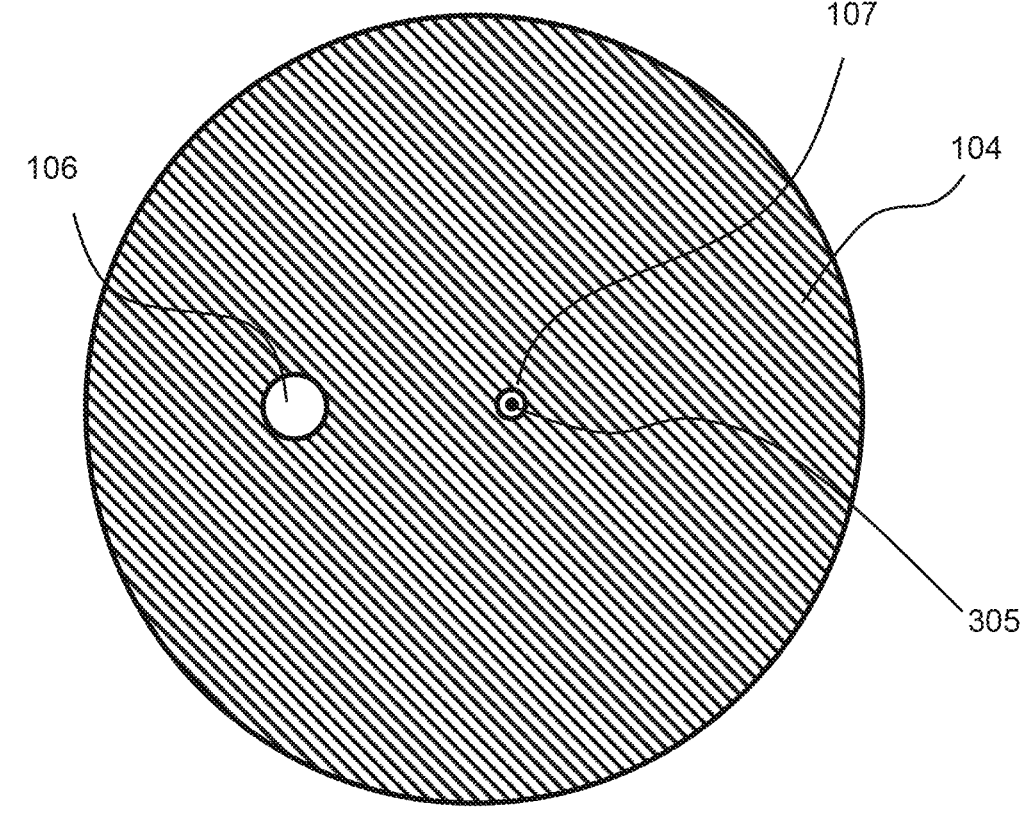
Figure 7:
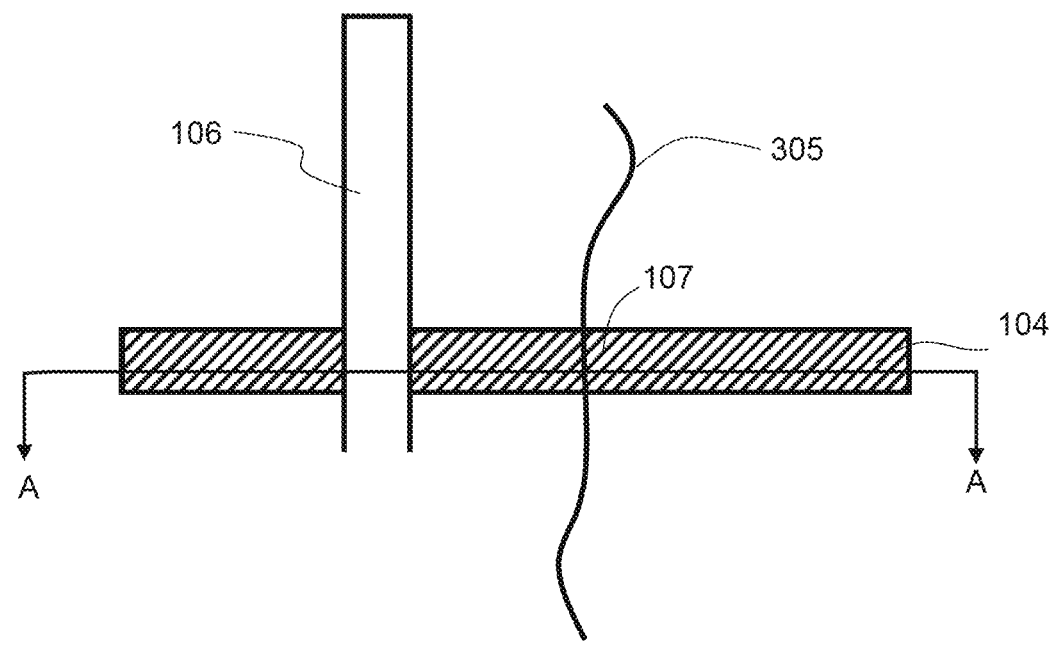
FIG. 7 shows features for a photonic thermometer module assembly such as an optical fiber feedthrough disposed on a top sealing flange, according to some embodiments.
Figure 7:
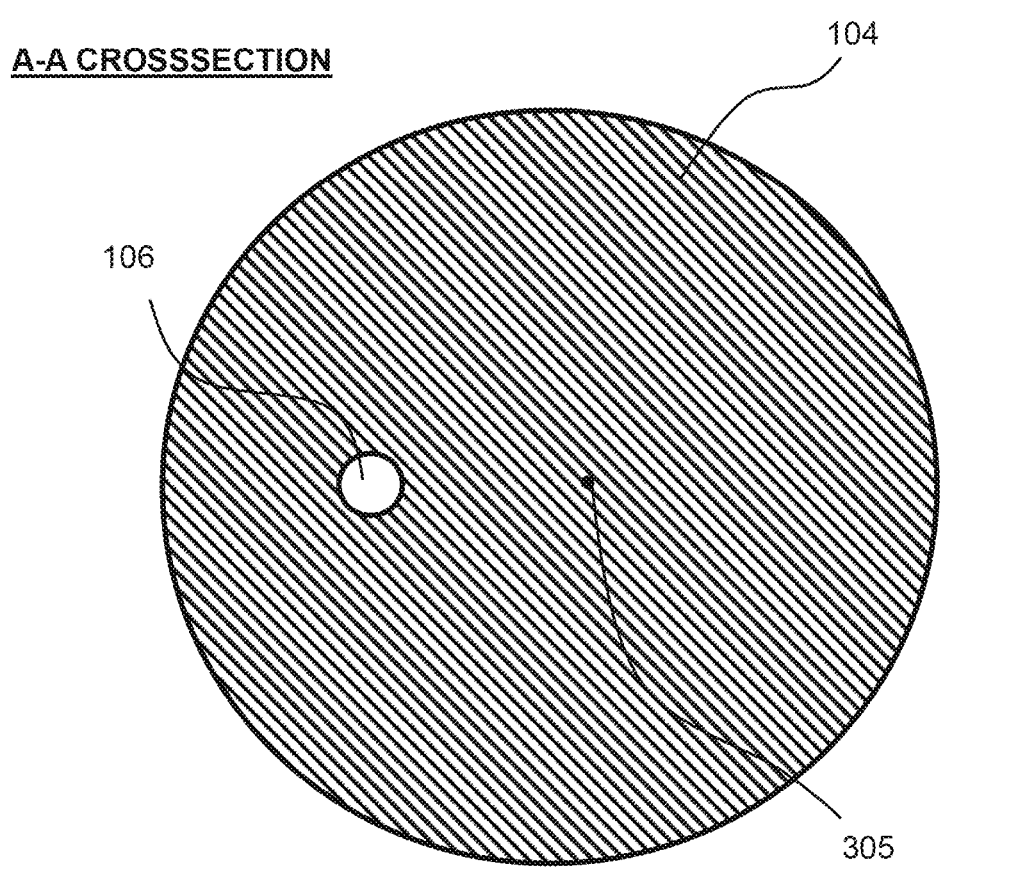
Figure 8:
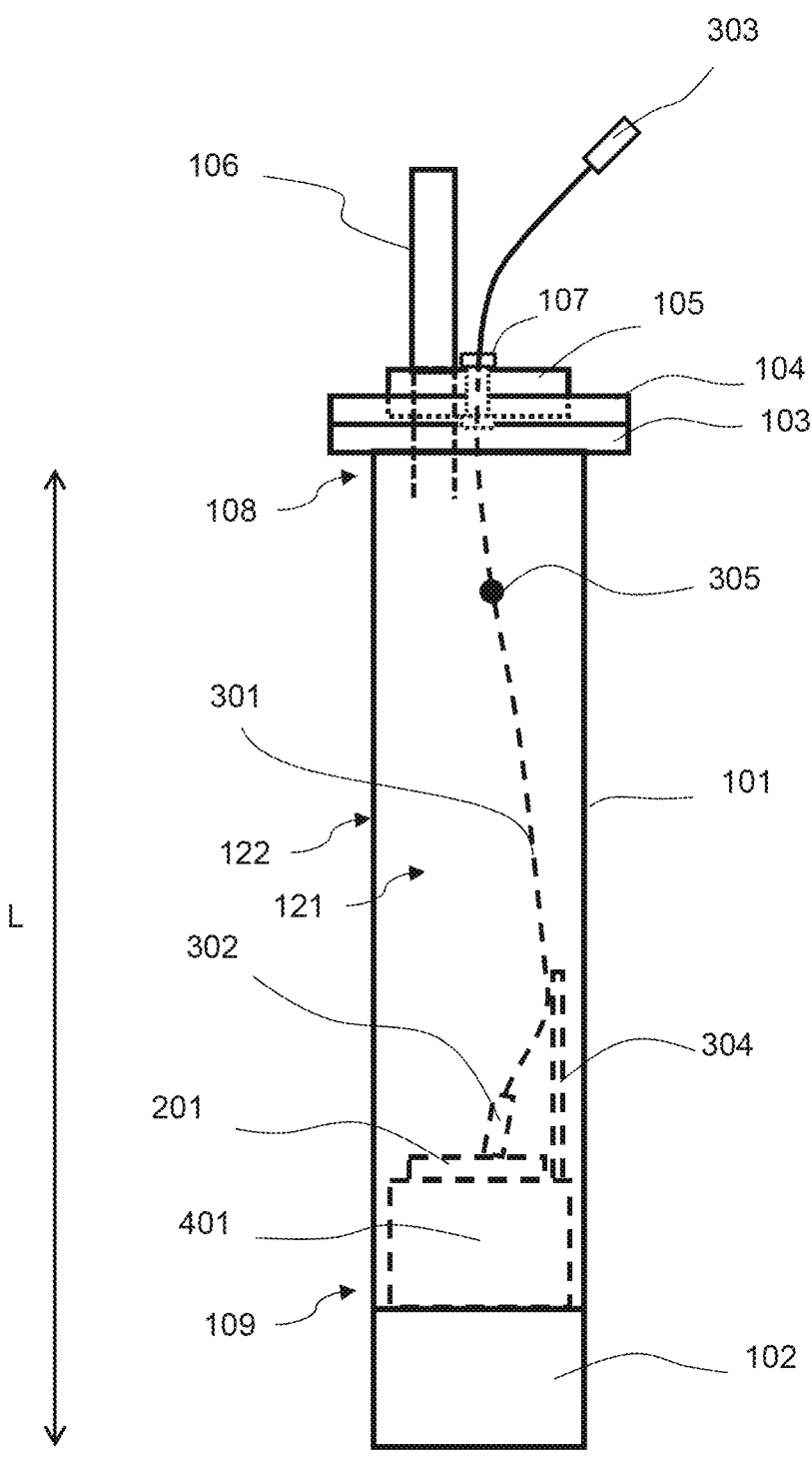
FIG. 8 shows a photonic thermometer module assembly, according to some embodiments.

In an embodiment, top flange plug 105 is optionally absent when top sealing flange 104, in place of aperture top sealing flange aperture 117, includes exchange gas evacuation/filling tube 106 and optical fiber feedthrough 107 (FIG. 6, FIG. 7).

In an embodiment, various flanged elements, e.g., sheath top flange 103, top sealing flange 104, coupling flange 111, or vacuum valve plug 113, in combination together form an HV or UHV level vacuum seal using a gasket that include a metal, metal alloy, elastomer (e.g., rubber), plastic, composite material, and the like.

In an embodiment, photonic thermometer module assembly 100 includes optical fiber support collar 114 disposed on top sealing flange 104, wherein optical fiber support collar 114 mechanically supports optical fiber array 301 proximate to optical fiber feedthrough 107. Optical fiber support collar 114 can include optical fiber support fin 115 that supports optical fiber array 301 and minimizes sharp bending of optical fiber array 301. If optical fiber array 301 is terminated with fiber connector 303, fiber connector 303 can be disposed on optical fiber support collar 114. Optical fiber support collar 114 can be made from a plastic, polymeric, composite material, and the like.

In an embodiment, with reference to FIG. 8, FIG. 9, FIG. 10, FIG. 11, FIG. 12, and FIG. 33, photonic thermometer module assembly 100 includes a configuration of elements, wherein certain element are absent such as flanged tee-coupler 110, vacuum valve 112, vacuum valve plug 113, or optical fiber support collar 114. The embodiments of photonic thermometer module assembly 100 shown in FIG. 8, FIG. 9, FIG. 10, FIG. 11, FIG. 12, and FIG. 33 can be a minimum configuration for performing photonic thermometry with photonic thermometer module assembly 100.

Figure 9:
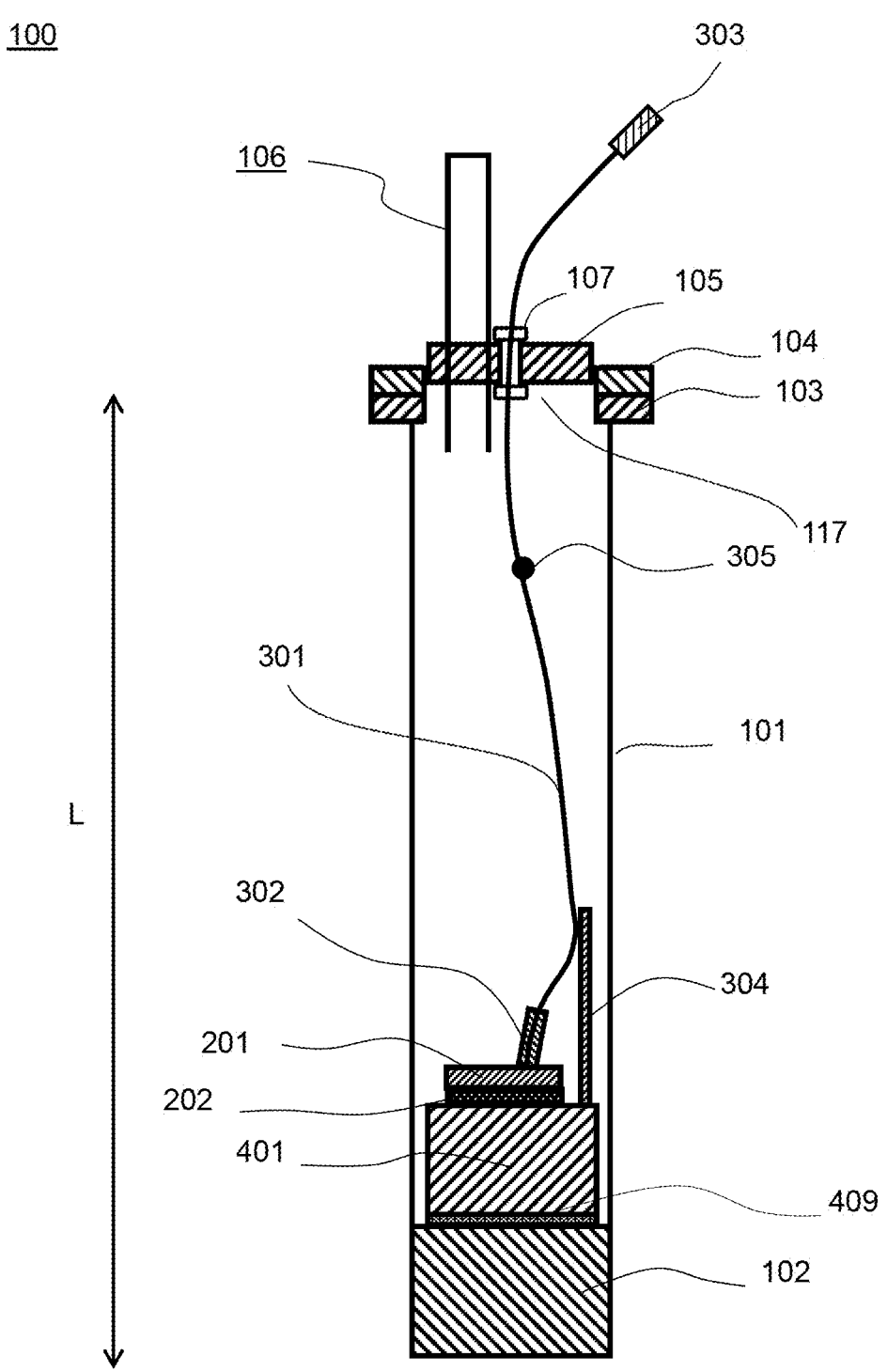
FIG. 9 shows a photonic thermometer module assembly, according to some embodiments.
Figure 10:
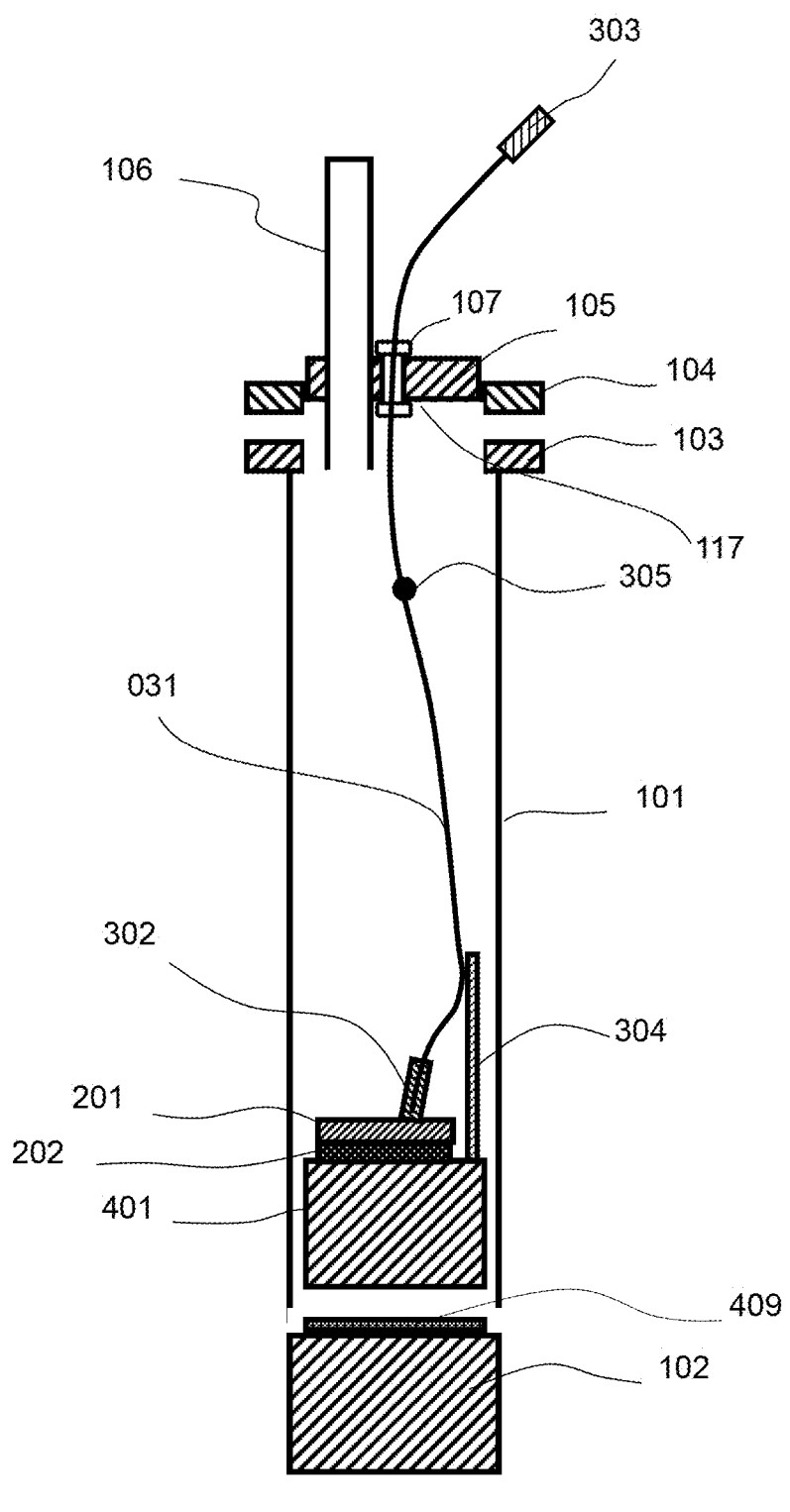
FIG. 10 shows an exploded view of a photonic thermometer module assembly, according to some embodiments.

In an embodiment, sheath bottom plug 102 is permanently attached to sheath 101 (e.g., as shown in FIG. 1, FIG. 9, or FIG. 11). Attachment can be made via gluing, soldering, welding, brazing, and the like. In an embodiment, sheath bottom plug 102 is detachably fastened to sheath 101 such that fastening can occur by a joint such as a flange-type joint that provides detachment and reattachment, wherein sheath bottom plug 102 is removable from sheath 101 (FIG. 12).

In an embodiment, photonic thermometer module assembly 100 has minimalistic dimensions, wherein first end 108 of sheath 101 is sealed with top seal plug 119 (FIG. 11, FIG. 12). Top seal plug 119 can be attached to top inner-wall-mount flange 118, wherein top inner-wall-mount flange 118 can be glued, welded, soldered, brazed, and the like to sheath 101. Top seal plug 119 can be permanently attached to sheath 101 directly or indirectly via top inner-wall-mount flange 118, e.g., by welding, soldering, gluing, brazing, and the like, or can be removably attached via a flange-type joint with a sealing gasket interposed between top seal plug 119 and top inner-wall-mount flange 118.

In an embodiment, with reference to FIG. 12, to reduce size L of photonic thermometer module assembly 100, photonic thermometer 201 is disposed directly on sheath bottom plug 102. It is contemplated that thermally conductive layer 202 can be interposed between photonic thermometer 201 and sheath bottom plug 102. Directly disposing photonic thermometer 201 on sheath bottom plug 102 can provide better thermal coupling of photonic thermometer 201 and external environment in which photonic thermometer module assembly 100 is disposed.

In an embodiment, sheath bottom plug 102 is disposed on bottom inner-wall-mount flange 120. Bottom inner-wall-mount flange 120 can be attached to bottom inner-wall-mount flange 120 as a result of being glued, welded, soldered, brazed, and the like to sheath 101. Sheath bottom plug 102 can be permanently attached to sheath 101 directly or to bottom inner-wall-mount flange 120 via welding, soldering, gluing, brazing, and the like or can be removably connected via a flange-type joint with a sealing gasket interposed between sheath bottom plug 102 and bottom inner-wall-mount flange 120.

In an embodiment, photonic thermometer module assembly 100 includes optical fiber array 301 disposed in inner volume 121 of sheath 101. Optical fiber array 301 is guided via optical fiber feedthrough 107. Optical fiber array 301 can include one optical fiber, an optical fiber bundle that includes a plurality of individual optical fibers, or an optical fiber ribbon that incudes joined together optical fibers. One end of optical fiber array 301 can be connected to photonic thermometer 201 directly or via optical fiber expander 302. The other end of optical fiber array 301 can be terminated with fiber connector 303.

Figure 37:
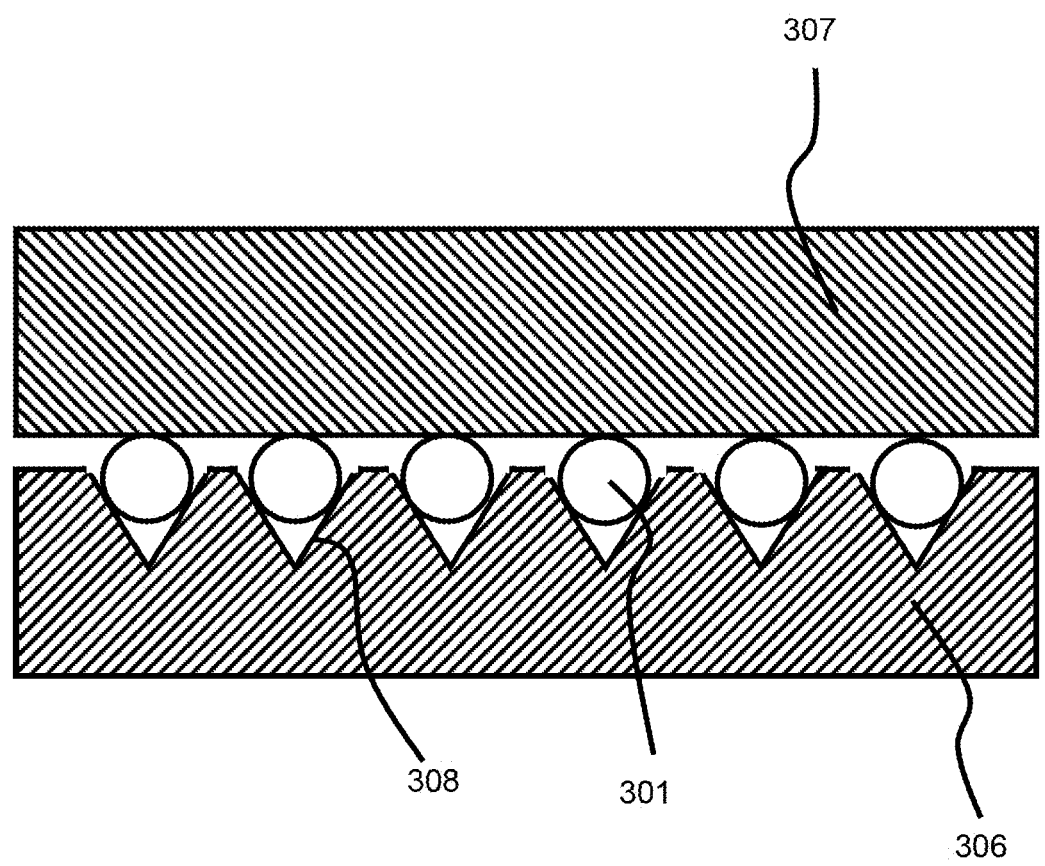
FIG. 37 shows an optical fiber expander, according to some embodiments.
Figure 38:
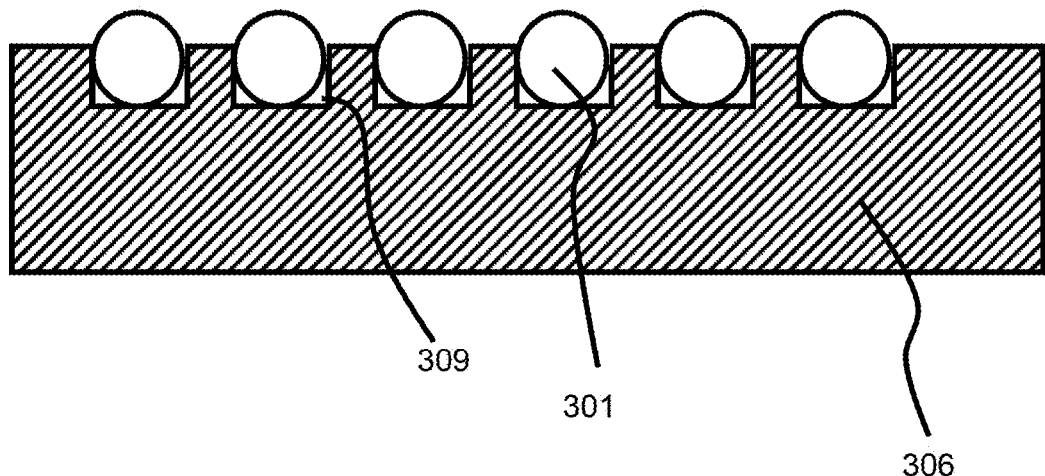
FIG. 38 shows an optical fiber expander, according to some embodiments.
Figure 39:
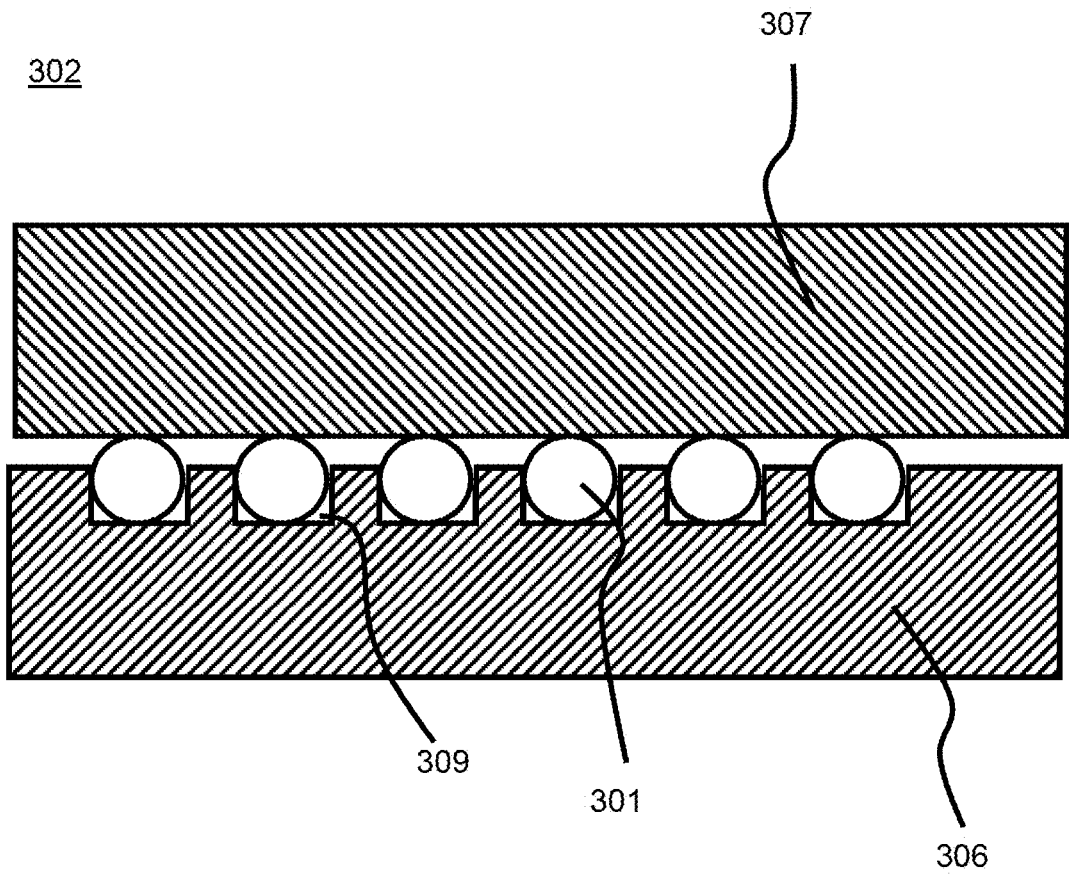
FIG. 39 shows an optical fiber expander, according to some embodiments.

In an embodiment, optical fiber expander 302 can include V-shaped grooves or U-shaped grooves such as V-shape fiber groove 308 or U-shape fiber groove 309 that can be micromachined or etched in fiber expander base 306. The one-dimensional (1D) array of optical fiber array 301 can be positioned along these V-shape fiber groove 308 or U-shape fiber groove 309 as shown in FIG. 36, FIG. 37, FIG. 38, or FIG. 39. Optical fiber array 301 can be secured in place with fiber expander cap 307, which can be attached (e.g., glued, bonded, or fused) to fiber expander base 306 (FIG. 37, FIG. 39).

Figure 29:
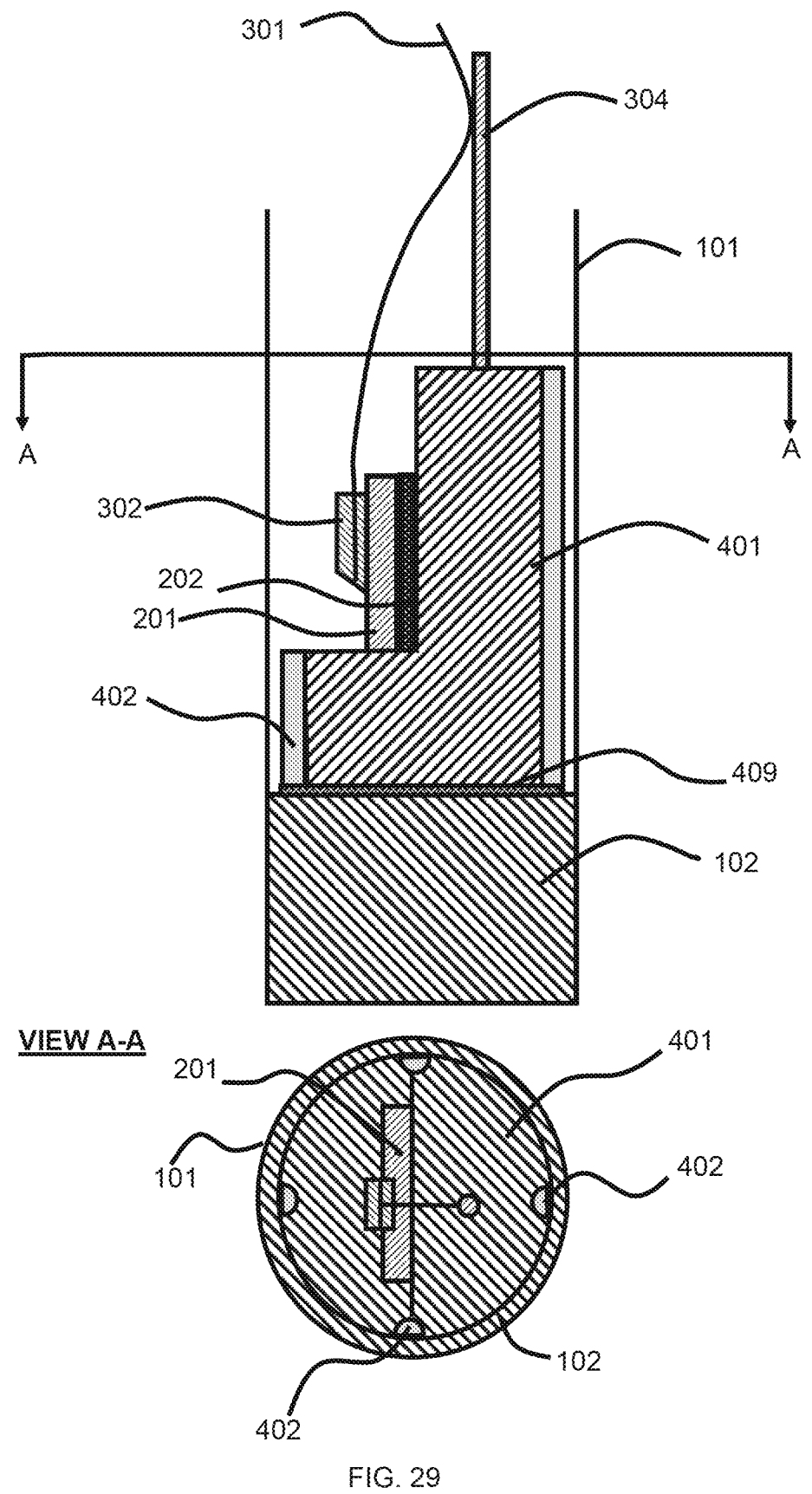
FIG. 29 shows features for a photonic thermometer module assembly, according to some embodiments.
Figure 30:
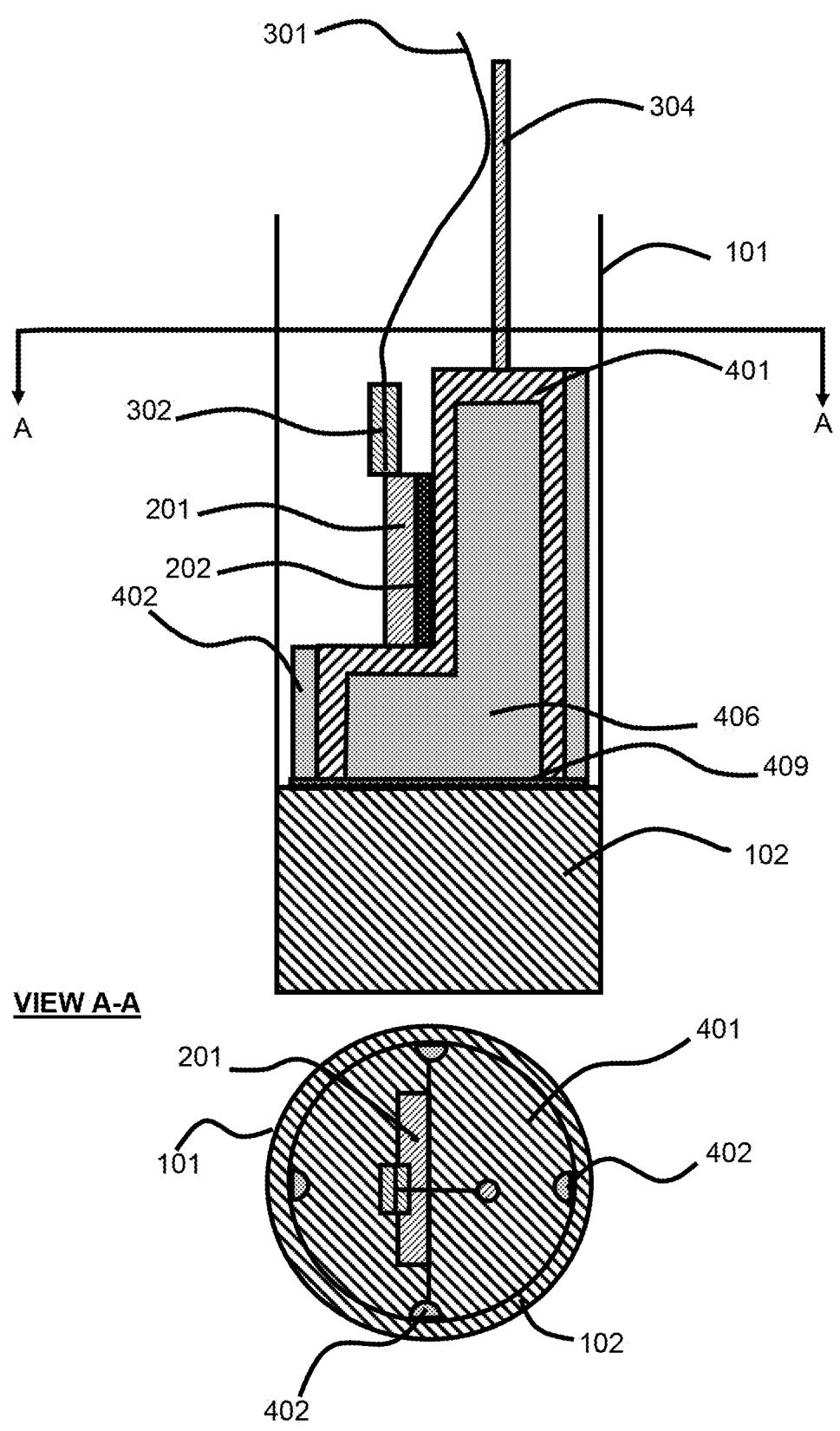
FIG. 30 shows features for a photonic thermometer module assembly, according to some embodiments.
Figure 31:
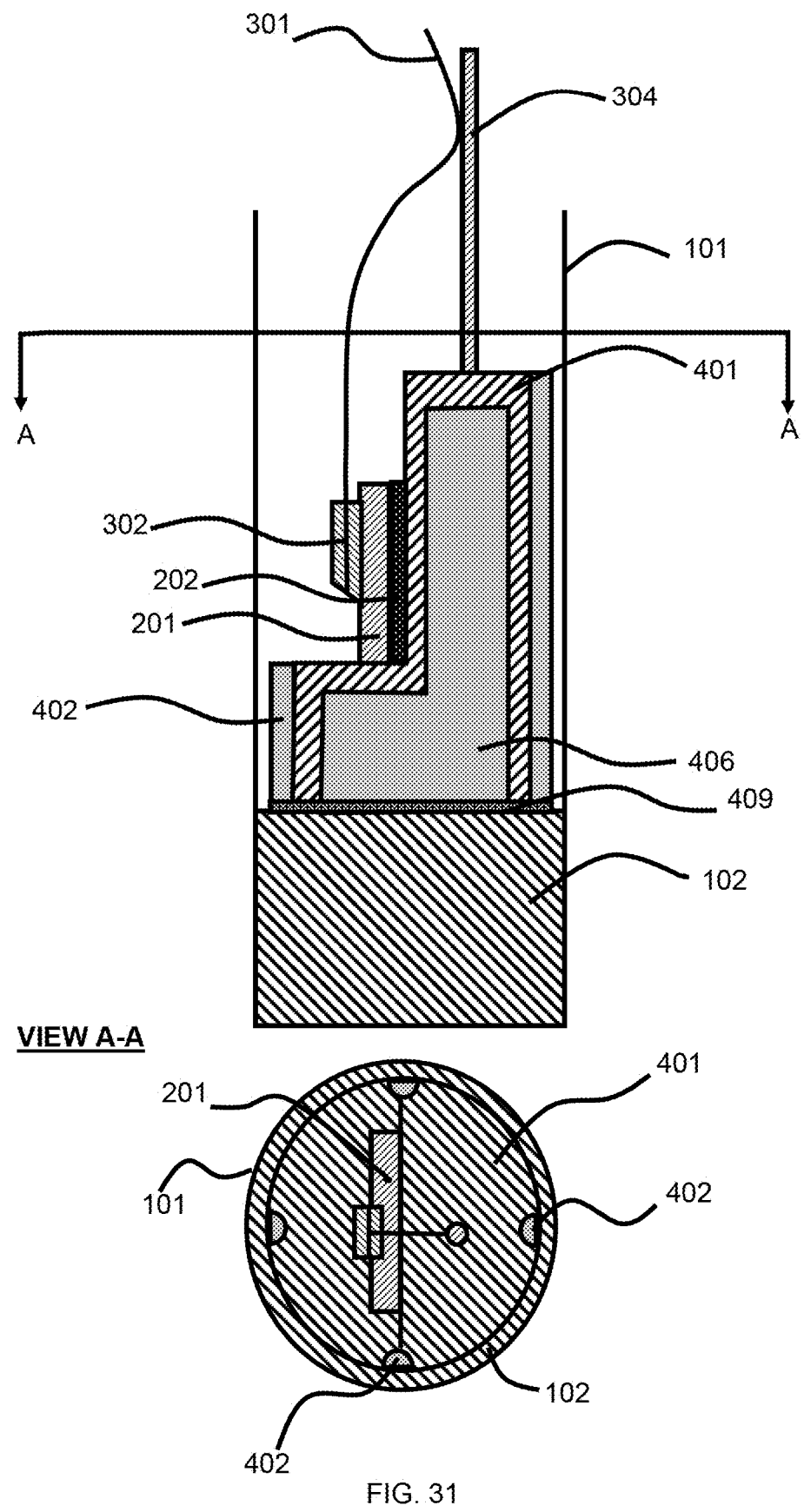
FIG. 31 shows features for a photonic thermometer module assembly, according to some embodiments.
Figure 32:
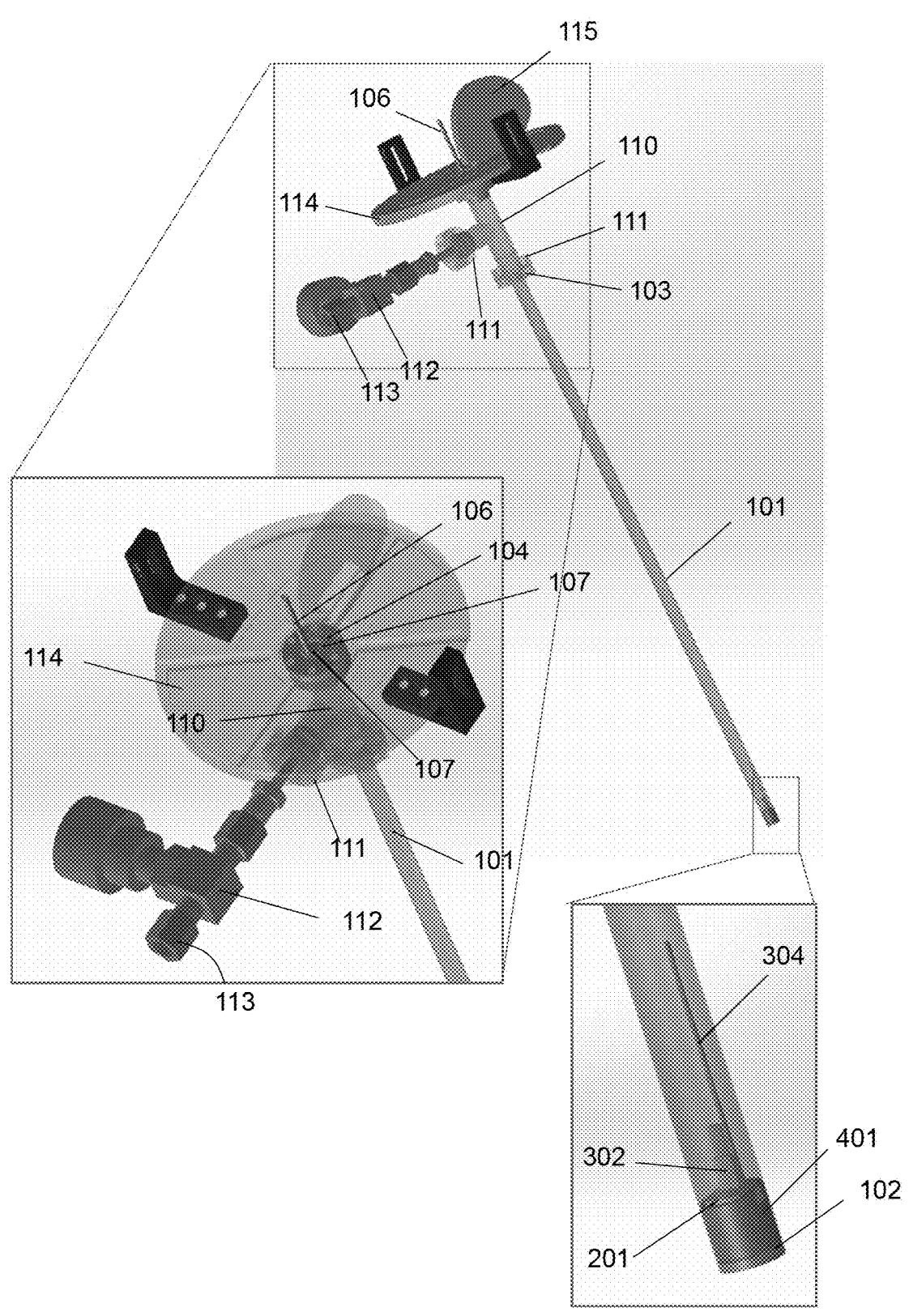
FIG. 32 shows a photonic thermometer module assembly, according to some embodiments.
Figure 33:
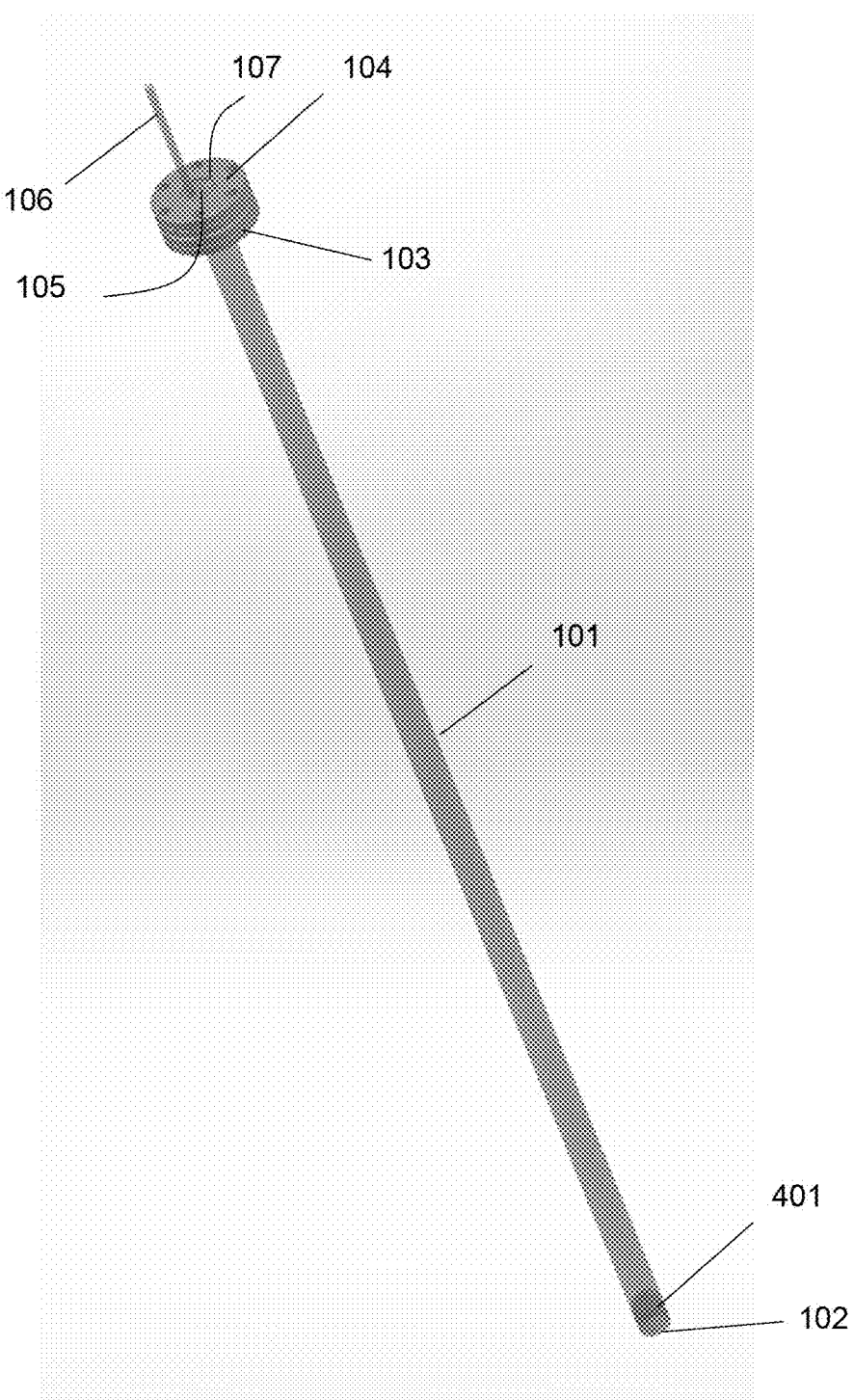
FIG. 33 shows a photonic thermometer module assembly, according to some embodiments.
Figure 34:
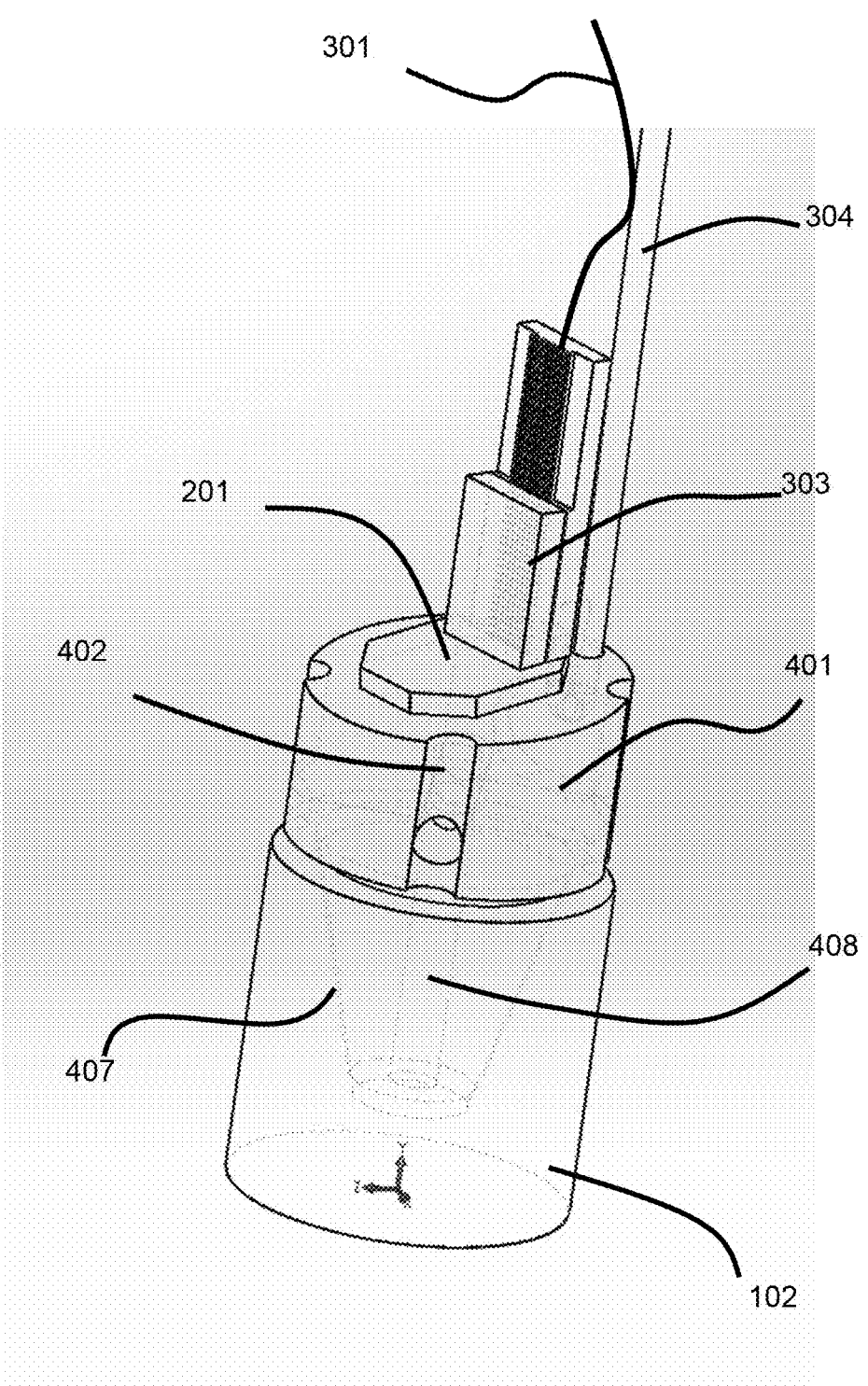
FIG. 34 shows features for a photonic thermometer module assembly, according to some embodiments.
Figure 40:
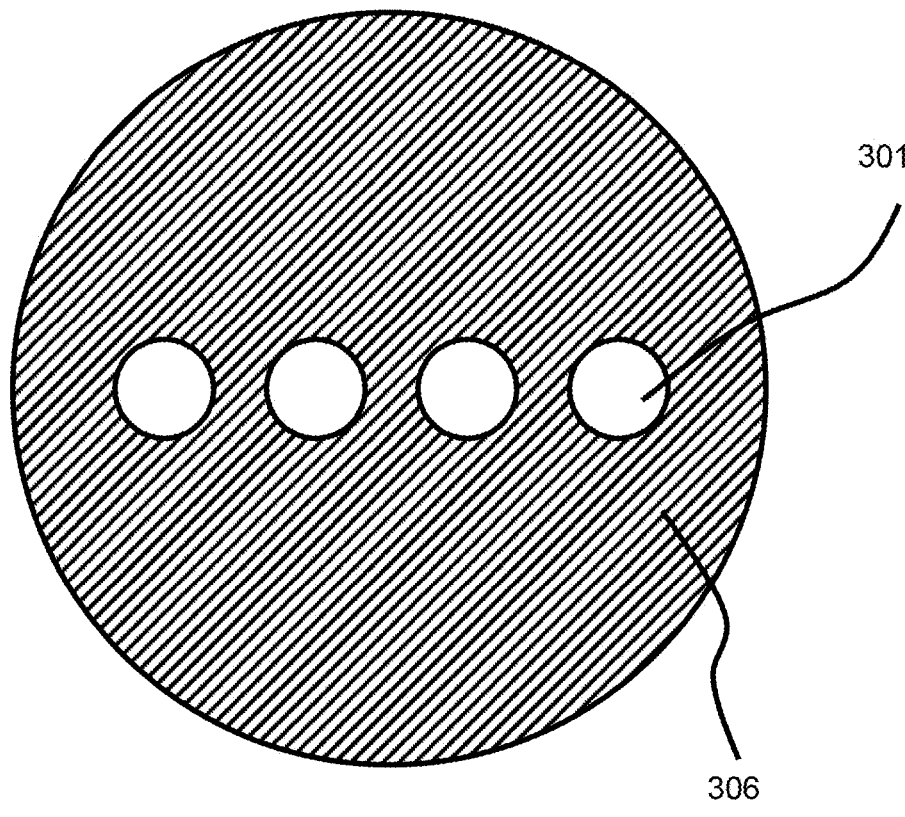
FIG. 40 shows an optical fiber array disposed on a fiber expander base for a photonic thermometer module assembly, according to some embodiments.
Figure 41:
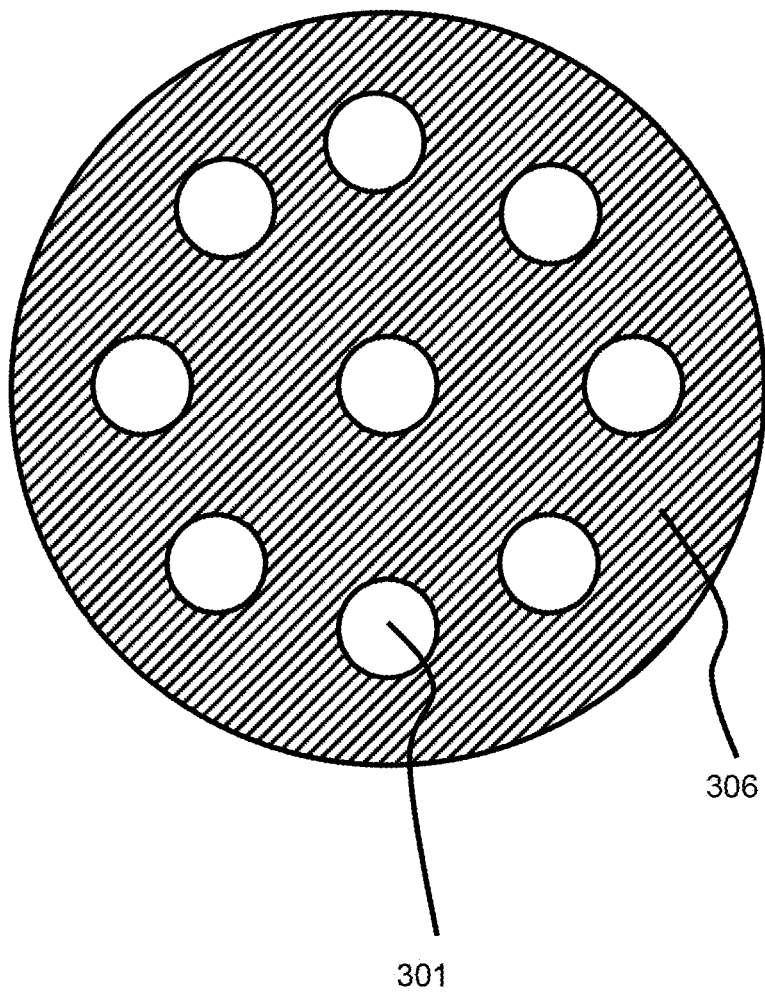
FIG. 41 shows an optical fiber array disposed on a fiber expander base for a photonic thermometer module assembly, according to some embodiments.
Figure 42:
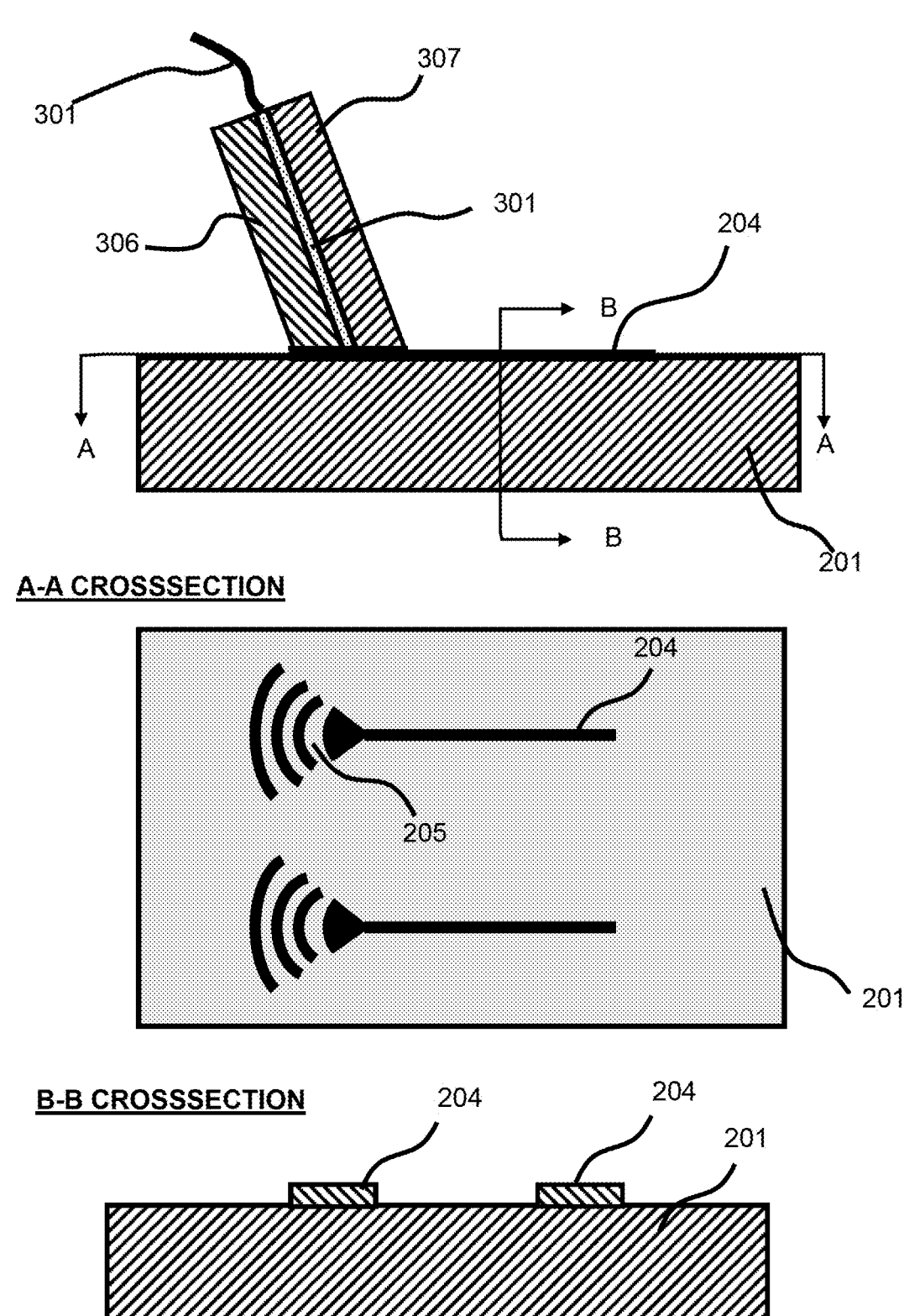
FIG. 42 shows an optical fiber array disposed on a photonic thermometer for a photonic thermometer module assembly, according to some embodiments.
Figure 43:
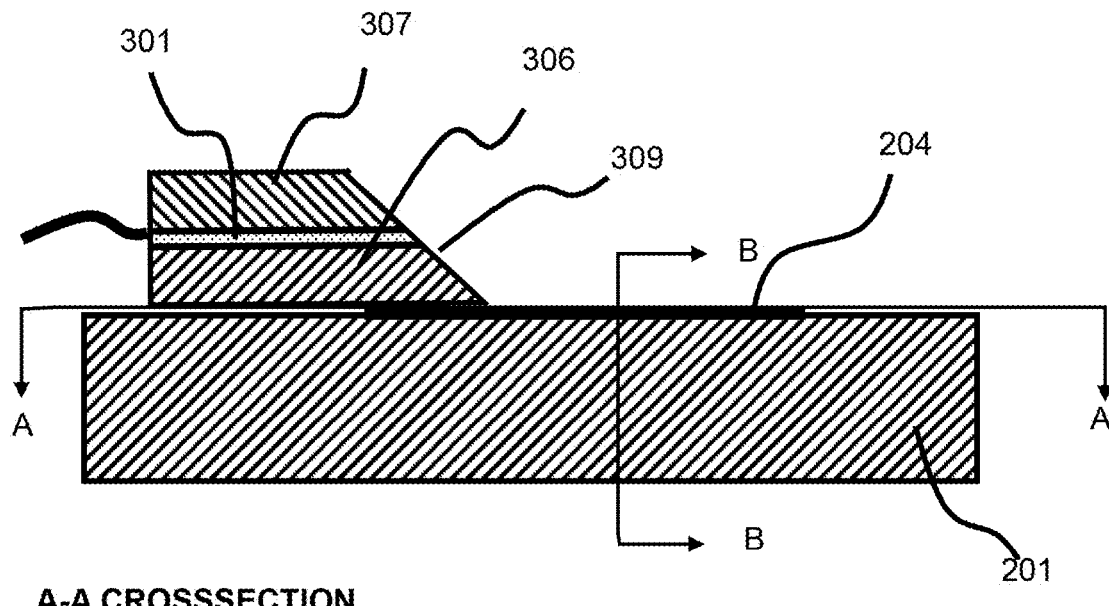
FIG. 43 shows an optical fiber array disposed on a photonic thermometer for a photonic thermometer module assembly, according to some embodiments.
Figure 43:
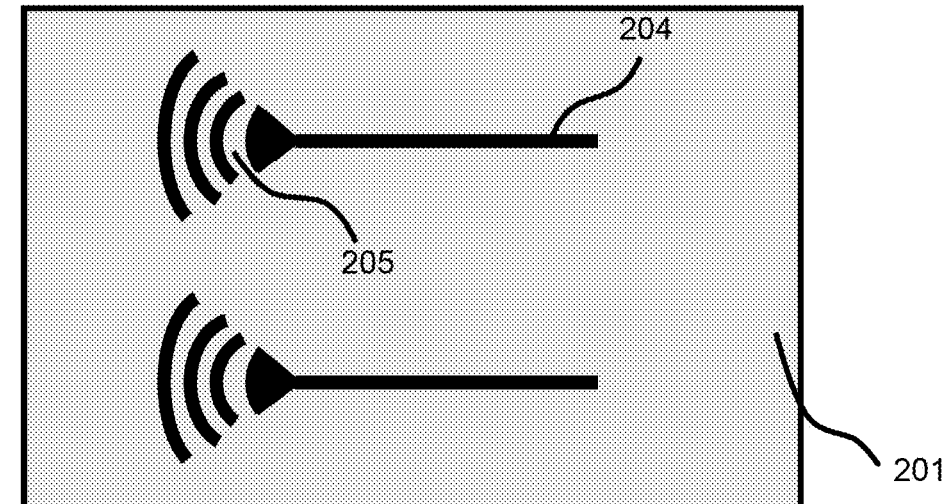
Figure 43:
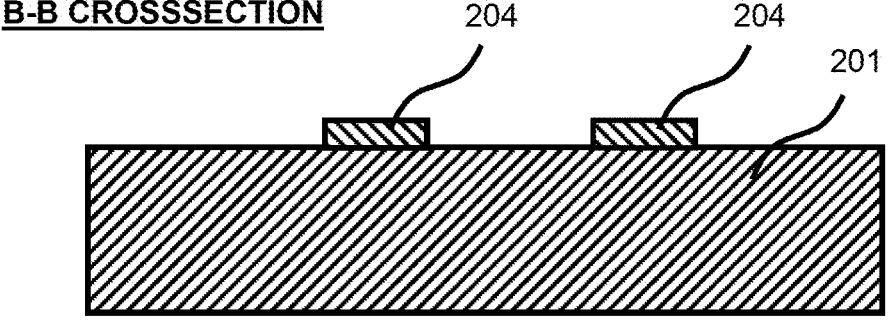

In an embodiment, optical fiber expander 302 can be a multicore fiber, wherein light guiding core channels form a one-dimensional or two-dimensional array, as shown in FIG. 40 or FIG. 41. Here, optical fibers in optical fiber array 301 are arranged in fiber expander base 306. In an embodiment, optical fiber expander 302 can be in the form of a single optical fiber that is cleaved or tapered. A lens can be disposed at its terminus. In an embodiment, optical fiber expander 302 is connected to the top surface of photonic thermometer 201 (FIG. 13, FIG. 14, FIG. 15, FIG. 16, FIG. 17, FIG. 18, FIG. 19, FIG. 20, FIG. 21, or FIG. 42) via a surface grating coupler 205, e.g., light-guiding waveguide 204, that couples light from optical fiber array 301 into the on-chip integrated light-guiding waveguide 204 (FIG. 42, FIG. 43). Optical fiber expander 302 can be connected orthogonal or nearly orthogonal to the surface of photonic thermometer 201 (FIG. 42) or planar to the surface of photonic thermometer 201 (FIG. 29, FIG. 43). For the latter case, optical fiber expander 302 can have light reflecting/focusing surface 310 that reflects the light from optical fiber array 301 at an angle close to normal to the surface of photonic thermometer 201.

In an embodiment, planar coupling (FIG. 29, FIG. 43) or edge coupling (FIG. 23, FIG. 24, FIG. 25, FIG. 26, FIG. 27, FIG. 28, FIG. 44) provides a size of photonic thermometer 201 that can be accommodated in sheath bottom plug 102 that has a small diameter.

In an embodiment, optical fiber expander 302 can be connected to the polished facet of photonic thermometer 201 (FIG. 22, FIG. 23, FIG. 24, FIG. 25, FIG. 26, FIG. 27, FIG.

Figure 44:
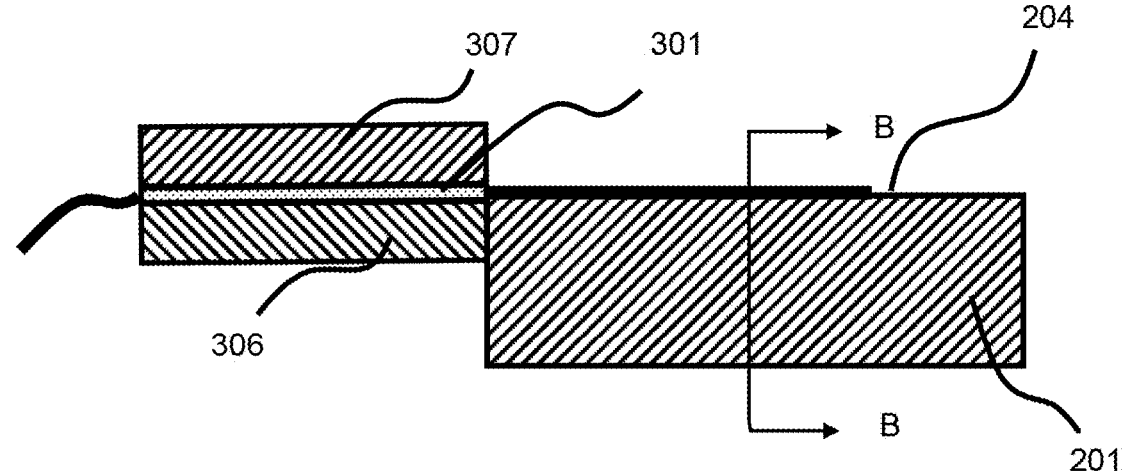
FIG. 44 shows an optical fiber array disposed on a photonic thermometer for a photonic thermometer module assembly, according to some embodiments.
Figure 44:
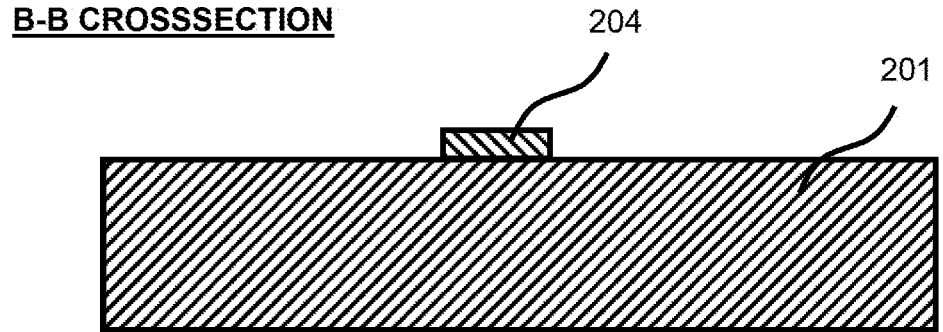

28), where light from optical fiber array 301 is coupled into the on-chip integrated light-guiding waveguide 204 (FIG. 44).

In an embodiment, optical fiber array 301 can be attached to photonic thermometer 201 via bonding, glass soldering, fusion, gluing with adhesives, and the like. In an embodiment, optical fiber array 301 can be connected to fiber strain relief post 304 that is disposed on heat exchanger 401 (FIG. 2, FIG. 9, FIG. 11) or on sheath bottom plug 102 (FIG. 12). Connecting optical fiber array 301 to fiber strain relief post 304 can minimize motion of optical fiber array 301 and resultingly minimize induced polarization noise, phase noise, and mode noise in photonic thermometer 201.

In an embodiment, optical fiber array 301 includes fiber splice joint 305 such that optical fiber array 301 is connected to isolated fibers embedded in top flange plug 105 (FIG. 5) or top sealing flange 104 (FIG. 7).

In an embodiment, photonic thermometer module assembly 100 includes heat exchanger 401 that is in thermal communication with photonic thermometer 201, wherein heat exchanger 401 maximizes thermal contact and thermal exchange between photonic thermometer 201 and sheath 101. Heat exchanger 401 can be made of thermally conductive materials, including metals such as copper, aluminum, metal alloys, and the like. Photonic thermometer 201 can be in direct contact with heat exchanger 401, or thermally conductive layer 202 can be interposed between photonic thermometer 201 and heat exchanger 401 (e.g., as shown in FIG. 13 to FIG. 31). Thermally conductive layer 202 increases thermal contact between photonic thermometer 201 and heat exchanger 401. Thermally conductive layer 202 can be a thermal grease, thermally conductive epoxy, polymeric material with high thermal conductivity, and the like. Thermally conductive layer 202 can be an adhesive medium (e.g., it can be a thermally conductive epoxy) that secures photonic thermometer 201 to heat exchanger 401 or sheath bottom plug 102.

Figure 35:
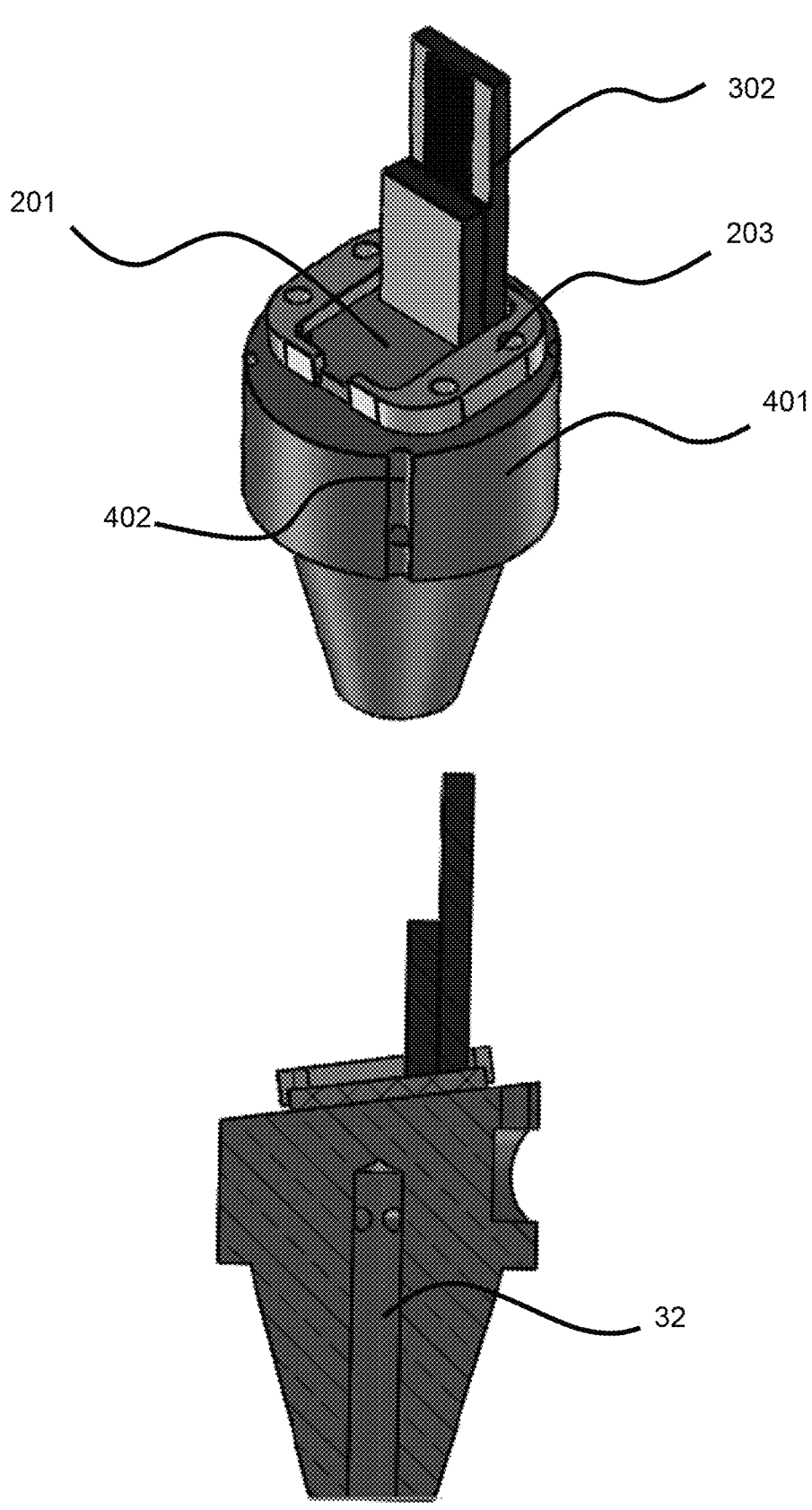
FIG. 35 shows features for a photonic thermometer module assembly, according to some embodiments.
Figure 36:
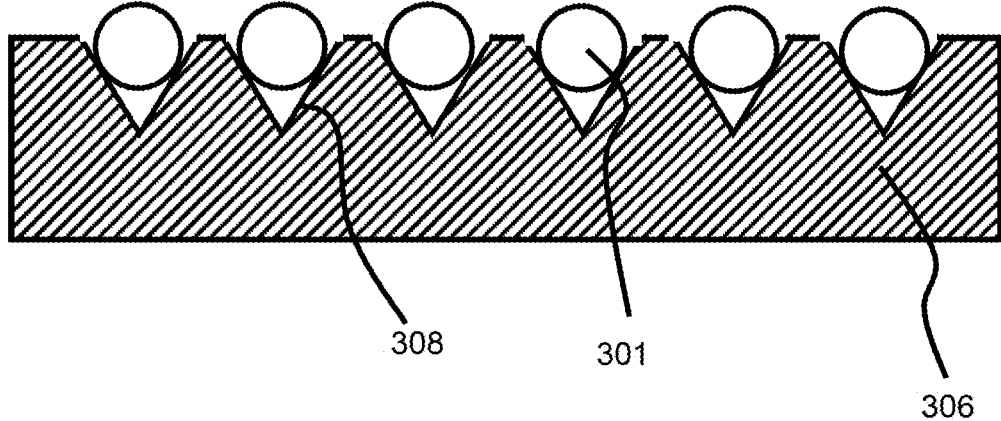
FIG. 36 shows an optical fiber expander, according to some embodiments.

In an embodiment, photonic thermometer 201 can be attached to heat exchanger 401 via chip clamp 203 (FIG. 35). Chip clamp 203 can be fastened to heat exchanger 401 via a fastener such as screws and the like.

In an embodiment, heat exchanger 401 includes heat exchanger cavity 406 or air escape trench 402. The number of heat exchanger cavity 406 or air escape trench 402 can be selected based on size constraints or use case. Air escape trench 402 provides a path for air to escape from sheath 101 when heat exchanger 401 and photonic thermometer 201 are disposed in sheath 101, which is sealed at second end 109 with sheath bottom plug 102. Additionally, air escape trench 402 increases the rate of gas evacuation of inner volume 121 of sheath 101 when photonic thermometer 201 is loaded into inner volume 121.

In an embodiment, heat exchanger 401 is in thermal communication with sheath bottom plug 102 directly or via bottom plug thermally conductive layer 409 (e.g., as shown in FIG. 13 to FIG. 31). Bottom plug thermally conductive layer 409 increases thermal contact between heat exchanger 401 and sheath bottom plug 102. Bottom plug thermally conductive layer 409 can be a thermal grease, thermally conductive epoxy, polymeric material with high thermal conductivity, and the like. Bottom plug thermally conductive layer 409 can be an adhesive medium (e.g., a thermally conductive epoxy) that secures heat exchanger 401 to sheath bottom plug 102.

Figure 17:
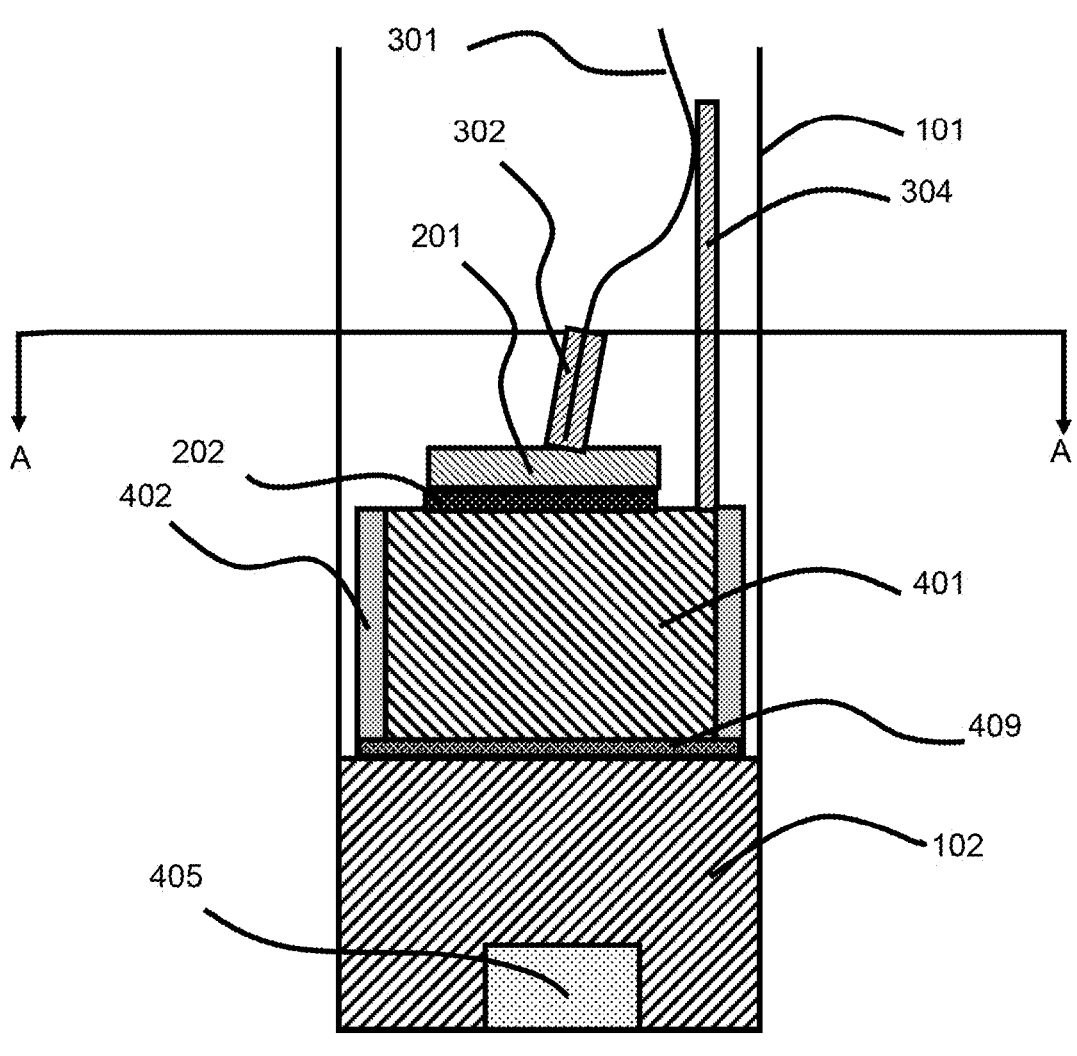
FIG. 17 shows features for a photonic thermometer module assembly, according to some embodiments.
Figure 17:
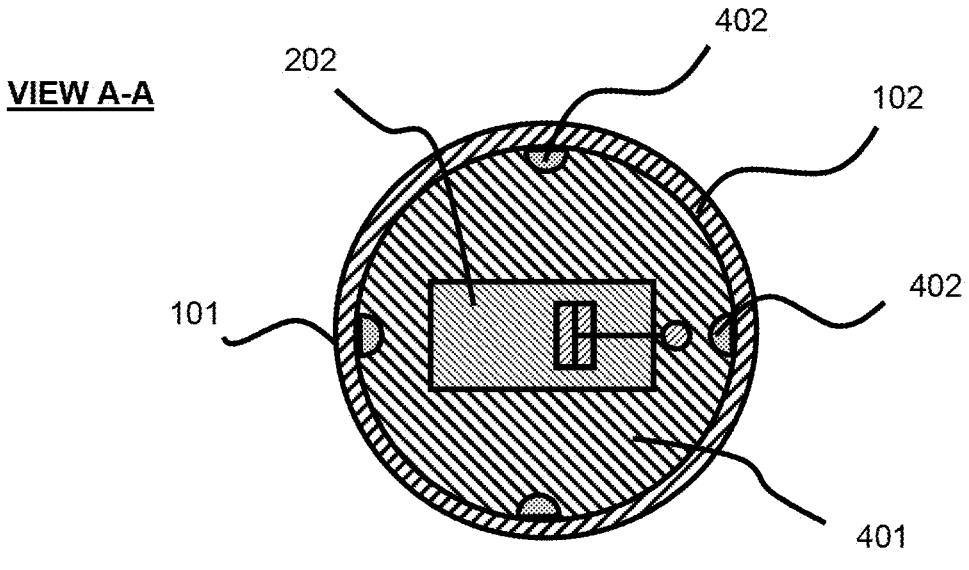
Figure 28:
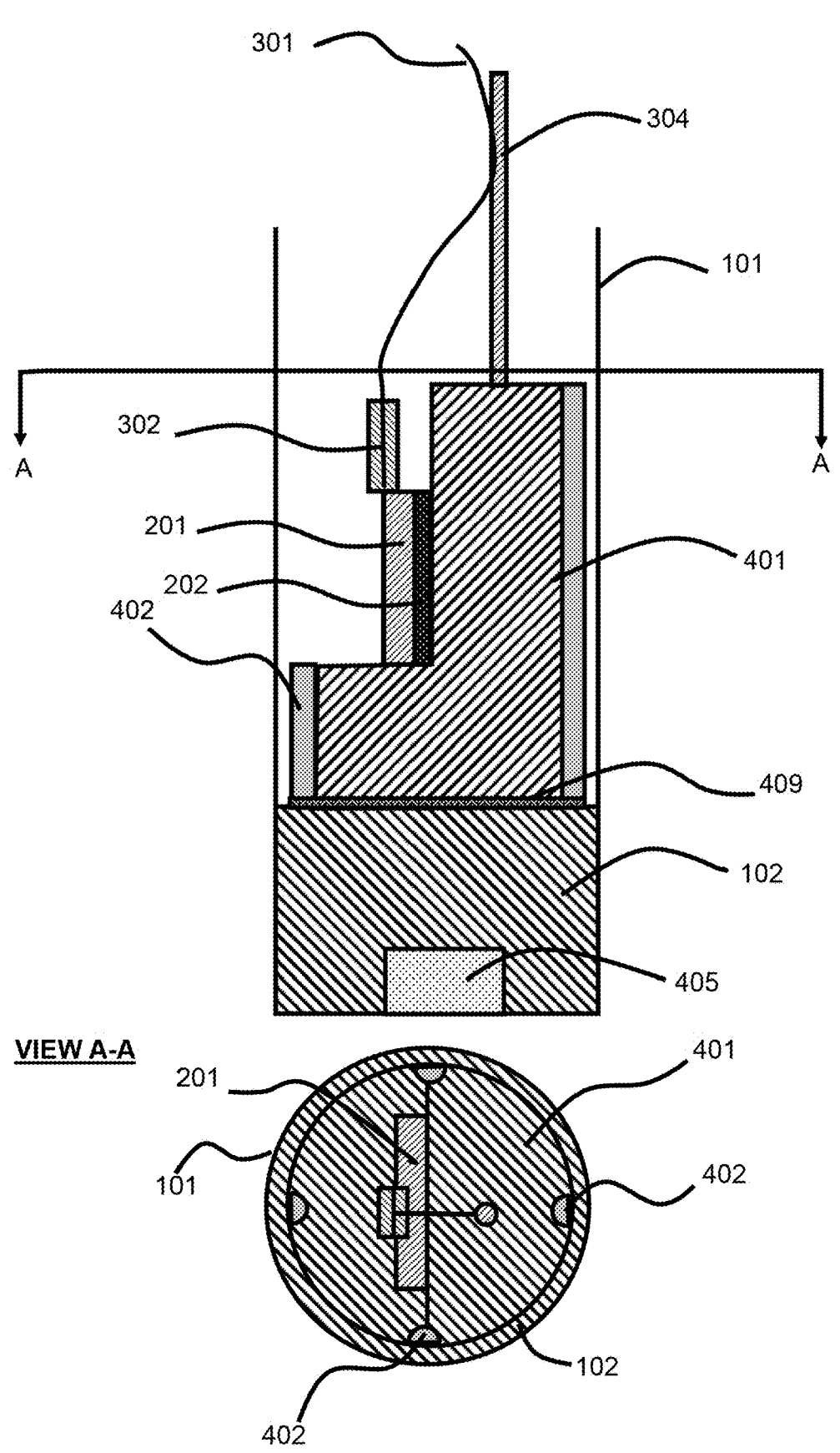
FIG. 28 shows features for a photonic thermometer module assembly, according to some embodiments.

In an embodiment, heat exchanger 401 is disposed on sheath bottom plug 102 via bottom plug thermally conductive layer 409 (FIG. 12, FIG. 14, FIG. 17, FIG. 18, FIG. 19, FIG. 21, FIG. 22, FIG. 23, FIG. 24, FIG. 29, FIG. 30, FIG. 31), heat exchanger-to-bottom plug threaded lock joint 403 (FIG. 15, FIG. 25), magnetic force generated by permanent heat exchanger magnet 404 and bottom plug magnet 405 (FIG. 16, FIG. 17, FIG. 18, FIG. 26, FIG. 27, FIG. 28). Permanent magnets (heat exchanger magnet 404 and bottom plug magnet 405) can be embedded in heat exchanger 401 and sheath bottom plug 102, respectively. If heat exchanger 401 or sheath bottom plug 102 is made out of magnetic material such as stainless steel, only one magnet can be used, e.g., heat exchanger magnet 404 (FIG. 18, FIG. 27) or bottom plug magnet 405 (FIG. 17, FIG. 28). Furthermore, one magnet (heat exchanger magnet 404 or bottom plug magnet 405) can be used when heat exchanger 401 or sheath bottom plug 102 are non-magnetic but include an embedded magnetic material.

Figure 19:
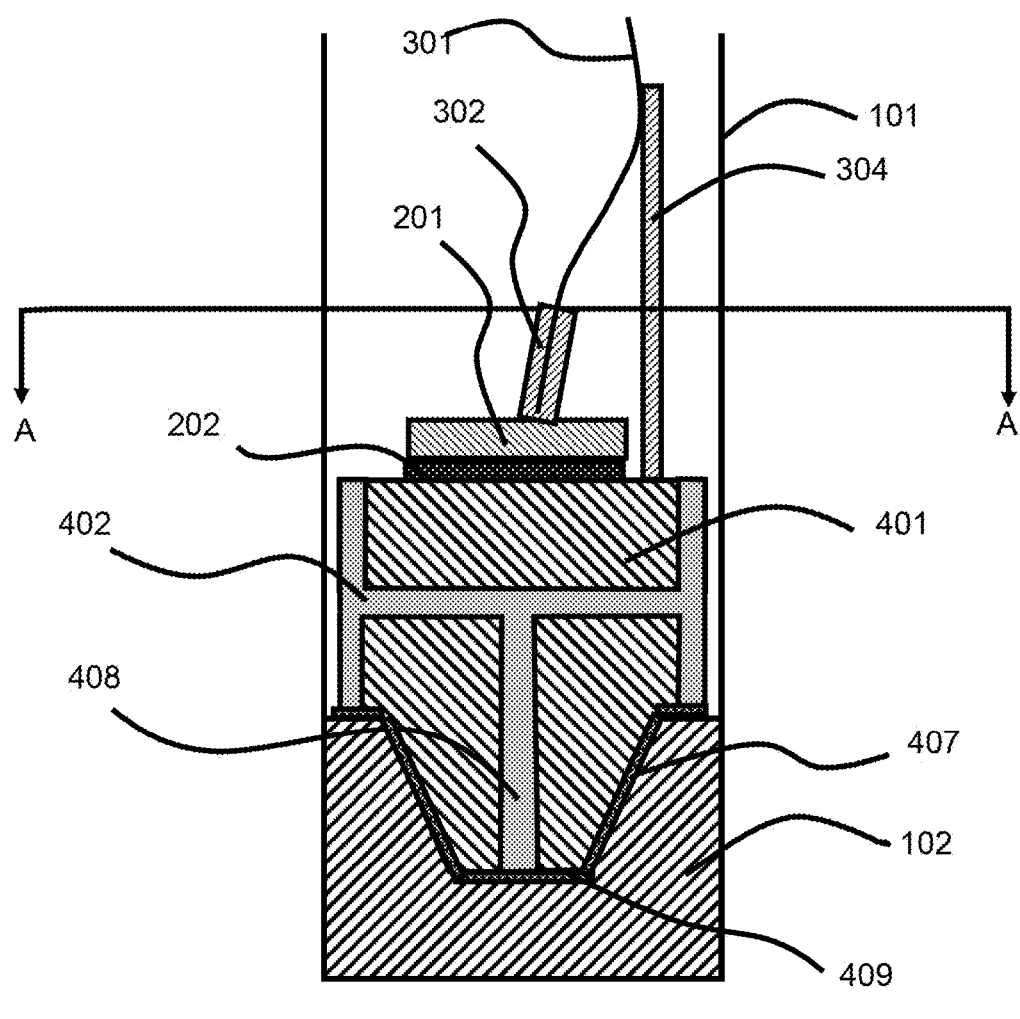
FIG. 19 shows features for a photonic thermometer module assembly, according to some embodiments.
Figure 19:
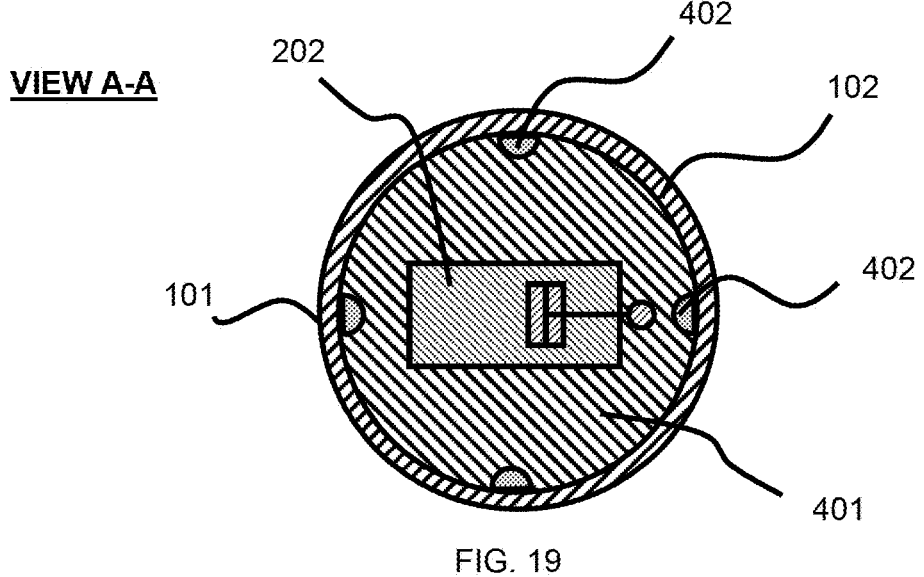
Figure 20:
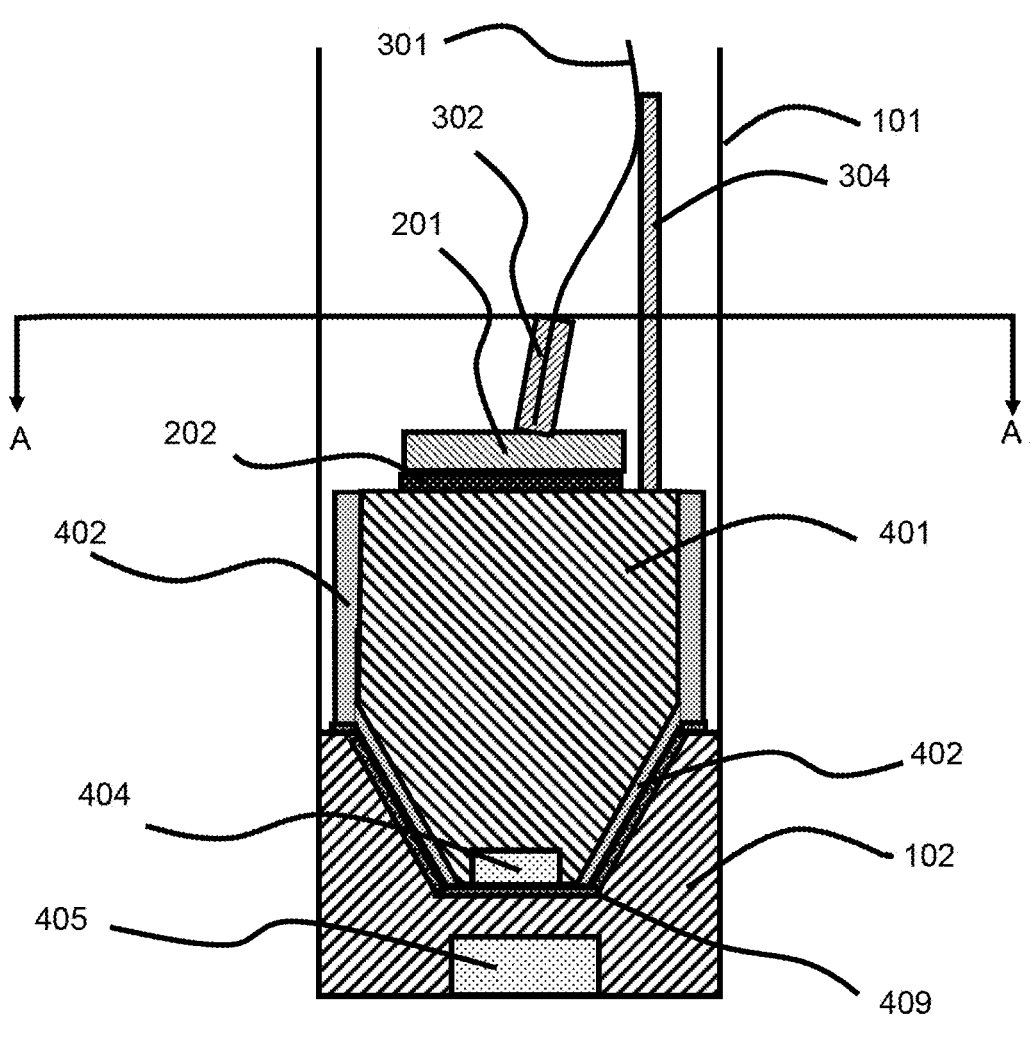
FIG. 20 shows features for a photonic thermometer module assembly, according to some embodiments.
Figure 20:
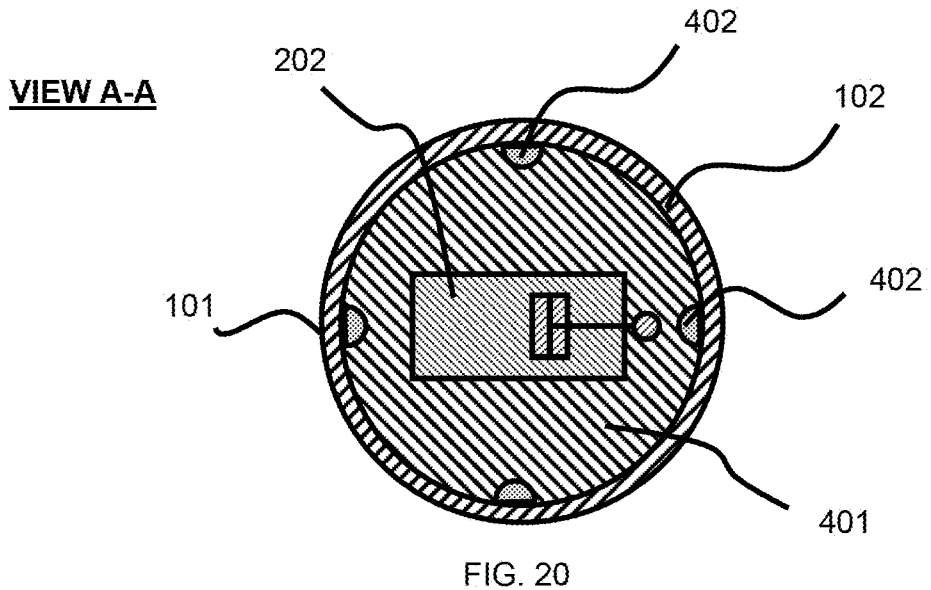
Figure 21:
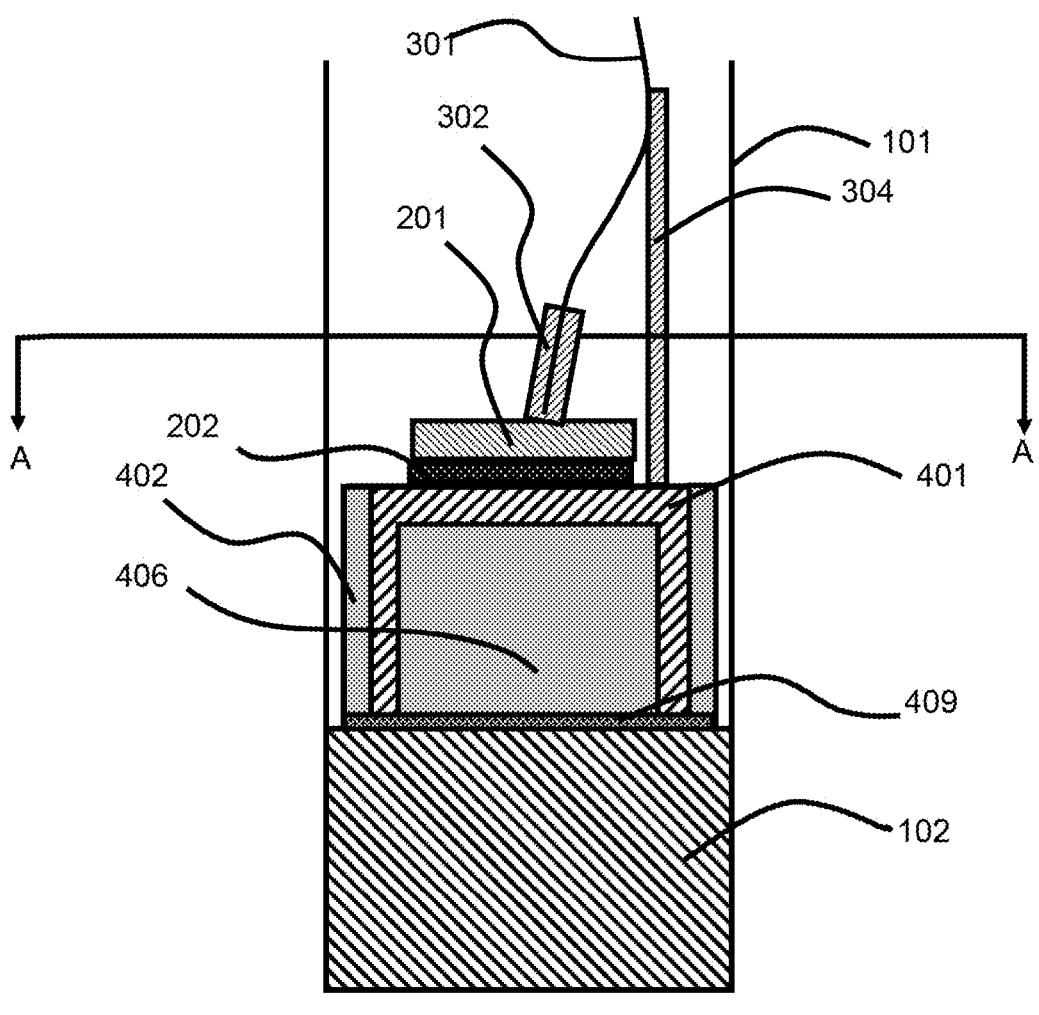
FIG. 21 shows features for a photonic thermometer module assembly, according to some embodiments.
Figure 21:
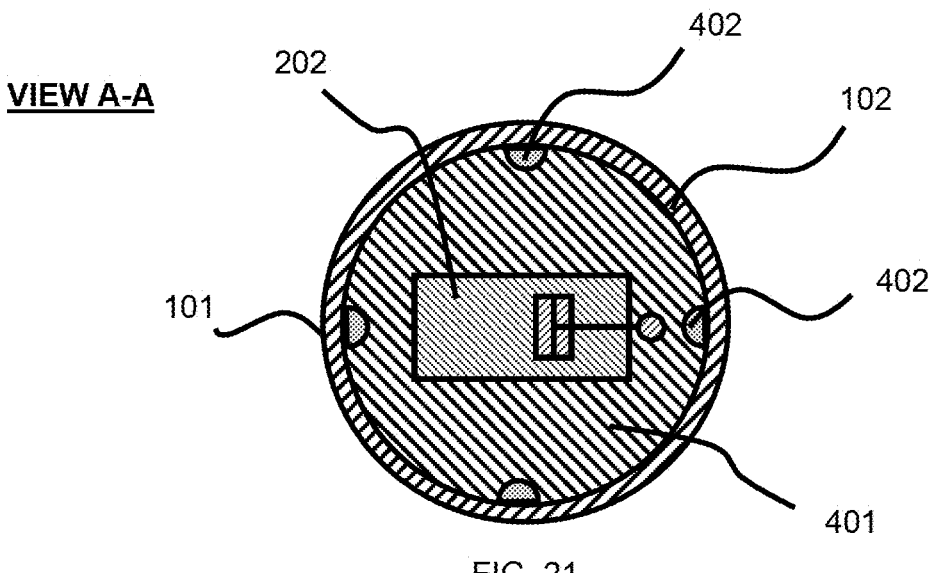
Figure 22:
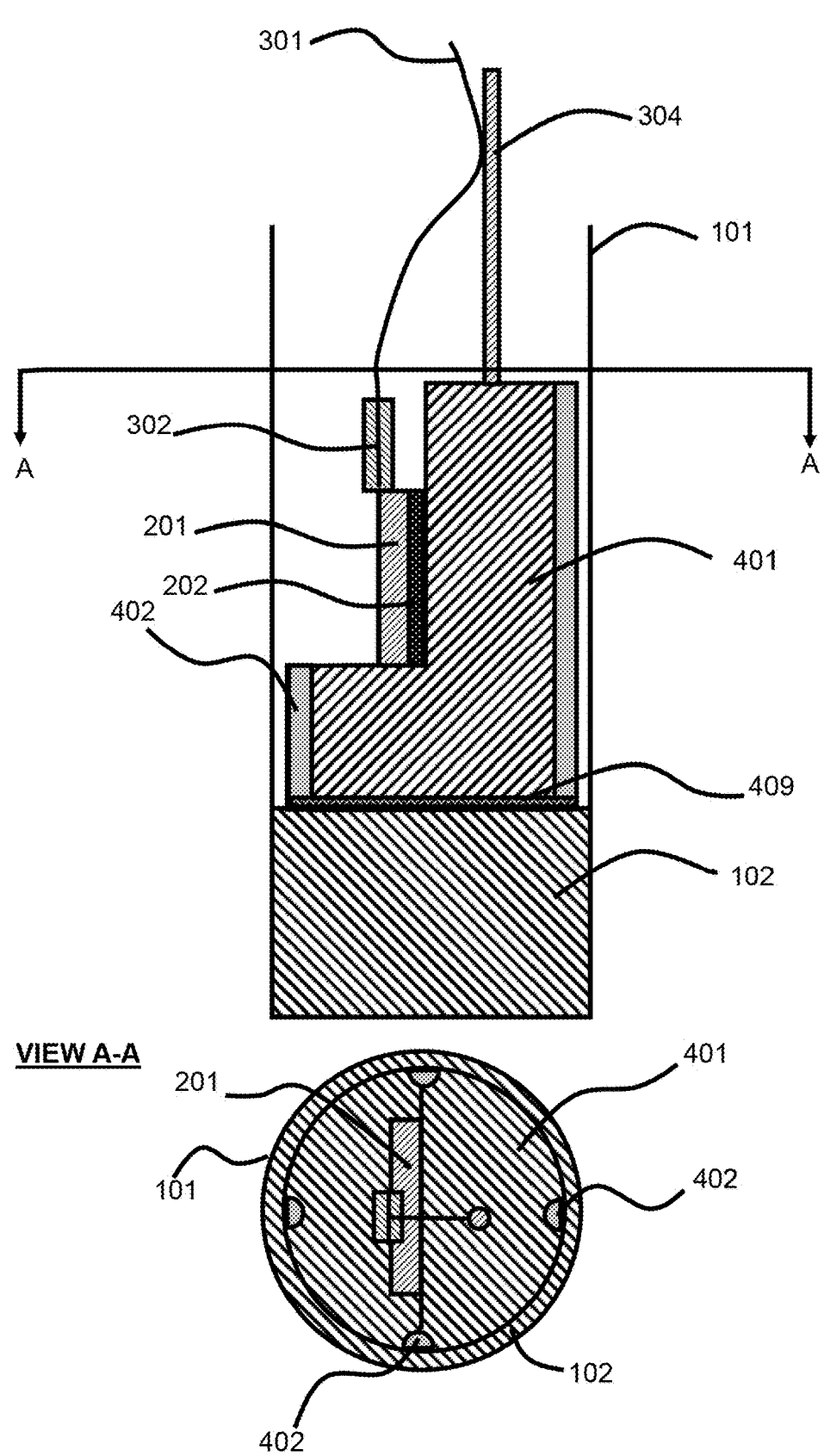
FIG. 22 shows features for a photonic thermometer module assembly, according to some embodiments.
Figure 23:
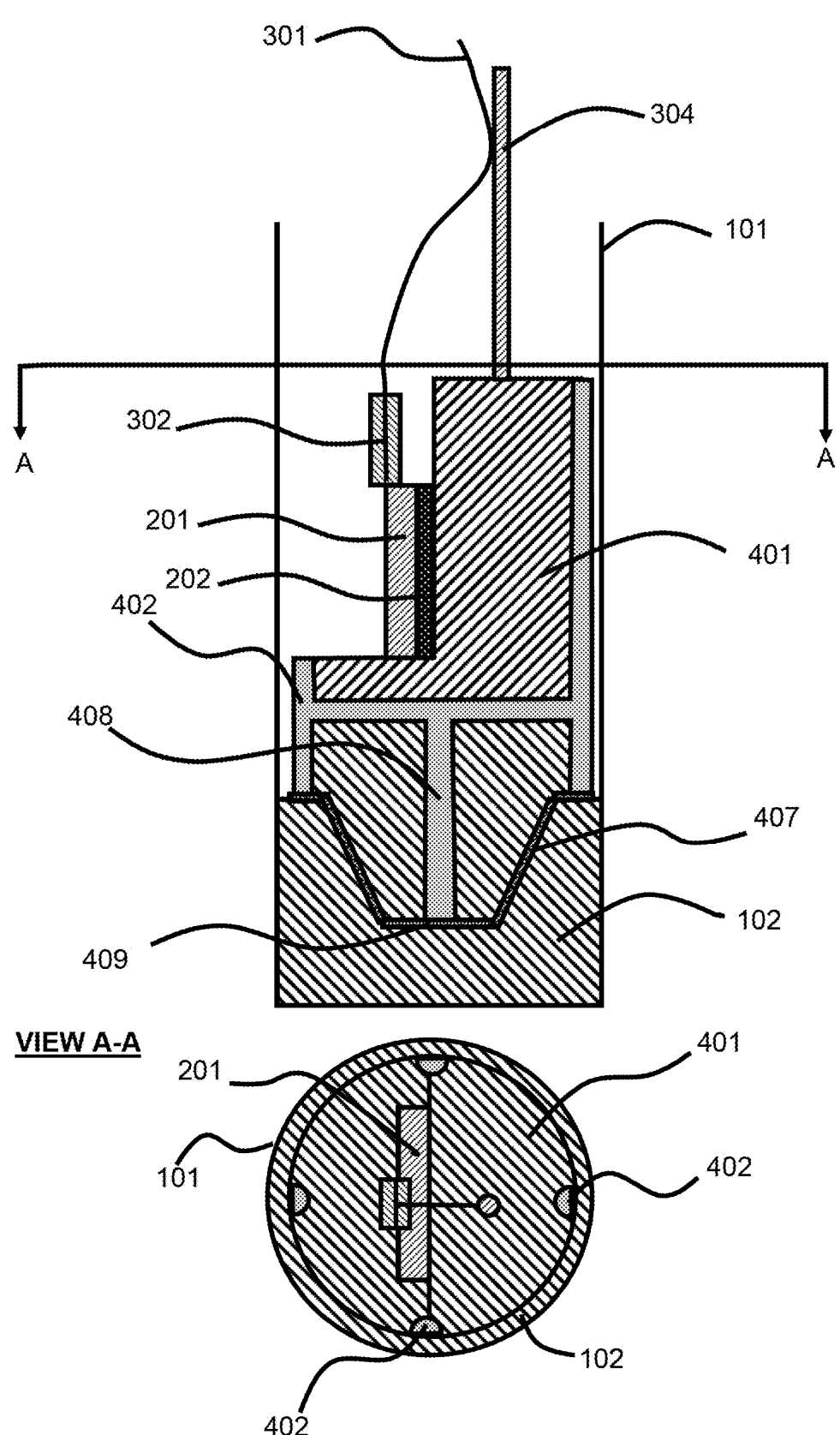
FIG. 23 shows features for a photonic thermometer module assembly, according to some embodiments.

In an embodiment, heat exchanger 401 is connected to sheath bottom plug 102 via conical self-aligning heat exchanger-to-bottom plug joint 407 (FIG. 19, FIG. 20, FIG. 23). Conical self-aligning heat exchanger-to-bottom plug joint 407 aligns heat exchanger 401 and sheath bottom plug 102 to provide a larger contact area between heat exchanger 401 and conical self-aligning heat exchanger-to-bottom plug joint 407 to increase heat transfer between heat exchanger 401 and sheath bottom plug 102. When heat exchanger 401 has conical self-aligning heat exchanger-to-bottom plug joint 407, heat exchanger 401 can include air escape inner channel 408 (FIG. 19, FIG. 20). Air escape inner channel 408 allows air between heat exchanger 401 and sheath bottom plug 102 to escape from therebetween while disposing heat exchanger 401 in sheath 101. Air escape inner channel 408 increases the rate at inner volume 121 can be evacuated while heat exchanger 401 and photonic thermometer 201 are disposed therein.

Figure 14:
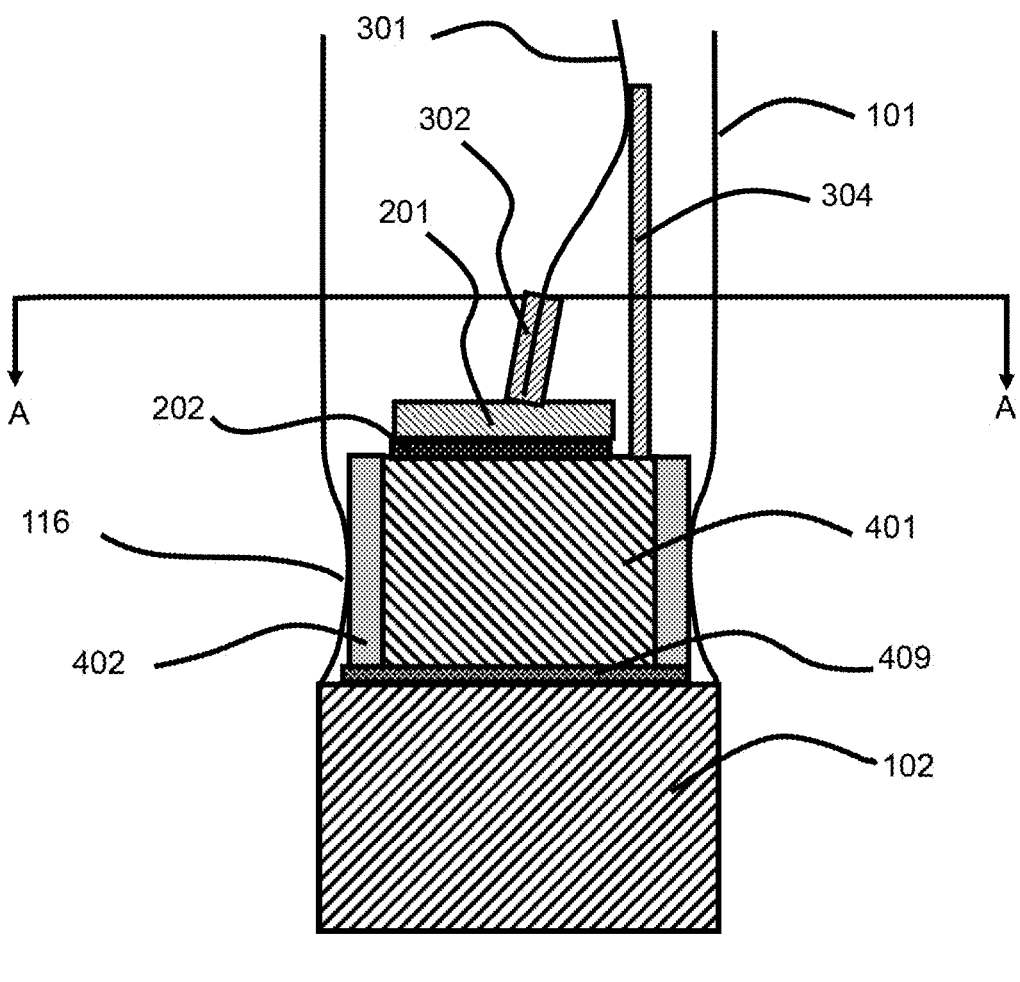
FIG. 14 shows features for a photonic thermometer module assembly, according to some embodiments.
Figure 14:
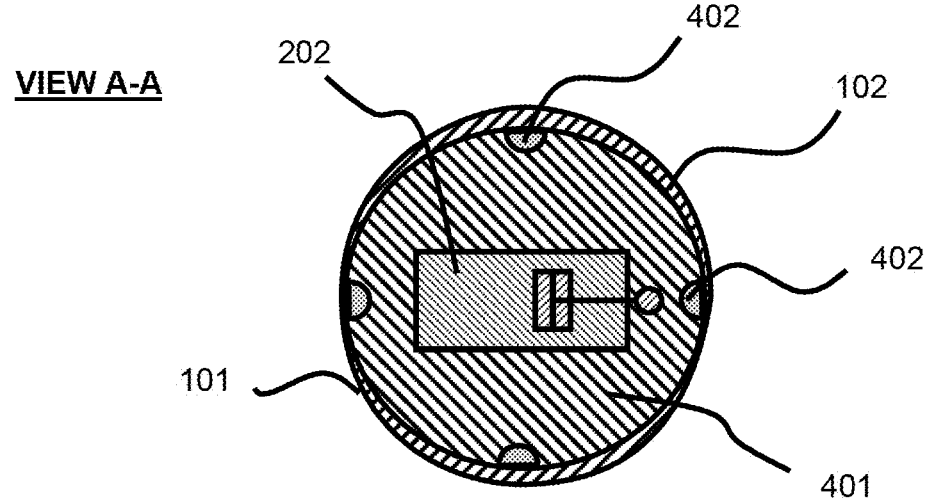
Figure 15:
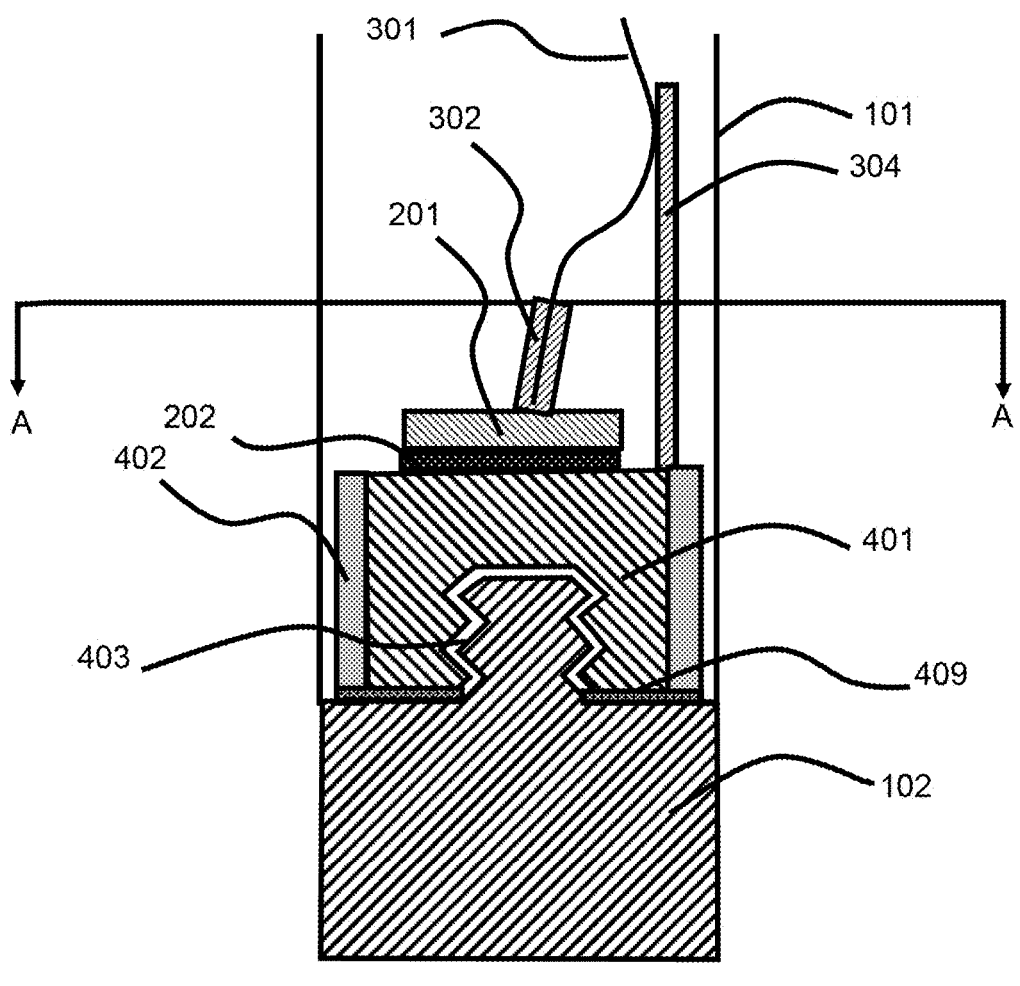
FIG. 15 shows features for a photonic thermometer module assembly, according to some embodiments.
Figure 15:
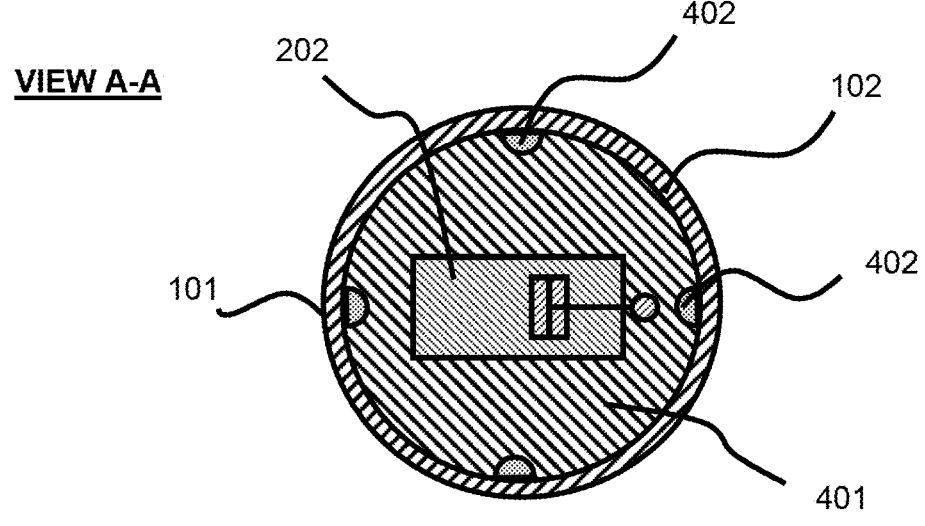
Figure 16:
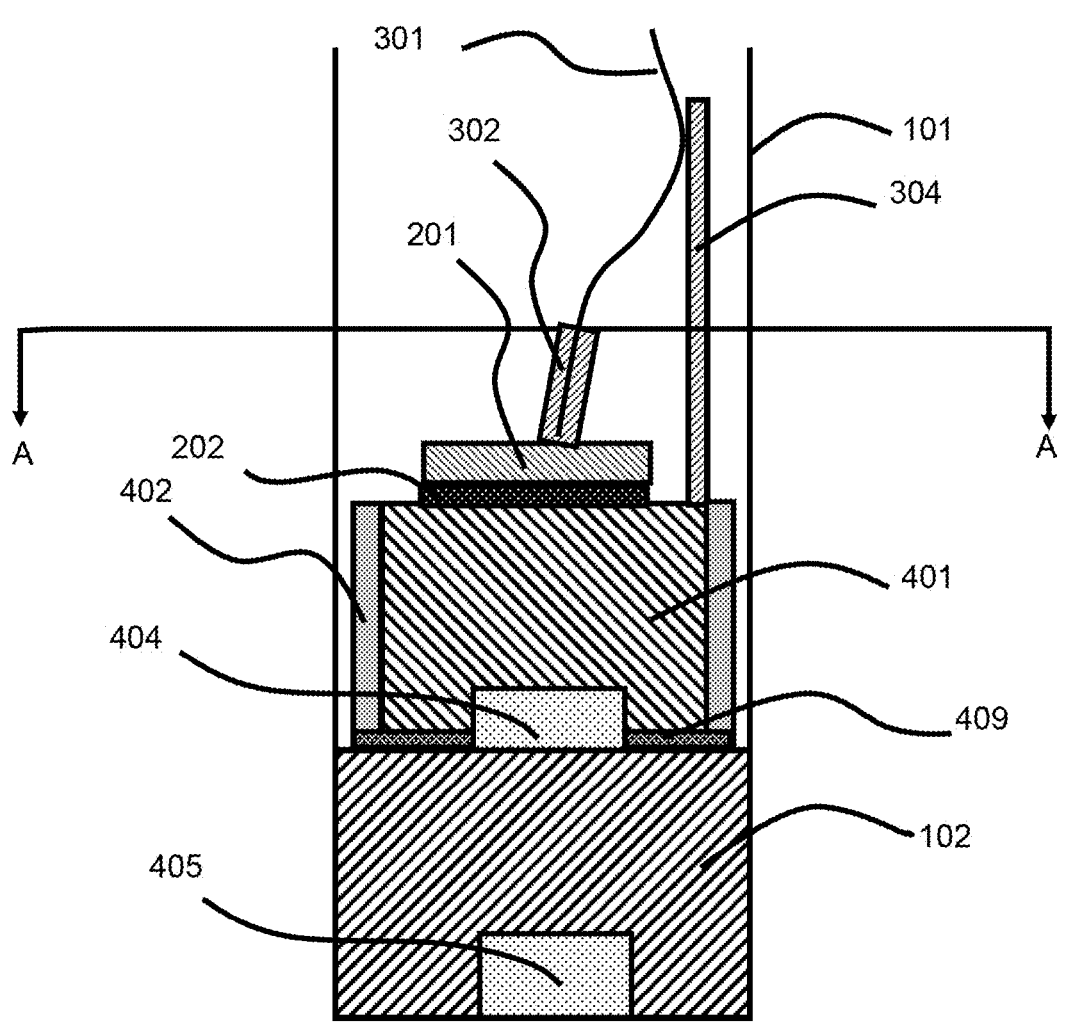
FIG. 16 shows features for a photonic thermometer module assembly, according to some embodiments.
Figure 16:
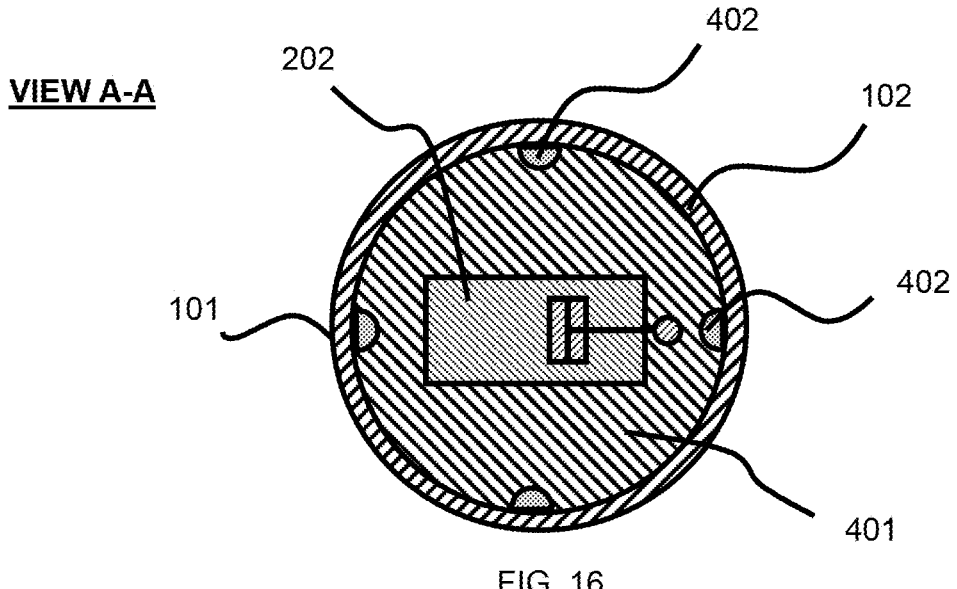
Figure 24:
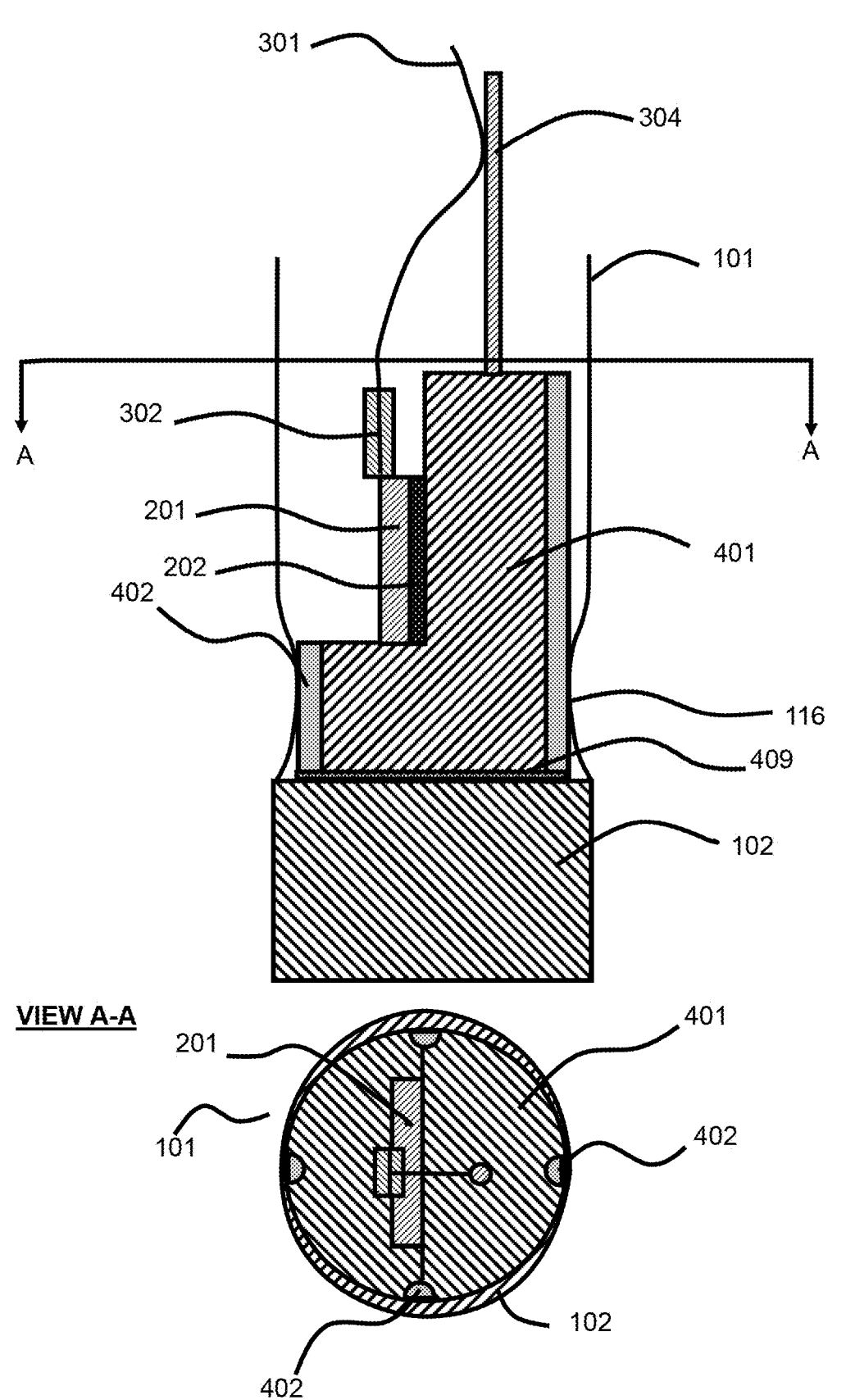
FIG. 24 shows features for a photonic thermometer module assembly, according to some embodiments.
Figure 25:
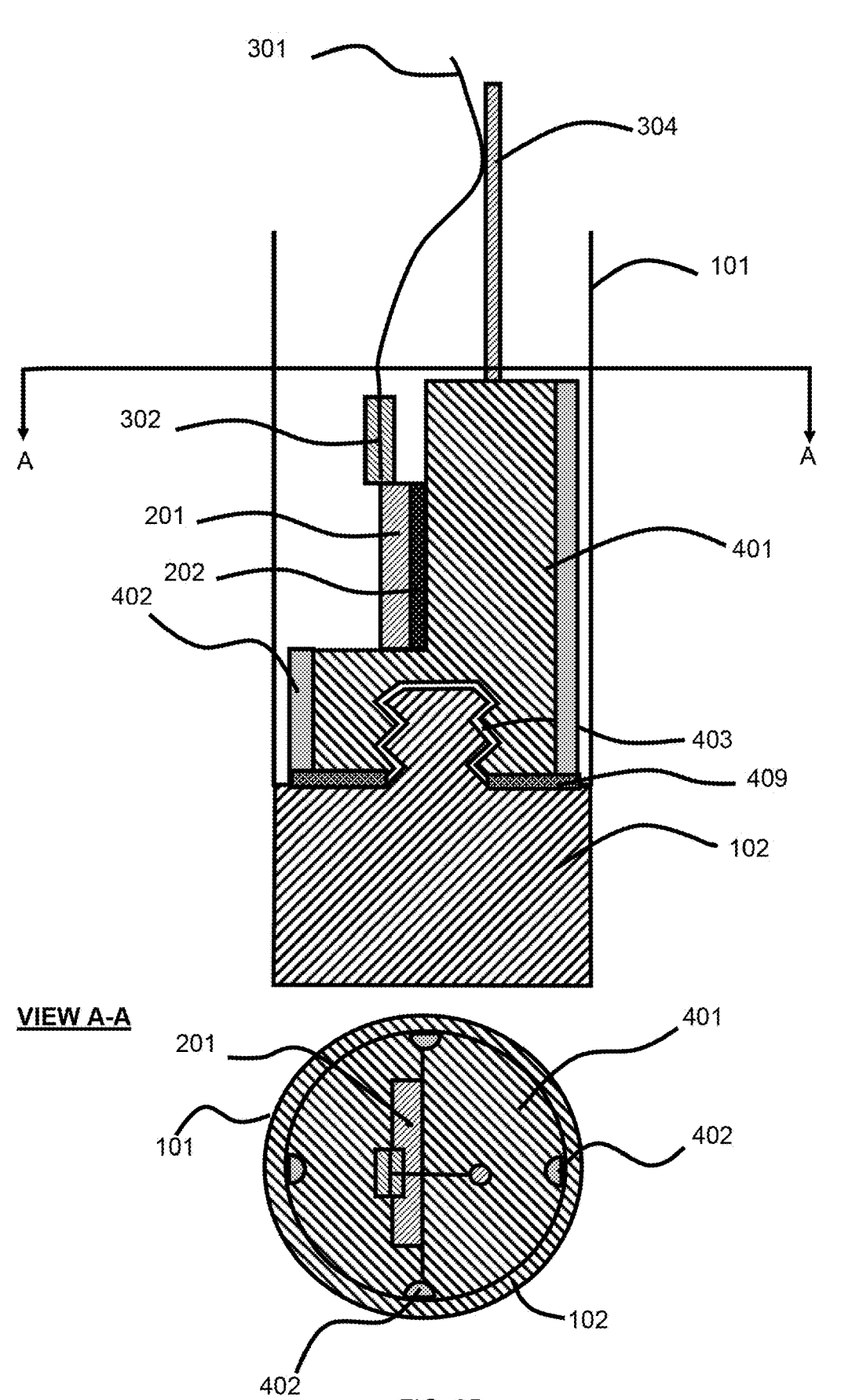
FIG. 25 shows features for a photonic thermometer module assembly, according to some embodiments.
Figure 27:
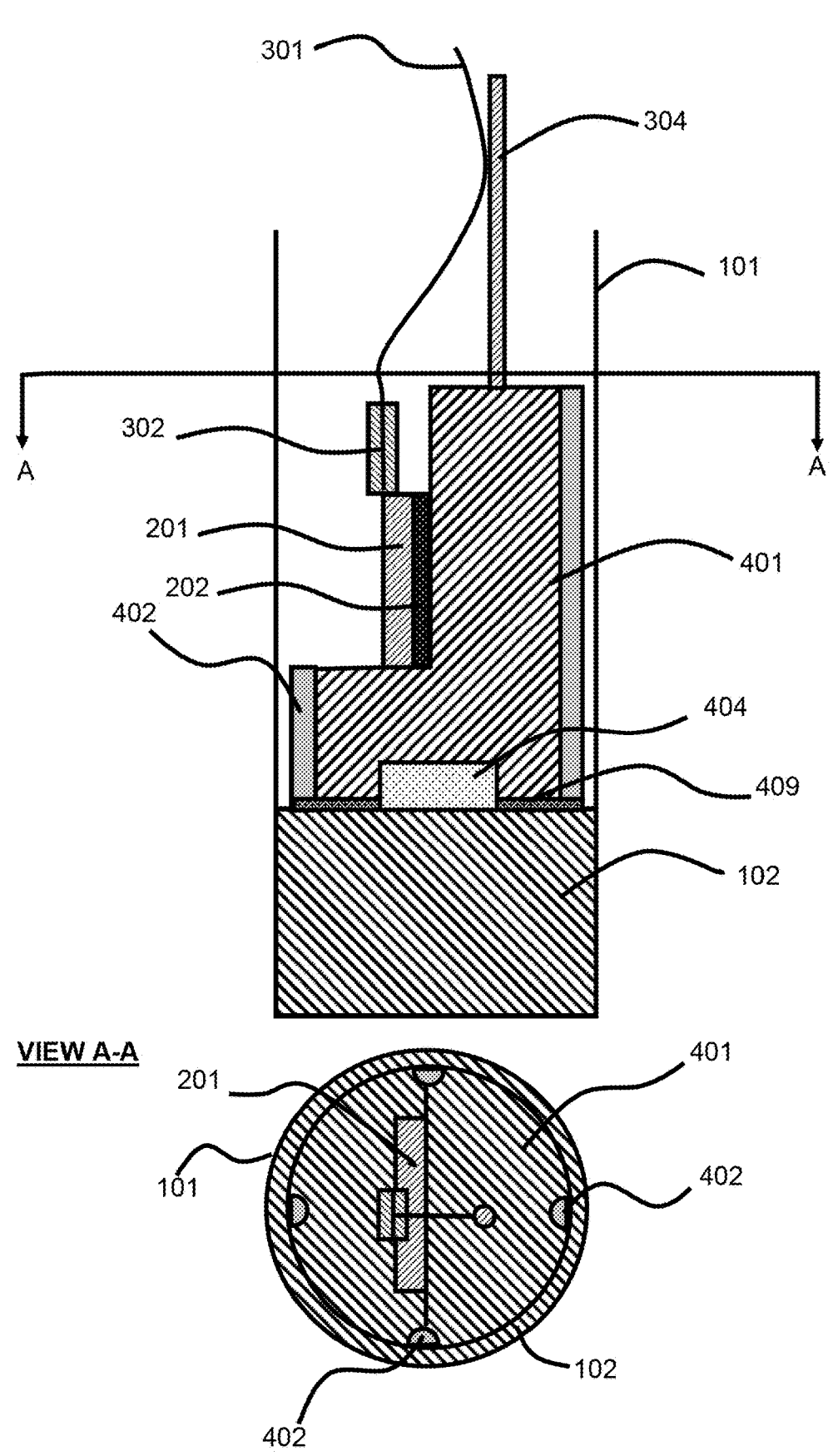
FIG. 27 shows features for a photonic thermometer module assembly, according to some embodiments.

In an embodiment, heat exchanger 401 can be mechanically engaged by inner wall of sheath 101 via sheath crimp indentation 116 (FIG. 14, FIG. 24).

In an embodiment, heat exchanger 401 includes heat exchanger cavity 406 (FIG. 21, FIG. 30, FIG. 31), wherein heat exchanger cavity 406 reduces the thermal mass of heat exchanger 401 and provides a faster response time of photonic thermometer 201 to temperature variations.

In an embodiment, photonic thermometer module assembly 100 includes thermal shield 410 to shield photonic thermometer 201. Thermal shield 410 can be made from thermally conductive materials, such as a metal or metal alloy. Thermal shield 410 can be mounted directly over photonic thermometer 201 and surrounds photonic thermometer 201 to block undesired radiation from heating or cooling photonic thermometer 201. It should be appreciated that while thermal shield 410 blocks radiation from being received by photonic thermometer 201 from its surfaces that would (if not for thermal shield 410) otherwise be exposed to top sealing flange 104 or inner wall of sheath 101, thermal shield 410 does not interfere with thermal communication between photonic thermometer 201 and heat exchanger 401.

In an embodiment, photonic thermometer module assembly 100 includes a set of baffles as baffle disk 411 disposed in sheath 101. The baffles 411 can be supported by fiber strain relief post 304 or can be suspended from top sealing flange 104 to reduce thermal convection in inner volume 121 of sheath 101. Baffles 411 can be disks with diameters slightly less than the inner diameter of sheath 101. Baffles 411 can have a slot or thru-hole to allow optical fiber array 301 to extend from first end 108 of sheath 101 to photonic thermometer 201 at second end 109 of sheath 101. Baffles 411 can be made of a material with low thermal conductivity such as glass. Baffles 411 reduce thermal convection in inner volume 121, e.g., in an axial direction of sheath 101 along length L.

In an embodiment, fiber strain relief post 304 and baffles 411 decrease movement of optical fiber array 301 disposed in sheath 101 and decrease strain induced polarization, phase, or mode noise sensed by photonic thermometer 201.

Figure 18:
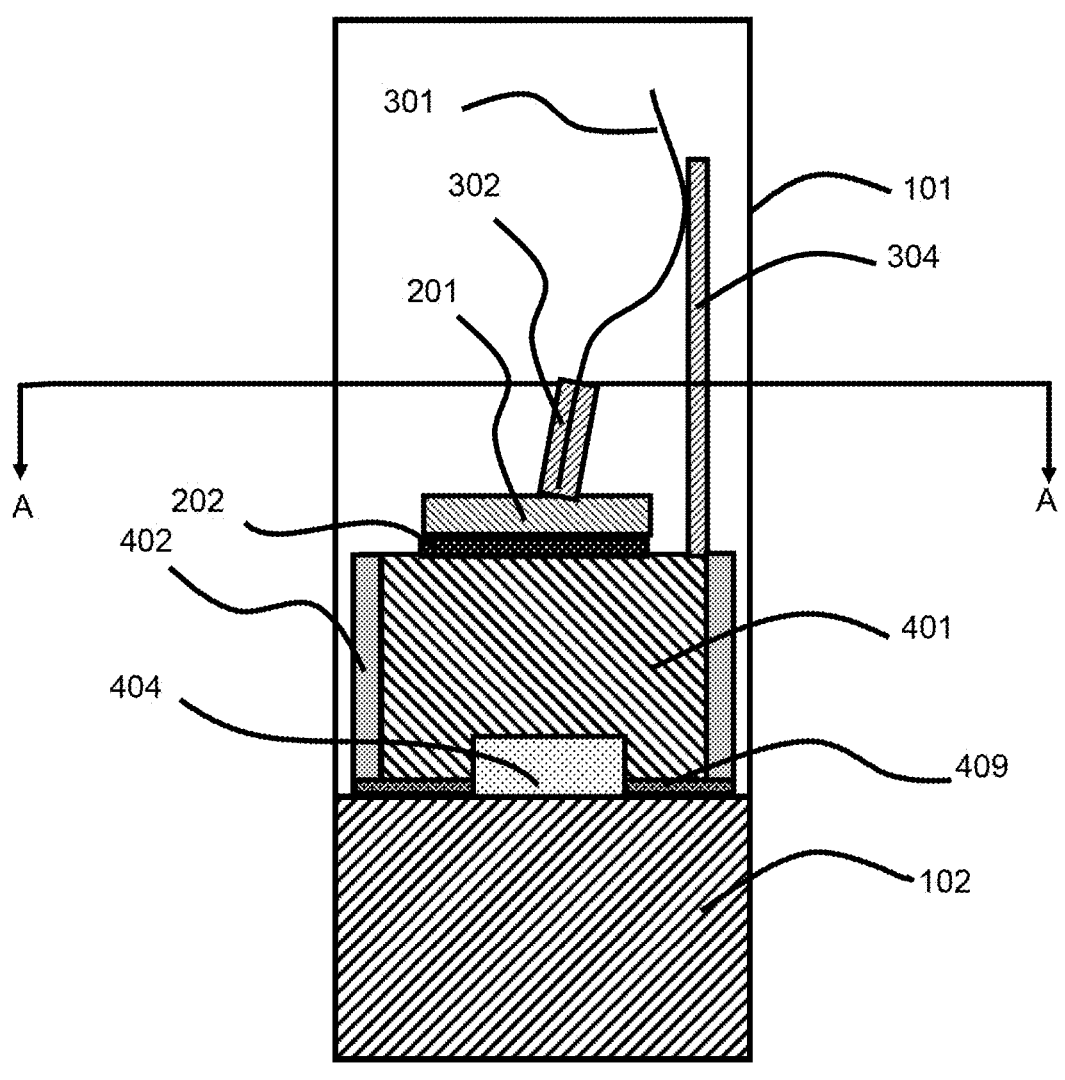
FIG. 18 shows features for a photonic thermometer module assembly, according to some embodiments.
Figure 18:
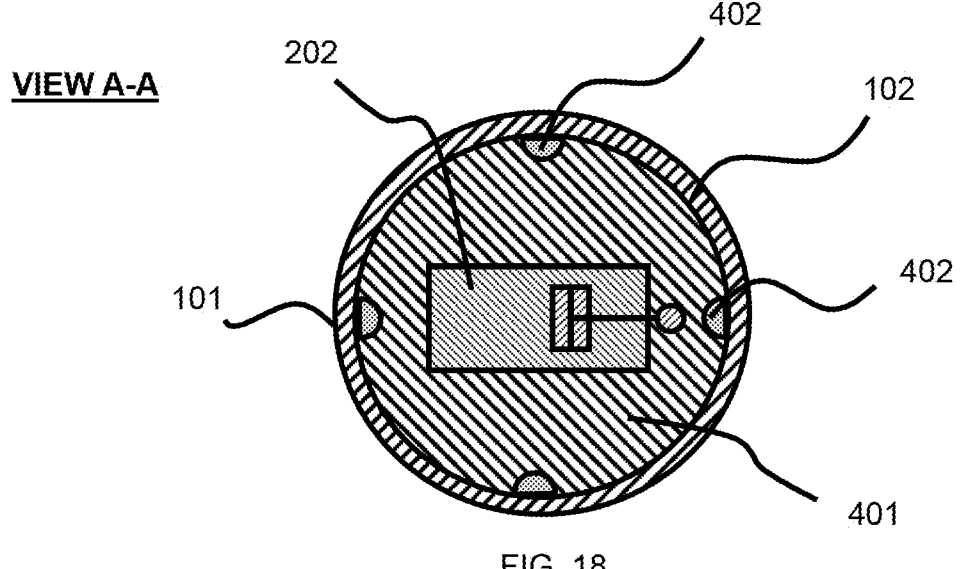

An exemplary photonic thermometer 201 is that of a high-resolution photonic thermometer article, its operation and fabrication, as well as performing high-resolution thermometry U.S. Pat. No. 10,955,617 as described in U.S. Pat. No. 10,955,617, which is incorporated herein by reference in its entirety. In particular, in U.S. Pat. No. 10,955,617, FIGS. 17-19 show a high-resolution photonic thermometer article; FIG. 18 shows a zoomed view of the high-resolution photonic thermometer article shown in FIG. 17; and FIG. 19 shows a zoomed view of the high-resolution photonic thermometer article shown in FIG. 17. A process for performing high-resolution thermometry is shown in U.S. Pat. No. 10,955,617, e.g., in FIG. 22 and FIG. 23 and corresponding detailed description.

An inert gas can be disposed in inner volume 121 of sheath 101 and can include He, Ar, Ne, Xe, Kr, Rn, and the like. Moreover, the inert gas acts as a heat conductive media between photonic thermometer 201 and heat exchanger 401.

Photonic thermometer module assembly 100 can be made in various ways. It should be appreciated that photonic thermometer module assembly 100 includes a number of optical, electrical, or mechanical components, wherein such components can be interconnected and placed in communication (e.g., optical communication, electrical communication, mechanical communication, and the like) by physical, chemical, optical, or free-space interconnects. The components can be disposed on mounts that can be disposed on a bulkhead for alignment or physical compartmentalization. As a result, photonic thermometer module assembly 100 can be disposed in a terrestrial environment or space environment. According to an embodiment, the elements of photonic thermometer module assembly 100 are formed by additive or subtractive manufacturing.

In an embodiment, a process for making photonic thermometer module assembly 100 includes: attaching sheath bottom plug 102 to sheath 101 (e.g., by welding, brazing, soldering, gluing, and the like); attaching sheath top flange 103 to sheath 101 (e.g., by welding, brazing, soldering, gluing, and the like); attaching flanged tee-coupler 110 to sheath top flange 103 (e.g., by a vacuum-compatible sealing gasket, clamp, bolt, and the like); attaching vacuum valve 112 to flanged tee-coupler 110 (e.g., by a vacuum-compatible sealing gasket, clamp, bolt, and the like); attaching top sealing flange 104 to flanged tee-coupler 110 (e.g., by a vacuum-compatible sealing gasket, clamp, bolt, and the like). If flanged tee-coupler 110 or vacuum valve 112 are absent from photonic thermometer module assembly 100, top sealing flange 104 can be attached directly to sheath top flange 103. The process for making photonic thermometer module assembly 100 can include aligning optical fiber array 301 terminated with optical fiber expander 302 relative to photonic thermometer 201 so that light is coupled from optical fiber array 301 into light-guiding waveguide 204 on photonic thermometer 201. The process for making photonic thermometer module assembly 100 can include attaching optical fiber expander 302 relative to photonic thermometer 201 (e.g., by bonding, fusing, gluing, glass soldering, and the like); attaching fiber strain relief post 304 to heat exchanger 401 (e.g., by soldering, welding, brazing, bonding, gluing, mechanical threading, and the like). The process for making photonic thermometer module assembly 100 can include attaching baffles 411 to fiber strain relief post 304 (e.g., by crimping, bonding, gluing, and the like). The process for making photonic thermometer module assembly 100 can include disposing photonic thermometer 201 on heat exchanger 401 so that photonic thermometer 201 and heat exchanger 401 are in thermal communication; and optionally interposing thermally conductive layer 202 between photonic thermometer 201 and heat exchanger 401. The process for making photonic thermometer module assembly 100 can include fastening photonic thermometer 201 to heat exchanger 401 by chip clamp 203 or other ways such as by glue, solder, fusion, bonding, and the like. The process for making photonic thermometer module assembly 100 can include attaching optical fiber array 301 to fiber strain relief post 304 (e.g., by via bonding, gluing, fusing, soldering, and the like). To include baffles 411, the process for making photonic thermometer module assembly 100 can include guiding optical fiber array 301 via baffles 411.

The process for making photonic thermometer module assembly 100 can include moving the combination of photonic thermometer 201 and heat exchanger 401 through top sealing flange aperture 117, top sealing flange 104, flanged tee-coupler 110, and sheath top flange 103 at first end 108 of sheath 101 second end 109 of sheath 101 to sheath bottom plug 102 so that heat exchanger 401 contacts sheath bottom plug 102. The process can include inserting baffles 411 into sheath 101. The process for making photonic thermometer module assembly 100 can include attaching the combination of photonic thermometer 201 and heat exchanger 401 to sheath bottom plug 102 via heat exchanger-to-bottom plug threaded lock joint 403 (e.g., by matching machine threads, permanent magnets such as heat exchanger magnet 404 or bottom plug magnet 405, conical self-aligning heat exchanger-to-bottom plug joint 407, sheath crimp indentation 116, glue, and the like). A thermally conductive layer such as bottom plug thermally conductive layer 409 can be placed between heat exchanger 401 and sheath bottom plug 102. Bottom plug thermally conductive layer 409 can be an adhesive medium that adheres heat exchanger 401 and sheath bottom plug 102.

The process for making photonic thermometer module assembly 100 can include disposing an end of optical fiber array 301 through optical fiber feedthrough 107 in top flange plug 105 or in top sealing flange 104. Loose connecting ends of optical fiber array 301 can be spliced together at fiber splice joint 305.

The process for making photonic thermometer module assembly 100 can include disposing top flange plug 105 on top sealing flange aperture 117; and sealing gaps between top flange plug 105 and top sealing flange 104. If top sealing flange 104 is used without including top sealing flange aperture 117, the process can include attaching top sealing flange 104 to flanged tee-coupler 110 or to sheath top flange 103 (if flanged tee-coupler 110 is omitted from photonic thermometer module assembly 100), wherein top sealing flange 104 can be attached with a vacuum-compatible gasket, clamp, bolts, and the like. The process can include attaching optical fiber support collar 114 to top sealing flange 104; positioning optical fiber array 301 along optical fiber support fin 115 to avoid fiber bending that could result in damage to optical fibers; evacuating inner volume 121 of sheath 101 by exchange gas evacuation/filling tube 106 or vacuum valve 112; optionally filling inner volume 121 of sheath 101 with an inert gas to a selected, e.g., from 1 Pa to 100 kPa; sealing exchange gas evacuation/filling tube 106 (e.g., by soldering, gluing, welding, crimping, cold fusion, and the like), closing vacuum valve 112; sealing vacuum valve 112 with vacuum valve plug 113.

In an embodiment, a process for making photonic thermometer module assembly 100 with a capsular format, e.g., as shown in FIG. 12, having minimal length L of sheath 101 includes: attaching bottom inner-wall-mount flange 120 to sheath 101 (e.g., by welding, brazing, soldering, gluing, and the like); attaching top inner-wall-mount flange 118 to sheath 101 (e.g., by welding, brazing, soldering, gluing, and the like); attaching top seal plug 119 to sheath 101 (e.g., directly by via welding, brazing, soldering, gluing, and the like or indirectly via top inner-wall-mount flange 118), wherein the connection between top seal plug 119 and top inner-wall-mount flange 118 can be made by gluing, soldering, welding, brazing, or a sealing gasket interposed between top seal plug 119 and top inner-wall-mount flange 118. Top seal plug 119 can be configured with exchange gas evacuation/filling tube 106, optical fiber feedthrough 107, and optical fiber array 301 that is guided through optical fiber feedthrough 107. Optical fiber array 301 can have a bare terminus or can be terminated with optical fiber expander 302. The process can include: aligning optical fiber array 301 terminated with optical fiber expander 302 relative to photonic thermometer 201 so that light is coupled from optical fiber array 301 into light-guiding waveguide 204 on photonic thermometer 201; attaching optical fiber expander 302 to photonic thermometer 201 (e.g., by bonding, fusing, gluing, glass soldering, and the like); attaching photonic thermometer 201 to sheath bottom plug 102; optionally interposing thermally conductive layer 202 between photonic thermometer 201 and heat exchanger 401, wherein photonic thermometer 201 is optionally secured relative to sheath bottom plug 102 by chip clamp 203, glue, solder, fusion, bonding, and the like; attaching optical fiber array 301 to fiber strain relief post 304 (e.g., by bonding, gluing, fusing, soldering, and the like); optionally (if optical fiber feedthrough 107 is disposed in optical fiber feedthrough 107 with a bare terminus) attaching free ends of optical fiber array 301 at fiber splice joint 305 by fusion splicing, and the like; evacuating inner volume 121 of sheath 101 through exchange gas evacuation/filling tube 106; optionally filling inner volume 121 of sheath 101 with an inert gas to a selected pressure; and sealing exchange gas evacuation/filling tube 106 (e.g., by soldering, gluing, welding, crimping, cold fusion, and the like).

Photonic thermometer module assembly 100 has numerous advantageous and unexpected benefits and uses. In an embodiment, a process for performing photonic thermometry includes: evacuating inner volume 121 of sheath 101 via vacuum valve 112, or exchange gas evacuation/filling tube 106 (and sealing exchange gas evacuation/filling tube 106 after its use); flushing inner volume 121 with inert gas by sequential cycles of purging with inert gas followed by evacuating inner volume 121; optionally heating photonic thermometer module assembly 100 from 40° C. to 150° C. while vacuum pumping to remove water vapor from inner volume 121; maintaining a vacuum pressure in inner volume 121 or filling inner volume 121 with an inert gas to a selected pressure to thermally stabilize photonic thermometer 201 relative to the external environment at exterior 122; closing vacuum valve 112; attaching vacuum valve plug 113; sealing exchange gas evacuation/filling tube 106 if gas filling occurred via exchange gas evacuation/filling tube 106; determining temperature with photonic thermometer 201, e.g., using procedures described in U.S. Pat. No. 10,955,617, which is incorporated by reference herein in its entirety.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Option, optional, or optionally means that the subsequently described event or circumstance can or cannot occur, and that the description includes instances where the event occurs and instances where it does not. As used herein, combination is inclusive of blends, mixtures, alloys, reaction products, collection of elements, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms "a," "an," and "the" and similar referents in the context of describing the invention (especially in the context of the following claims) are to be construed to cover both the singular and the plural, unless otherwise indicated herein or clearly contradicted by context. It can further be noted that the terms first, second, primary, secondary, and the like herein do not denote any order, quantity, or importance, but rather are used to distinguish one element from another. It will also be understood that, although the terms first, second, etc. are, in some instances, used herein to describe various elements, these elements should not be limited by these terms. For example, a first current could be termed a second current, and, similarly, a second current could be termed a first current, without departing from the scope of the various described embodiments. The first current and the second current are both currents, but they are not the same condition unless explicitly stated as such.

The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. A photonic thermometer module assembly for performing photonic thermometry, the photonic thermometer module assembly comprising:

a sheath comprising an inner volume, a first end, and a second end disposed at an opposite end of the sheath than the first end;

a sheath bottom plug disposed on the sheath at the second end such that the sheath bottom plug hermetically seals the sheath at the second end;

a sheath top flange disposed at the first end;

a top sealing flange disposed on the sheath top flange at the first end such that the top sealing flange hermetically seals the sheath at the first end;

a heat exchanger disposed on the sheath bottom plug such that the heat exchanger is in thermal communication with the sheath bottom plug;

a photonic thermometer disposed on the heat exchanger such that the photonic thermometer is in thermal communication with the sheath bottom plug through the heat exchanger, the heat exchanger is interposed between the photonic thermometer and the sheath bottom plug, and the photonic thermometer determines a temperature of the sheath; and an optical fiber array in optical communication with the photonic thermometer and that optically couples the photonic thermometer to an exterior environment of the photonic thermometer module assembly, wherein the photonic thermometer module assembly is compatible with International Temperature Scale of 1990 (ITS-90) fixed-point cell infrastructure and conventional drywell and oil-bath calibrations, and the photonic thermometer module assembly provides temperature measurements from −200° C. to +700° C.

2. The photonic thermometer module assembly of claim 1, wherein the heat exchanger and the photonic thermometer are individual modules that are are mechanically robust and reconfigurable, and provide independent and separate replacement of the heat exchanger or the photonic thermometer.

3. The photonic thermometer module assembly of claim 1, further comprising an optical fiber feedthrough disposed on the top sealing flange such that the optical fiber array is communicated through the optical fiber feedthrough from the inner volume of the sheath to the exterior environment of the photonic thermometer module assembly.

4. The photonic thermometer module assembly of claim 1, further comprising an exchange gas evacuation/filling tube disposed on the top sealing flange such that the exchange gas evacuation/filling tube is in fluid communication with the inner volume of the sheath and provides fluid evacuation or fluid introduction to the inner volume.

5. The photonic thermometer module assembly of claim 1, further comprising an optical fiber support collar disposed on the top sealing flange; and an optical fiber support fin disposed on the optical fiber support collar such that the optical fiber array is mechanically supported by the optical fiber support fin to avoid strain on the optical fiber array.

6. The photonic thermometer module assembly of claim 1, further comprising a fiber strain relief post disposed on the heat exchanger such that the optical fiber array is mechanically supported by the fiber strain relief post to avoid strain on the optical fiber array.

7. The photonic thermometer module assembly of claim 1, further comprising a thermally conductive layer interposed between the sheath bottom plug and the photonic thermometer to provide thermal communication from the sheath bottom plug to the photonic thermometer.

8. The photonic thermometer assembly of claim 1, further comprising a bottom plug thermally conductive layer to provide thermal communication from the heat exchanger to the sheath bottom plug.

9. The photonic thermometer module assembly of claim 1, further comprising an optical fiber expander optically interposed between the optical fiber array and the photonic thermometer to provide optical communication from the optical fiber array to the photonic thermometer.

10. The photonic thermometer module assembly of claim 1, further comprising a baffle disposed in the inner volume of the sheath such that the baffle is interposed between the top sealing flange and the photonic thermometer, and the baffle reduces thermal convection in the inner volume.

11. The photonic thermometer module assembly of claim 1, further comprising a thermal shield disposed in the inner volume and disposed on the photonic thermometer such that the thermal shield blocks the photonic thermometer from temperature gradients and temperature fluctuations in the inner volume and maintains sensitivity of the photonic thermometer to the temperature of the heat exchanger.

12. The photonic thermometer module assembly of claim 1, wherein a length L of the sheath from the first end to a distal-most surface of the sheath bottom plug is from 1 cm to 60 cm.

13. The photonic thermometer module assembly of claim 1, further comprising a flanged tee-coupler interposed between the sheath top flange and the top sealing flange.

14. The photonic thermometer module assembly of claim 13, further comprising a vacuum valve disposed on the flanged tee-coupler.

15. The photonic thermometer module assembly of claim 14, further comprising a vacuum valve plug disposed on the vacuum valve such that the vacuum valve is interposed between the flanged tee-coupler and the vacuum valve plug.

16. The photonic thermometer module assembly of claim 1, further comprising a top flange plug disposed on the top sealing flange such that the top sealing flange is interposed between the sheath and the top flange plug, and the sheath top flange, the top sealing flange, and the top flange plug hermetically seal the photonic thermometer module assembly at the first end of the sheath.

17. The photonic thermometer module assembly of claim 16, further comprising an optical fiber feedthrough disposed on the top flange plug such that the optical fiber array is communicated through the optical fiber feedthrough from the inner volume of the sheath to the exterior environment of the photonic thermometer module assembly.

18. The photonic thermometer module assembly of claim 16, further comprising an exchange gas evacuation/filling tube disposed on the top flange plug such that the exchange gas evacuation/filling tube is in fluid communication with the inner volume of the sheath and provides fluid evacuation or fluid introduction to the inner volume.

19. A photonic thermometer module assembly for performing photonic thermometry, the photonic thermometer module assembly comprising:

a sheath comprising an inner volume, a first end, and a second end disposed at an opposite end of the sheath than the first end;

a sheath bottom plug disposed on the sheath at the second end such that the sheath bottom plug hermetically seals the sheath at the second end;

a top inner-wall-mount flange disposed at the first end;

a top seal plug disposed on the top inner-wall-mount flange at the first end such that the top seal plug hermetically seals the sheath at the first end;

a heat exchanger disposed on the sheath bottom plug such that the heat exchanger is in thermal communication with the sheath bottom plug;

a photonic thermometer disposed on the heat exchanger such that the photonic thermometer is in thermal communication with the sheath bottom plug through the heat exchanger, the heat exchanger is interposed between the photonic thermometer and the sheath bottom plug, and the photonic thermometer determines a temperature of the sheath; and an optical fiber array in optical communication with the photonic thermometer and that optically couples the photonic thermometer to an exterior environment of the photonic thermometer module assembly, wherein the photonic thermometer module assembly is compatible with International Temperature Scale of 1990 (ITS-90) fixed-point cell infrastructure and conventional drywell and oil-bath calibrations, and the photonic thermometer module assembly provides temperature measurements from −200° C. to +700° C.

20. The photonic thermometer module assembly of claim 19, further comprising an optical fiber feedthrough disposed on the top seal plug such that the optical fiber array is communicated through the optical fiber feedthrough from the inner volume of the sheath to the exterior environment of the photonic thermometer module assembly.

21. The photonic thermometer module assembly of claim 19, further comprising an exchange gas evacuation/filling tube disposed on the top seal plug such that the exchange gas evacuation/filling tube is in fluid communication with the inner volume of the sheath and provides fluid evacuation or fluid introduction to the inner volume.

22. The photonic thermometer module assembly of claim 19, further comprising a fiber strain relief post disposed on the heat exchanger such that the optical fiber array is mechanically supported by the fiber strain relief post to avoid strain on the optical fiber array.

23. The photonic thermometer module assembly of claim 19, further comprising a thermally conductive layer interposed between the sheath bottom plug and the photonic thermometer to provide thermal communication from the sheath bottom plug to the photonic thermometer.

24. The photonic thermometer module assembly of claim 19, further comprising an optical fiber expander optically interposed between the optical fiber array and the photonic thermometer to provide optical communication from the optical fiber array to the photonic thermometer.

25. The photonic thermometer module assembly of claim 19, wherein a length L of the sheath from the first end to a distal-most surface of the sheath bottom plug is from 1 cm to 60 cm.

\* \* \* \* \*